US012244108B2

(12) United States Patent
Purdy et al.

(10) Patent No.: US 12,244,108 B2
(45) Date of Patent: *Mar. 4, 2025

(54) GROUND PORTION FOR MAINTAINING A GROUND PATH IN A COAXIAL CABLE CONNECTOR

(71) Applicant: PPC BROADBAND, INC., East Syracuse, NY (US)

(72) Inventors: Eric Purdy, Constantia, NY (US); Noah P. Montena, Syracuse, NY (US); Jeremy Amidon, Waxhaw, NC (US)

(73) Assignee: PPC BROADBAND, INC., East Syracuse, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/115,449

(22) Filed: Dec. 8, 2020

(65) Prior Publication Data

US 2021/0091516 A1 Mar. 25, 2021

Related U.S. Application Data

(63) Continuation of application No. 15/601,967, filed on May 22, 2017, now Pat. No. 10,862,251, which is a (Continued)

(51) Int. Cl.

*H01R 24/40* (2011.01)
*H01R 9/05* (2006.01)

(Continued)

(52) U.S. Cl.

CPC ............... *H01R 24/40* (2013.01); *H01R 9/05* (2013.01); *H01R 9/0521* (2013.01);

(Continued)

(58) Field of Classification Search

CPC ........ H01R 24/40; H01R 9/05; H01R 9/0521; H01R 9/0524; H01R 13/622;

(Continued)

(56) References Cited

U.S. PATENT DOCUMENTS

| | | | |
|---|---|---|---|
| 1,371,742 | A | 3/1921 | Dringman |
| 1,667,485 | A | 3/1921 | MacDonald |

(Continued)

FOREIGN PATENT DOCUMENTS

| | | | |
|---|---|---|---|
| CA | 2096710 | A1 | 11/1994 |
| CN | 1292940 | A | 4/2001 |

(Continued)

OTHER PUBLICATIONS

Thomas, G.C., U.S. Pat. No. 331,169 entitled "Nut-Locking Washer," issued Nov. 24, 1885, 3 pages.

(Continued)

*Primary Examiner* — Travis S Chambers
(74) *Attorney, Agent, or Firm* — MH2 TECHNOLOGY LAW GROUP LLP

(57) ABSTRACT

A ground portion for maintaining a ground path in a coaxial cable connector includes a coupler ground contact portion configured to be biasingly maintained in contact with a rearward facing coupler surface of a coupler of a connector when the connector is assembled and during operation of connector and a post ground contact portion configured to be located rearward from the rearward facing coupler surface of the coupler of the connector so as to extend in a space formed between a forward facing body surface of a body of the connector and a rearward facing post surface of a post of the connector when the connector is assembled and when the coupler engages the interface port so as to maintain physical and electrical grounding contact with the rearward facing post surface during operation of the connector.

31 Claims, 53 Drawing Sheets

Related U.S. Application Data continuation of application No. 14/134,892, filed on Dec. 19, 2013, now Pat. No. 9,660,398, which is a continuation of application No. 13/652,073, filed on Oct. 15, 2012, now Pat. No. 8,647,136, which is a continuation of application No. 12/633,792, filed on Dec. 8, 2009, now Pat. No. 8,287,320.

(60) Provisional application No. 61/180,835, filed on May 22, 2009.

(51) Int. Cl.
*H01R 13/622* (2006.01)
*H01R 13/6592* (2011.01)
*H01R 24/38* (2011.01)
*H01R 103/00* (2006.01)

(52) U.S. Cl.
CPC ......... *H01R 9/0524* (2013.01); *H01R 13/622* (2013.01); *H01R 13/6592* (2013.01); *H01R 24/38* (2013.01); *H01R 2103/00* (2013.01); *Y10T 29/49117* (2015.01); *Y10T 29/49123* (2015.01); *Y10T 29/49208* (2015.01)

(58) Field of Classification Search
CPC ................ H01R 13/6592; H01R 24/38; H01R 2103/00; H01R 13/648; H01R 9/0518; Y10T 29/49117; Y10T 19/49123; Y10T 29/49208
See application file for complete search history.

(56) References Cited

U.S. PATENT DOCUMENTS 1,766,869 A 6/1930 Austin
1,801,999 A 4/1931 Bowman
1,885,761 A 11/1932 Peirce, Jr.
2,013,526 A 9/1935 Schmitt
2,102,495 A 12/1937 England
2,258,737 A 10/1941 Browne
2,325,549 A 7/1943 Ryzowitz
2,480,963 A 9/1949 Quinn
2,544,654 A 3/1951 Brown
2,549,647 A 4/1951 Turenne
2,665,729 A 1/1954 Terry
2,694,187 A 11/1954 Nash
2,694,817 A 11/1954 Roderick
2,754,487 A 7/1956 Carr et al.
2,755,331 A 7/1956 Melcher
2,757,351 A 7/1956 Klostermann
2,762,025 A 9/1956 Melcher
2,805,399 A 9/1957 Leeper
2,816,949 A 12/1957 Curtiss
2,870,420 A 1/1959 Malek
3,001,169 A 9/1961 Blonder
3,015,794 A 1/1962 Kishbaugh
3,091,748 A 5/1963 Takes et al.
3,094,364 A 6/1963 Lingg
3,103,548 A 9/1963 Concelman
3,184,706 A 5/1965 Atkins
3,194,292 A 7/1965 Borowsky
3,196,382 A 7/1965 Morello, Jr.
3,245,027 A 4/1966 Ziegler, Jr.
3,275,913 A 9/1966 Blanchard et al.
3,278,890 A 10/1966 Cooney
3,281,757 A 10/1966 Bonhomme
3,292,136 A 12/1966 Somerset
3,320,575 A 5/1967 Brown et al.
3,321,732 A 5/1967 Forney, Jr.
3,336,563 A 8/1967 Hyslop
3,348,186 A 10/1967 Rosen
3,350,677 A 10/1967 Daum
3,355,698 A 11/1967 Keller
3,373,243 A 3/1968 Janowiak et al.
3,390,374 A 6/1968 Forney, Jr.
3,406,373 A 10/1968 Forney, Jr.
3,430,184 A 2/1969 Acord
3,448,430 A 6/1969 Kelly
3,453,376 A 7/1969 Ziegler, Jr. et al.
3,465,281 A 9/1969 Florer
3,475,545 A 10/1969 Stark et al.
3,494,400 A 2/1970 McCoy et al.
3,498,647 A 3/1970 Schroder
3,501,737 A 3/1970 Harris et al.
3,517,373 A 6/1970 Jamon
3,526,871 A 9/1970 Hobart
3,533,051 A 10/1970 Ziegler, Jr.
3,537,065 A 10/1970 Winston
3,544,705 A 12/1970 Winston
3,551,882 A 12/1970 O'Keefe
3,564,487 A 2/1971 Upstone et al.
3,587,033 A 6/1971 Brorein et al.
3,601,776 A 8/1971 Curl
3,629,792 A 12/1971 Dorrell
3,633,150 A 1/1972 Swartz
3,646,502 A 2/1972 Hutter et al.
3,663,926 A 5/1972 Brandl
3,665,371 A 5/1972 Cripps
3,668,612 A 6/1972 Nepovim
3,669,472 A 6/1972 Nadsady
3,671,922 A 6/1972 Zerlin et al.
3,678,444 A 7/1972 Stevens et al.
3,678,445 A 7/1972 Brancaleone
3,680,034 A 7/1972 Chow et al.
3,681,739 A 8/1972 Kornick
3,683,320 A 8/1972 Woods et al.
3,686,623 A 8/1972 Nijman
3,694,792 A 9/1972 Wallo
3,706,958 A 12/1972 Blanchenot
3,710,005 A 1/1973 French
3,739,076 A 6/1973 Schwartz
3,744,007 A 7/1973 Horak
3,744,011 A 7/1973 Blanchenot
3,778,535 A 12/1973 Forney, Jr.
3,781,762 A 12/1973 Quackenbush
3,781,898 A 12/1973 Holloway
3,793,610 A 2/1974 Brishka
3,798,589 A 3/1974 Deardurff
3,808,580 A 4/1974 Johnson
3,810,076 A 5/1974 Hutter
3,835,443 A 9/1974 Arnold et al.
3,836,700 A 9/1974 Niemeyer
3,845,453 A 10/1974 Hemmer
3,846,738 A 11/1974 Nepovim
3,854,003 A 12/1974 Duret
3,858,156 A 12/1974 Zarro
3,870,978 A 3/1975 Dreyer
3,879,102 A 4/1975 Horak
3,886,301 A 5/1975 Cronin et al.
3,907,399 A 9/1975 Spinner
3,910,673 A 10/1975 Stokes
3,915,539 A 10/1975 Collins
3,936,132 A 2/1976 Hutter
3,953,097 A 4/1976 Graham
3,960,428 A 6/1976 Naus et al.
3,963,320 A 6/1976 Spinner
3,963,321 A 6/1976 Burger et al.
3,970,355 A 7/1976 Pitschi
3,972,013 A 7/1976 Shapiro
3,976,352 A 8/1976 Spinner
3,980,805 A 9/1976 Lipari
3,985,418 A 10/1976 Spinner
4,017,139 A 4/1977 Nelson
4,022,966 A 5/1977 Gajajiva
4,030,798 A 6/1977 Paoli
4,045,706 A 8/1977 Daffner et al.
4,046,451 A 9/1977 Juds et al.
4,053,200 A 10/1977 Pugner
4,059,330 A 11/1977 Shirey
4,079,343 A 3/1978 Nijman
4,082,404 A 4/1978 Fiatt
4,090,028 A 5/1978 Vonlobel
4,093,335 A 6/1978 Schwartz et al.

(56) References Cited

U.S. PATENT DOCUMENTS

| | | | |
|---|---|---|---|
| 4,106,839 | A | 8/1978 | Cooper |
| 4,109,126 | A | 8/1978 | Halbeck |
| 4,125,308 | A | 11/1978 | Schilling |
| 4,126,372 | A | 11/1978 | Hashimoto et al. |
| 4,131,332 | A | 12/1978 | Hogendobler et al. |
| 4,150,250 | A | 4/1979 | Lundeberg |
| 4,153,320 | A | 5/1979 | Townshend |
| 4,156,554 | A | 5/1979 | Aujla |
| 4,165,911 | A | 8/1979 | Laudig |
| 4,168,921 | A | 9/1979 | Blanchard |
| 4,173,385 | A | 11/1979 | Fenn et al. |
| 4,174,875 | A | 11/1979 | Wilson et al. |
| 4,187,481 | A | 2/1980 | Boutros |
| 4,193,655 | A | 3/1980 | Herrmann, Jr. |
| 4,194,338 | A | 3/1980 | Trafton |
| 4,213,664 | A | 7/1980 | McClenan |
| 4,225,162 | A | 9/1980 | Dola |
| 4,227,765 | A | 10/1980 | Neumann et al. |
| 4,229,714 | A | 10/1980 | Yu |
| 4,250,348 | A | 2/1981 | Kitagawa |
| 4,280,749 | A | 7/1981 | Hemmer |
| 4,285,564 | A | 8/1981 | Spinner |
| 4,290,663 | A | 9/1981 | Fowler et al. |
| 4,296,986 | A | 10/1981 | Herrmann et al. |
| 4,307,926 | A | 12/1981 | Smith |
| 4,322,121 | A | 3/1982 | Riches et al. |
| 4,326,769 | A | 4/1982 | Dorsey et al. |
| 4,339,166 | A | 7/1982 | Dayton |
| 4,346,958 | A | 8/1982 | Blanchard |
| 4,354,721 | A | 10/1982 | Luzzi |
| 4,358,174 | A | 11/1982 | Dreyer |
| 4,359,254 | A | 11/1982 | Gallusser |
| 4,373,767 | A | 2/1983 | Cairns |
| 4,389,081 | A | 6/1983 | Gallusser et al. |
| 4,400,050 | A | 8/1983 | Hayward |
| 4,407,529 | A | 10/1983 | Holman |
| 4,408,821 | A | 10/1983 | Forney, Jr. |
| 4,408,822 | A | 10/1983 | Nikitas |
| 4,412,717 | A | 11/1983 | Monroe |
| 4,421,377 | A | 12/1983 | Spinner |
| 4,426,127 | A | 1/1984 | Kubota |
| 4,444,453 | A | 4/1984 | Kirby et al. |
| 4,452,503 | A | 6/1984 | Forney, Jr. |
| 4,456,323 | A | 6/1984 | Pilcher et al. |
| 4,462,653 | A | 7/1984 | Flederbach et al. |
| 4,464,000 | A | 8/1984 | Werth et al. |
| 4,464,001 | A | 8/1984 | Collins |
| 4,469,386 | A | 9/1984 | Ackerman |
| 4,470,657 | A | 9/1984 | Deacon |
| 4,484,792 | A | 11/1984 | Tengler et al. |
| 4,484,796 | A | 11/1984 | Sato et al. |
| 4,490,576 | A | 12/1984 | Bolante et al. |
| 4,506,943 | A | 3/1985 | Drogo |
| 4,515,427 | A | 5/1985 | Smit |
| 4,525,017 | A | 6/1985 | Schildkraut et al. |
| 4,531,790 | A | 7/1985 | Selvin |
| 4,531,805 | A | 7/1985 | Werth |
| 4,533,191 | A | 8/1985 | Blackwood |
| 4,540,231 | A | 9/1985 | Forney, Jr. |
| RE31,995 | E | 10/1985 | Ball |
| 4,545,637 | A | 10/1985 | Bosshard et al. |
| 4,575,274 | A | 3/1986 | Hayward |
| 4,580,862 | A | 4/1986 | Johnson |
| 4,580,865 | A | 4/1986 | Fryberger |
| 4,583,811 | A | 4/1986 | McMills |
| 4,585,289 | A | 4/1986 | Bocher |
| 4,588,246 | A | 5/1986 | Schildkraut et al. |
| 4,593,964 | A | 6/1986 | Forney, Jr. et al. |
| 4,596,434 | A | 6/1986 | Saba et al. |
| 4,596,435 | A | 6/1986 | Bickford |
| 4,597,621 | A | 7/1986 | Burns |
| 4,598,959 | A | 7/1986 | Selvin |
| 4,598,961 | A | 7/1986 | Cohen |
| 4,600,263 | A | 7/1986 | DeChamp et al. |
| 4,613,199 | A | 9/1986 | McGeary |
| 4,614,390 | A | 9/1986 | Baker |
| 4,616,900 | A | 10/1986 | Cairns |
| 4,632,487 | A | 12/1986 | Wargula |
| 4,634,213 | A | 1/1987 | Larsson et al. |
| 4,640,572 | A | 2/1987 | Conlon |
| 4,645,281 | A | 2/1987 | Burger |
| 4,650,228 | A | 3/1987 | McMills et al. |
| 4,655,159 | A | 4/1987 | McMills |
| 4,655,534 | A | 4/1987 | Stursa |
| 4,660,921 | A | 4/1987 | Hauver |
| 4,668,043 | A | 5/1987 | Saba et al. |
| 4,673,236 | A | 6/1987 | Musolff et al. |
| 4,674,818 | A | 6/1987 | McMills et al. |
| 4,676,577 | A | 6/1987 | Szegda |
| 4,682,832 | A | 7/1987 | Punako et al. |
| 4,684,201 | A | 8/1987 | Hutter |
| 4,688,876 | A | 8/1987 | Morelli |
| 4,688,878 | A | 8/1987 | Cohen et al. |
| 4,690,482 | A | 9/1987 | Chamberland et al. |
| 4,691,976 | A | 9/1987 | Cowen |
| 4,703,987 | A | 11/1987 | Gallusser et al. |
| 4,703,988 | A | 11/1987 | Raux et al. |
| 4,717,355 | A | 1/1988 | Mattis |
| 4,720,155 | A | 1/1988 | Schildkraut et al. |
| 4,734,050 | A | 3/1988 | Negre et al. |
| 4,734,666 | A | 3/1988 | Ohya et al. |
| 4,737,123 | A | 4/1988 | Paler et al. |
| 4,738,009 | A | 4/1988 | Down et al. |
| 4,738,628 | A | 4/1988 | Rees |
| 4,739,126 | A | 4/1988 | Gutter et al. |
| 4,746,305 | A | 5/1988 | Nomura |
| 4,747,786 | A | 5/1988 | Hayashi et al. |
| 4,749,821 | A | 6/1988 | Linton et al. |
| 4,755,152 | A | 7/1988 | Elliot et al. |
| 4,757,297 | A | 7/1988 | Frawley |
| 4,759,729 | A | 7/1988 | Kemppainen et al. |
| 4,761,146 | A | 8/1988 | Sohoel |
| 4,772,222 | A | 9/1988 | Laudig et al. |
| 4,789,355 | A | 12/1988 | Lee |
| 4,789,759 | A | 12/1988 | Jones |
| 4,795,360 | A | 1/1989 | Newman et al. |
| 4,797,120 | A | 1/1989 | Ulery |
| 4,806,116 | A | 2/1989 | Ackerman |
| 4,807,891 | A | 2/1989 | Neher |
| 4,808,128 | A | 2/1989 | Werth |
| 4,813,886 | A | 3/1989 | Roos et al. |
| 4,820,185 | A | 4/1989 | Moulin |
| 4,834,675 | A | 5/1989 | Samchisen |
| 4,835,342 | A | 5/1989 | Guginsky |
| 4,836,801 | A | 6/1989 | Ramirez |
| 4,838,813 | A | 6/1989 | Pauza et al. |
| 4,854,893 | A | 8/1989 | Morris |
| 4,857,014 | A | 8/1989 | Alf et al. |
| 4,867,706 | A | 9/1989 | Tang |
| 4,869,679 | A | 9/1989 | Szegda |
| 4,874,331 | A | 10/1989 | Iverson |
| 4,892,275 | A | 1/1990 | Szegda |
| 4,902,246 | A | 2/1990 | Samchisen |
| 4,906,207 | A | 3/1990 | Banning et al. |
| 4,915,651 | A | 4/1990 | Bout |
| 4,921,447 | A | 5/1990 | Capp et al. |
| 4,923,412 | A | 5/1990 | Morris |
| 4,925,403 | A | 5/1990 | Zorzy |
| 4,927,385 | A | 5/1990 | Cheng |
| 4,929,188 | A | 5/1990 | Lionetto et al. |
| 4,934,960 | A | 6/1990 | Capp et al. |
| 4,938,718 | A | 7/1990 | Guendel |
| 4,941,846 | A | 7/1990 | Guimond et al. |
| 4,952,174 | A | 8/1990 | Sucht et al. |
| 4,957,456 | A | 9/1990 | Olson et al. |
| 4,973,265 | A | 11/1990 | Heeren |
| 4,979,911 | A | 12/1990 | Spencer |
| 4,990,104 | A | 2/1991 | Schieferly |
| 4,990,105 | A | 2/1991 | Karlovich |
| 4,990,106 | A | 2/1991 | Szegda |
| 4,992,061 | A | 2/1991 | Brush, Jr. et al. |
| 5,002,503 | A | 3/1991 | Campbell et al. |
| 5,007,861 | A | 4/1991 | Stirling |
| 5,011,422 | A | 4/1991 | Yeh |

(56) References Cited

U.S. PATENT DOCUMENTS

| | | | | |
|---|---|---|---|---|
| 5,011,432 | A | 4/1991 | Sucht et al. | |
| 5,021,010 | A | 6/1991 | Wright | |
| 5,024,606 | A | 6/1991 | Ming-Hwa | |
| 5,030,126 | A | 7/1991 | Hanlon | |
| 5,037,328 | A | 8/1991 | Karlovich | |
| 5,046,964 | A | 9/1991 | Welsh et al. | |
| 5,052,947 | A | 10/1991 | Brodie et al. | |
| 5,055,060 | A | 10/1991 | Down et al. | |
| 5,059,747 | A | 10/1991 | Bawa et al. | |
| 5,062,804 | A | 11/1991 | Jamet et al. | |
| 5,066,248 | A | 11/1991 | Gaver, Jr. et al. | |
| 5,073,129 | A | 12/1991 | Szegda | |
| 5,080,600 | A | 1/1992 | Baker et al. | |
| 5,083,943 | A | 1/1992 | Tarrant | |
| 5,120,260 | A | 6/1992 | Jackson | |
| 5,127,853 | A | 7/1992 | McMills et al. | |
| 5,131,862 | A | 7/1992 | Gershfeld | |
| 5,137,470 | A | 8/1992 | Doles | |
| 5,137,471 | A | 8/1992 | Verespej et al. | |
| 5,141,448 | A | 8/1992 | Mattingly et al. | |
| 5,141,451 | A | 8/1992 | Down | |
| 5,149,274 | A | 9/1992 | Gallusser et al. | |
| 5,154,636 | A | 10/1992 | Vaccaro et al. | |
| 5,161,993 | A | 11/1992 | Leibfried, Jr. | |
| 5,166,477 | A | 11/1992 | Perin, Jr. et al. | |
| 5,169,323 | A | 12/1992 | Kawai et al. | |
| 5,181,161 | A | 1/1993 | Hirose et al. | |
| 5,183,417 | A | 2/1993 | Bools | |
| 5,186,501 | A | 2/1993 | Mano | |
| 5,186,655 | A | 2/1993 | Glenday et al. | |
| 5,195,905 | A | 3/1993 | Pesci | |
| 5,195,906 | A | 3/1993 | Szegda | |
| 5,205,547 | A | 4/1993 | Mattingly | |
| 5,205,761 | A | 4/1993 | Nilsson | |
| 5,207,602 | A | 5/1993 | McMills et al. | |
| 5,215,477 | A | 6/1993 | Weber et al. | |
| 5,217,391 | A | 6/1993 | Fisher, Jr. | |
| 5,217,393 | A | 6/1993 | Del Negro et al. | |
| 5,221,216 | A | 6/1993 | Gabany et al. | |
| 5,227,587 | A | 7/1993 | Paterek | |
| 5,247,424 | A | 9/1993 | Harris et al. | |
| 5,269,701 | A | 12/1993 | Leibfried, Jr. | |
| 5,283,853 | A | 2/1994 | Szegda | |
| 5,284,449 | A | 2/1994 | Vaccaro | |
| 5,294,864 | A | 3/1994 | Do | |
| 5,295,864 | A | 3/1994 | Birch et al. | |
| 5,316,494 | A | 5/1994 | Flanagan et al. | |
| 5,318,459 | A | 6/1994 | Shields | |
| 5,321,205 | A | 6/1994 | Bawa et al. | |
| 5,334,032 | A | 8/1994 | Myers et al. | |
| 5,334,051 | A | 8/1994 | Devine et al. | |
| 5,338,225 | A | 8/1994 | Jacobsen et al. | |
| 5,342,218 | A | 8/1994 | McMills et al. | |
| 5,354,217 | A | 10/1994 | Gabel et al. | |
| 5,362,250 | A | 11/1994 | McMills et al. | |
| 5,371,819 | A | 12/1994 | Szegda | |
| 5,371,821 | A | 12/1994 | Szegda | |
| 5,371,827 | A | 12/1994 | Szegda | |
| 5,380,211 | A | 1/1995 | Kawaguchi et al. | |
| 5,389,005 | A | 2/1995 | Kodama | |
| 5,393,244 | A | 2/1995 | Szegda | |
| 5,397,252 | A | 3/1995 | Wang | |
| 5,413,504 | A | 5/1995 | Kloecker et al. | |
| 5,431,583 | A | 7/1995 | Szegda | |
| 5,435,745 | A | 7/1995 | Booth | |
| 5,435,751 | A | 7/1995 | Papenheim et al. | |
| 5,439,386 | A | 8/1995 | Ellis et al. | |
| 5,444,810 | A | 8/1995 | Szegda | |
| 5,455,548 | A | 10/1995 | Grandchamp et al. | |
| 5,456,611 | A | 10/1995 | Henry et al. | |
| 5,456,614 | A | 10/1995 | Szegda | |
| 5,466,173 | A | 11/1995 | Down | |
| 5,470,257 | A | 11/1995 | Szegda | |
| 5,474,478 | A | 12/1995 | Ballog | |
| 5,490,033 | A | 2/1996 | Cronin | |
| 5,490,801 | A | 2/1996 | Fisher, Jr. et al. | |
| 5,494,454 | A | 2/1996 | Johnsen | |
| 5,499,934 | A | 3/1996 | Jacobsen et al. | |
| 5,501,616 | A | 3/1996 | Holliday | |
| 5,509,823 | A | 4/1996 | Harting et al. | |
| 5,516,303 | A | 5/1996 | Yohn et al. | |
| 5,525,076 | A | 6/1996 | Down | |
| 5,542,861 | A | 8/1996 | Anhalt et al. | |
| 5,548,088 | A | 8/1996 | Gray et al. | |
| 5,550,521 | A | 8/1996 | Bernaud et al. | |
| 5,564,938 | A | 10/1996 | Shenkal et al. | |
| 5,571,028 | A | 11/1996 | Szegda | |
| 5,586,910 | A | 12/1996 | Del Negro et al. | |
| 5,595,499 | A | 1/1997 | Zander et al. | |
| 5,598,132 | A | 1/1997 | Stabile | |
| 5,607,325 | A | 3/1997 | Toma | |
| 5,620,339 | A | 4/1997 | Gray et al. | |
| 5,632,637 | A | 5/1997 | Diener | |
| 5,632,651 | A | 5/1997 | Szegda | |
| 5,644,104 | A | 7/1997 | Porter et al. | |
| 5,651,698 | A | 7/1997 | Locati et al. | |
| 5,651,699 | A | 7/1997 | Holliday | |
| 5,653,605 | A | 8/1997 | Woehl et al. | |
| 5,667,405 | A * | 9/1997 | Holliday ............ | H01R 13/5219 439/585 |
| 5,681,172 | A | 10/1997 | Moldenhauer | |
| 5,683,263 | A | 11/1997 | Hsu | |
| 5,702,263 | A | 12/1997 | Baumann et al. | |
| 5,722,856 | A | 3/1998 | Fuchs et al. | |
| 5,735,704 | A | 4/1998 | Anthony | |
| 5,746,617 | A | 5/1998 | Porter, Jr. et al. | |
| 5,746,619 | A | 5/1998 | Harting et al. | |
| 5,769,652 | A | 6/1998 | Wider | |
| 5,775,927 | A | 7/1998 | Wider | |
| 5,863,220 | A | 1/1999 | Holliday | |
| 5,877,452 | A | 3/1999 | McConnell | |
| 5,879,191 | A | 3/1999 | Burris | |
| 5,882,226 | A | 3/1999 | Bell et al. | |
| 5,897,795 | A | 4/1999 | Lu et al. | |
| 5,921,793 | A | 7/1999 | Phillips | |
| 5,938,465 | A | 8/1999 | Fox, Sr. | |
| 5,944,548 | A | 8/1999 | Saito | |
| 5,951,327 | A | 9/1999 | Marik | |
| 5,957,716 | A | 9/1999 | Buckley et al. | |
| 5,967,852 | A | 10/1999 | Follingstad et al. | |
| 5,975,949 | A | 11/1999 | Holliday et al. | |
| 5,975,951 | A | 11/1999 | Burris et al. | |
| 5,977,841 | A | 11/1999 | Lee et al. | |
| 5,997,350 | A | 12/1999 | Burris et al. | |
| 6,010,349 | A | 1/2000 | Porter, Jr. | |
| 6,019,635 | A | 2/2000 | Nelson | |
| 6,022,237 | A | 2/2000 | Esh | |
| 6,032,358 | A | 3/2000 | Wild | |
| 6,042,422 | A | 3/2000 | Youtsey | |
| 6,048,229 | A | 4/2000 | Lazaro, Jr. | |
| 6,053,743 | A | 4/2000 | Mitchell et al. | |
| 6,053,769 | A | 4/2000 | Kubota et al. | |
| 6,053,777 | A | 4/2000 | Boyle | |
| 6,083,053 | A | 7/2000 | Anderson, Jr. et al. | |
| 6,089,903 | A | 7/2000 | Stafford Gray et al. | |
| 6,089,912 | A | 7/2000 | Tallis et al. | |
| 6,089,913 | A | 7/2000 | Holliday | |
| 6,123,567 | A | 9/2000 | McCarthy | |
| 6,146,197 | A | 11/2000 | Holliday et al. | |
| 6,152,753 | A | 11/2000 | Johnson et al. | |
| 6,153,830 | A * | 11/2000 | Montena .............. | H01R 9/0521 439/578 |
| 6,162,995 | A | 12/2000 | Bachle et al. | |
| 6,210,216 | B1 | 4/2001 | Tso-Chin et al. | |
| 6,210,222 | B1 | 4/2001 | Langham et al. | |
| 6,217,383 | B1 * | 4/2001 | Holland ............... | H01R 9/0524 439/578 |
| 6,239,359 | B1 | 5/2001 | Lilienthal et al. | |
| 6,241,553 | B1 | 6/2001 | Hsia | |
| 6,257,923 | B1 | 7/2001 | Stone et al. | |
| 6,261,126 | B1 | 7/2001 | Stirling | |
| 6,267,612 | B1 | 7/2001 | Arcykiewicz et al. | |
| 6,271,464 | B1 | 8/2001 | Cunningham | |
| 6,331,123 | B1 | 12/2001 | Rodrigues | |

(56) References Cited

U.S. PATENT DOCUMENTS 6,332,815 B1 12/2001 Bruce
6,358,077 B1 3/2002 Young
D458,904 S 6/2002 Montena
6,406,330 B2 6/2002 Bruce
D460,739 S 7/2002 Fox
D460,740 S 7/2002 Montena
D460,946 S 7/2002 Montena
D460,947 S 7/2002 Montena
D460,948 S 7/2002 Montena
6,422,900 B1 7/2002 Hogan
6,425,782 B1 7/2002 Holland
D461,166 S 8/2002 Montena
D461,167 S 8/2002 Montena
D461,778 S 8/2002 Fox
D462,058 S 8/2002 Montena
D462,060 S 8/2002 Fox
6,439,899 B1 8/2002 Muzslay et al.
D462,327 S 9/2002 Montena
6,468,100 B1 10/2002 Meyer et al.
6,491,546 B1 12/2002 Perry
D468,696 S 1/2003 Montena
6,506,083 B1 1/2003 Bickford et al.
6,520,800 B1 2/2003 Michelbach et al.
6,530,807 B2 3/2003 Rodrigues et al.
6,540,531 B2 4/2003 Syed et al.
6,558,194 B2 5/2003 Montena
6,572,419 B2 6/2003 Feye-Homann
6,576,833 B2 6/2003 Covaro et al.
6,619,876 B2 9/2003 Vaitkus et al.
6,634,906 B1 10/2003 Yeh
6,676,446 B2 1/2004 Montena
6,683,253 B1 1/2004 Lee
6,692,285 B2 2/2004 Islam
6,692,286 B1 2/2004 De Cet
6,705,884 B1 3/2004 McCarthy
6,709,280 B1 3/2004 Gretz
6,712,631 B1 * 3/2004 Youtsey ............. H01R 13/6277
439/322
6,716,041 B2 4/2004 Ferderer et al.
6,716,062 B1 4/2004 Palinkas et al.
6,733,336 B1 5/2004 Montena et al.
6,733,337 B2 5/2004 Kodaira
6,752,633 B2 6/2004 Aizawa et al.
6,767,248 B1 7/2004 Hung
6,769,926 B1 8/2004 Montena
6,769,933 B2 8/2004 Bence et al.
6,780,029 B1 8/2004 Gretz
6,780,052 B2 8/2004 Montena et al.
6,780,068 B2 8/2004 Bartholoma et al.
6,786,767 B1 9/2004 Fuks et al.
6,790,081 B2 9/2004 Burris et al.
6,805,584 B1 10/2004 Chen
6,817,896 B2 11/2004 Derenthal
6,817,897 B2 11/2004 Chee
6,848,939 B2 2/2005 Stirling
6,848,940 B2 2/2005 Montena
6,873,864 B2 3/2005 Kai et al.
6,882,247 B2 4/2005 Allison et al.
6,884,113 B1 4/2005 Montena
6,884,115 B2 4/2005 Malloy
6,898,940 B2 5/2005 Gram et al.
6,916,200 B2 7/2005 Burris et al.
6,929,265 B2 8/2005 Holland et al.
6,929,508 B1 8/2005 Holland
6,939,169 B2 9/2005 Islam et al.
6,948,976 B2 9/2005 Goodwin et al.
6,971,912 B2 12/2005 Montena et al.
7,004,788 B2 2/2006 Montena
7,011,547 B1 3/2006 Wu
7,029,304 B2 4/2006 Montena
7,029,326 B2 4/2006 Montena
7,063,565 B2 6/2006 Ward
7,070,447 B1 7/2006 Montena
7,074,081 B2 7/2006 Hsia
7,086,897 B2 8/2006 Montena
7,097,499 B1 8/2006 Purdy
7,097,500 B2 8/2006 Montena
7,102,868 B2 9/2006 Montena
7,108,548 B2 9/2006 Burris et al.
7,114,990 B2 * 10/2006 Bence .................... H01R 24/44
439/322
7,118,416 B2 10/2006 Montena et al.
7,125,283 B1 10/2006 Lin
7,128,603 B2 10/2006 Burris et al.
7,128,605 B2 10/2006 Montena
7,131,867 B1 11/2006 Foster et al.
7,131,868 B2 11/2006 Montena
7,144,271 B1 12/2006 Burris et al.
7,147,509 B1 12/2006 Burris et al.
7,156,696 B1 1/2007 Montena
7,161,785 B2 1/2007 Chawgo
7,179,121 B1 2/2007 Burris et al.
7,186,127 B2 3/2007 Montena
7,189,113 B2 3/2007 Sattele et al.
7,198,507 B2 4/2007 Tusini
7,207,820 B1 4/2007 Montena
7,229,303 B2 6/2007 Vermoesen et al.
7,241,172 B2 7/2007 Rodrigues et al.
7,252,546 B1 8/2007 Holland
7,255,598 B2 * 8/2007 Montena .............. H01R 9/0518
439/585
7,264,503 B2 9/2007 Montena
7,299,520 B2 11/2007 Huang
7,299,550 B2 11/2007 Montena
7,300,309 B2 11/2007 Montena
7,309,255 B2 12/2007 Rodrigues
7,354,309 B2 4/2008 Palinkas
7,371,112 B2 5/2008 Burris et al.
7,371,113 B2 5/2008 Burris et al.
7,375,533 B2 5/2008 Gale
7,393,245 B2 7/2008 Palinkas et al.
7,404,737 B1 7/2008 Youtsey
7,442,081 B2 10/2008 Burke et al.
7,452,237 B1 11/2008 Montena
7,452,239 B2 11/2008 Montena
7,455,549 B2 11/2008 Rodrigues et al.
7,455,550 B1 11/2008 Sykes
7,462,068 B2 12/2008 Amidon
7,476,127 B1 1/2009 Wei
7,479,033 B1 1/2009 Sykes et al.
7,479,035 B2 1/2009 Bence et al.
7,480,991 B2 1/2009 Khemakhem et al.
7,488,210 B1 2/2009 Burris et al.
7,494,355 B2 2/2009 Hughes et al.
7,497,729 B1 3/2009 Wei
7,507,117 B2 3/2009 Amidon
7,513,795 B1 4/2009 Shaw
7,544,094 B1 6/2009 Paglia et al.
7,566,236 B2 7/2009 Malloy et al.
7,568,945 B2 8/2009 Chee et al.
7,607,942 B1 10/2009 Van Swearingen
7,644,755 B2 1/2010 Stoesz et al.
7,674,132 B1 * 3/2010 Chen .................... H01R 9/0524
439/578
7,682,177 B2 3/2010 Berthet
7,727,011 B2 6/2010 Montena et al.
7,753,705 B2 7/2010 Montena
7,753,727 B1 7/2010 Islam et al.
7,792,148 B2 9/2010 Carlson et al.
7,794,275 B2 9/2010 Rodrigues
7,798,849 B2 9/2010 Montena
7,806,714 B2 10/2010 Williams et al.
7,806,725 B1 10/2010 Chen
7,811,133 B2 10/2010 Gray
7,824,216 B2 11/2010 Purdy
7,828,595 B2 11/2010 Mathews
7,828,596 B2 11/2010 Malak
7,830,154 B2 11/2010 Gale
7,833,053 B2 11/2010 Mathews
7,837,501 B2 11/2010 Youtsey
7,845,963 B2 12/2010 Gastineau
7,845,976 B2 12/2010 Mathews
7,845,978 B1 12/2010 Chen
7,850,487 B1 12/2010 Wei

(56) References Cited

U.S. PATENT DOCUMENTS 7,857,661 B1 12/2010 Islam
7,874,870 B1 1/2011 Chen
7,887,354 B2 2/2011 Holliday
7,892,004 B2 2/2011 Hertzler et al.
7,892,005 B2 2/2011 Haube
7,892,024 B1 2/2011 Chen
7,927,135 B1 4/2011 Wlos
7,934,954 B1 5/2011 Chawgo et al.
7,950,958 B2 5/2011 Mathews
7,955,126 B2 6/2011 Bence et al.
7,972,158 B2 7/2011 Wild et al.
8,029,315 B2 10/2011 Purdy et al.
8,033,862 B2 10/2011 Radzik et al.
8,062,044 B2 11/2011 Montena et al.
8,062,063 B2 11/2011 Malloy et al.
8,075,337 B2 12/2011 Malloy et al.
8,075,338 B1 12/2011 Montena
8,075,339 B2 12/2011 Holliday
8,079,860 B1 12/2011 Zraik
8,113,875 B2 2/2012 Malloy et al.
8,152,551 B2 4/2012 Zraik
8,157,588 B1 4/2012 Rodrigues et al.
8,157,589 B2 4/2012 Krenceski et al.
8,167,635 B1 5/2012 Mathews
8,167,636 B1 5/2012 Montena
8,167,646 B1 5/2012 Mathews
8,172,612 B2 5/2012 Bence et al.
8,186,919 B2 5/2012 Blair
8,192,237 B2 * 6/2012 Purdy ..................... H01R 9/05
8,206,176 B2 6/2012 Islam
8,231,406 B2 7/2012 Burris et al.
8,231,412 B2 7/2012 Paglia et al.
8,287,320 B2 * 10/2012 Purdy .................. H01R 13/622 439/792
8,313,345 B2 11/2012 Purdy
8,313,353 B2 11/2012 Purdy et al.
8,323,053 B2 12/2012 Montena
8,323,060 B2 * 12/2012 Purdy .................. H01R 13/622 439/792
8,328,577 B1 12/2012 Lu
8,337,229 B2 12/2012 Montena
8,348,697 B2 1/2013 Zraik
8,366,481 B2 2/2013 Ehret et al.
8,376,769 B2 2/2013 Holland et al.
8,382,517 B2 2/2013 Mathews
8,398,421 B2 3/2013 Haberek et al.
8,414,322 B2 4/2013 Montena
8,444,445 B2 * 5/2013 Amidon ............... H01R 13/622 439/792
8,469,740 B2 6/2013 Ehret et al.
8,475,205 B2 7/2013 Ehret et al.
8,480,430 B2 7/2013 Ehret et al.
8,480,431 B2 7/2013 Ehret et al.
8,485,845 B2 7/2013 Ehret et al.
8,506,325 B2 8/2013 Malloy et al.
8,517,763 B2 8/2013 Burris et al.
8,529,279 B2 9/2013 Montena
8,556,654 B2 10/2013 Chastain et al.
8,562,366 B2 * 10/2013 Purdy ..................... H01R 9/05 439/322
8,573,996 B2 * 11/2013 Amidon ............. H01R 13/6473 439/322
8,579,658 B2 11/2013 Youtsey
8,597,041 B2 * 12/2013 Purdy ................ H01R 13/6592 439/322
8,636,541 B2 1/2014 Chastain et al.
8,647,136 B2 * 2/2014 Purdy ..................... H01R 9/05 439/322
8,690,603 B2 4/2014 Bence et al.
8,801,448 B2 * 8/2014 Purdy .................... H01R 24/38 439/322
8,808,019 B2 8/2014 Paglia et al.
8,888,526 B2 * 11/2014 Burris .................... H01R 24/40 439/578
8,920,192 B2 12/2014 Montena
9,039,446 B2 5/2015 Youtsey
9,153,911 B2 10/2015 Burris et al.
9,160,083 B2 10/2015 Chastain et al.
9,190,744 B2 * 11/2015 Burris ................ H01R 13/6581
9,190,773 B2 11/2015 Shaw
9,419,389 B2 * 8/2016 Purdy .................. H01R 9/0524
9,444,156 B2 9/2016 Chastain et al.
9,496,661 B2 * 11/2016 Purdy ...................... H01R 9/05
9,515,432 B2 12/2016 Purdy et al.
9,570,845 B2 2/2017 Purdy et al.
9,660,398 B2 * 5/2017 Purdy .................. H01R 9/0521
9,680,263 B2 * 6/2017 Purdy .................... H01R 24/40
10,290,958 B2 5/2019 Burris
10,862,251 B2 * 12/2020 Purdy ................ H01R 13/6592
10,931,068 B2 2/2021 Purdy et al.
2002/0013088 A1 1/2002 Rodrigues et al.
2002/0038720 A1 4/2002 Kai et al.
2003/0068924 A1 4/2003 Montena
2003/0214370 A1 11/2003 Allison et al.
2003/0224657 A1 12/2003 Malloy
2004/0013096 A1 1/2004 Marinier et al.
2004/0077215 A1 4/2004 Palinkas et al.
2004/0102089 A1 * 5/2004 Chee .................... H01R 9/0518 439/578
2004/0209516 A1 10/2004 Burris et al.
2004/0219833 A1 11/2004 Burris et al.
2004/0229504 A1 11/2004 Liu
2005/0042919 A1 2/2005 Montena
2005/0208827 A1 9/2005 Burris et al.
2005/0233636 A1 10/2005 Rodrigues et al.
2006/0014426 A1 1/2006 Montena
2006/0099853 A1 5/2006 Sattele et al.
2006/0110977 A1 * 5/2006 Matthews ............ H01R 9/0524 439/578
2006/0154519 A1 7/2006 Montena
2006/0166552 A1 7/2006 Bence et al.
2006/0205272 A1 9/2006 Rodrigues
2006/0276079 A1 12/2006 Chen
2007/0026734 A1 2/2007 Bence et al.
2007/0049113 A1 3/2007 Rodrigues et al.
2007/0123101 A1 5/2007 Palinkas
2007/0155232 A1 5/2007 Burris et al.
2007/0175027 A1 8/2007 Khemakhem et al.
2007/0232088 A1 10/2007 Burris et al.
2007/0243759 A1 10/2007 Rodrigues et al.
2007/0243762 A1 10/2007 Burke et al.
2008/0102696 A1 5/2008 Montena
2008/0192674 A1 8/2008 Wang et al.
2008/0225783 A1 9/2008 Wang et al.
2008/0248689 A1 10/2008 Montena
2008/0289470 A1 11/2008 Aston
2009/0017803 A1 1/2009 Brilhart et al.
2009/0029590 A1 1/2009 Sykes et al.
2009/0098770 A1 4/2009 Bence et al.
2009/0176396 A1 7/2009 Mathews
2010/0055978 A1 3/2010 Montena
2010/0081321 A1 4/2010 Malloy et al.
2010/0081322 A1 4/2010 Malloy et al.
2010/0105246 A1 4/2010 Burris et al.
2010/0233901 A1 9/2010 Wild et al.
2010/0233902 A1 9/2010 Youtsey
2010/0255720 A1 10/2010 Radzik et al.
2010/0255721 A1 10/2010 Purdy et al.
2010/0279548 A1 11/2010 Montena et al.
2010/0297871 A1 11/2010 Haube
2010/0297875 A1 11/2010 Purdy et al.
2011/0021072 A1 1/2011 Purdy
2011/0027039 A1 2/2011 Blair
2011/0053413 A1 3/2011 Mathews
2011/0086543 A1 4/2011 Alrutz et al.
2011/0111623 A1 5/2011 Burris et al.
2011/0117774 A1 5/2011 Malloy et al.
2011/0143567 A1 6/2011 Purdy et al.
2011/0230089 A1 9/2011 Amidon et al.
2011/0230091 A1 9/2011 Krenceski et al.
2011/0250789 A1 10/2011 Burris et al.
2012/0021642 A1 1/2012 Zraik
2012/0040537 A1 2/2012 Burris

(56) References Cited

U.S. PATENT DOCUMENTS

| | | | |
|---|---|---|---|
| 2012/0045933 A1 | 2/2012 | Youtsey | |
| 2012/0094530 A1 | 4/2012 | Montena | |
| 2012/0094532 A1 | 4/2012 | Montena | |
| 2012/0122329 A1 | 5/2012 | Montena | |
| 2012/0129387 A1 | 5/2012 | Holland et al. | |
| 2012/0145454 A1 | 6/2012 | Montena | |
| 2012/0171894 A1 | 7/2012 | Malloy et al. | |
| 2012/0196476 A1 | 8/2012 | Haberek et al. | |
| 2012/0202378 A1 | 8/2012 | Krenceski et al. | |
| 2012/0214342 A1 | 8/2012 | Mathews | |
| 2012/0222302 A1 | 9/2012 | Purdy et al. | |
| 2012/0225581 A1 | 9/2012 | Amidon et al. | |
| 2012/0252263 A1 | 10/2012 | Ehret et al. | |
| 2012/0270441 A1 | 10/2012 | Bence et al. | |
| 2013/0005180 A1 | 1/2013 | Malloy et al. | |
| 2013/0034983 A1 | 2/2013 | Purdy et al. | |
| 2013/0065433 A1 | 3/2013 | Burris | |
| 2013/0065435 A1 | 3/2013 | Purdy et al. | |
| 2013/0072057 A1 | 3/2013 | Burris | |
| 2013/0072059 A1 | 3/2013 | Purdy et al. | |
| 2013/0102188 A1 | 4/2013 | Montena | |
| 2013/0102189 A1 | 4/2013 | Montena | |
| 2013/0102190 A1 | 4/2013 | Chastain et al. | |
| 2013/0137299 A1 | 5/2013 | Chastain et al. | |
| 2013/0164962 A1 | 6/2013 | Shaw | |
| 2013/0164975 A1 | 6/2013 | Blake et al. | |
| 2013/0171869 A1 | 7/2013 | Chastain et al. | |
| 2013/0171870 A1 | 7/2013 | Chastain et al. | |
| 2013/0183857 A1 | 7/2013 | Ehret et al. | |
| 2013/0224995 A1 | 8/2013 | Montena | |
| 2013/0237089 A1 | 9/2013 | Lu | |
| 2013/0323967 A1 | 12/2013 | Wood | |
| 2013/0337683 A1 | 12/2013 | Chastain et al. | |
| 2014/0051285 A1 | 2/2014 | Raley et al. | |
| 2015/0194747 A1 | 7/2015 | Shaw | |
| 2015/0295331 A1* | 10/2015 | Burris | H01R 9/05 439/578 |

FOREIGN PATENT DOCUMENTS

| | | | |
|---|---|---|---|
| CN | 1302101 | A | 7/2001 |
| CN | 1383594 | A | 12/2002 |
| CN | 101060690 | A | 10/2007 |
| CN | 201149936 | Y | 11/2008 |
| CN | 201149937 | Y | 11/2008 |
| CN | 201178228 | Y | 1/2009 |
| CN | 101944688 | A | 1/2011 |
| CN | 201904508 | U | 7/2011 |
| CN | 102570073 | A | 7/2012 |
| DE | 47931 | C | 10/1888 |
| DE | 102289 | C | 7/1897 |
| DE | 1117687 | B | 11/1961 |
| DE | 1191880 | B | 4/1965 |
| DE | 1515398 | B1 | 4/1970 |
| DE | 2225764 | A1 | 12/1972 |
| DE | 2221936 | A1 | 11/1973 |
| DE | 2261973 | A1 | 6/1974 |
| DE | 3211008 | A1 | 10/1983 |
| DE | 9001608.4 | U1 | 5/1990 |
| DE | 4439852 | A1 | 5/1996 |
| DE | 19957518 | A1 | 9/2001 |
| EP | 0072104 | A1 | 2/1983 |
| EP | 0116157 | A1 | 8/1984 |
| EP | 0167738 | A2 | 1/1986 |
| EP | 0265276 | A2 | 4/1988 |
| EP | 0428424 | A2 | 5/1991 |
| EP | 1191268 | A1 | 3/2002 |
| EP | 1501159 | A1 | 1/2005 |
| EP | 1548898 | A1 | 6/2005 |
| EP | 1701410 | A2 | 9/2006 |
| EP | 2378614 | A1 | 10/2011 |
| EP | 2436088 | B1 | 4/2015 |
| FR | 2232846 | A1 | 1/1975 |
| FR | 2234680 | A2 | 1/1975 |
| FR | 2312918 | A1 | 12/1976 |
| FR | 2462798 | A1 | 2/1981 |
| FR | 2494508 | A1 | 5/1982 |
| GB | 589697 | A | 6/1947 |
| GB | 1087228 | A | 10/1967 |
| GB | 1270846 | A | 4/1972 |
| GB | 1401373 | A | 7/1975 |
| GB | 2019665 | A | 10/1979 |
| GB | 2079549 | A | 1/1982 |
| GB | 2252677 | A | 8/1992 |
| GB | 2264201 | A | 8/1993 |
| GB | 2331634 | A | 5/1999 |
| GB | 2477479 | B | 11/2011 |
| JP | 3074864 | U | 1/2001 |
| JP | 2001102299 | A | 4/2001 |
| JP | 2002015823 | A | 1/2002 |
| JP | 2002075556 | A | 3/2002 |
| JP | 3280369 | B2 | 5/2002 |
| JP | 4503793 | B2 | 7/2010 |
| KR | 100622526 | B1 | 9/2006 |
| TW | 427044 | B | 3/2001 |
| WO | 8700351 | A1 | 1/1987 |
| WO | 0186756 | A1 | 11/2001 |
| WO | 02069457 | A1 | 9/2002 |
| WO | 2004013883 | A2 | 2/2004 |
| WO | 2006081141 | A1 | 8/2006 |
| WO | 2008051740 | A2 | 5/2008 |
| WO | 2010135181 | A2 | 11/2010 |
| WO | 2011128665 | A1 | 10/2011 |
| WO | 2011128666 | A1 | 10/2011 |
| WO | 2012061379 | A2 | 5/2012 |

OTHER PUBLICATIONS

Arris Group Inc., "Digicon AVL—Anti-Vibration, Locking F-Connectors," Nov. 12, 2009, 3 pages, retrieved from the internet on Apr. 22, 2010, <URL: http://www.arrisi.com/special/digiconAVL.asp>.
ASME 818.21.1-1999 (Revision of ASME 818.21.1-1994), "Lock Washers" (Inch Series), Feb. 1, 2000, 28 pages.
Australian Examination Report issued Aug. 29, 2019, in Australian Application No. 218206740, 5 pages.
Australian Examination Report No. 1 issued May 12, 2015, in Australian Patent Application No. 2010249855, 3 pages.
Brazilian Office Action issued Apr. 27, 2021, in Brazilian Application No. PI-1009624-8, with English translation, 8 pages.
Brazilian Office Action issued Sep. 1, 2020, in Brazilian Application No. PI-1009624-8, with English translation, 10 pages.
Chinese Office Action issued Mar. 26, 2021, in Chinese Application No. 201580012516.0, with English summary, 8 pages.
Chinese Evaluation Report of Utility Model Patent dated Sep. 2, 2011 for Patent No. ZL2010202597847, (Chinese version with English Translation, 18 pages total).
European Office Action issued Mar. 31, 2022, in European Application No. 19150731.8, 5 pages.
Extended European Search Report dated Sep. 25, 2014, for European Application No. 14166195.6, 6 pages.
Extended European Search Report dated May 15, 2019, in European Application No. 19150731.8, 7 pages.
Great Britain Examination Report under Section 18(3) issued Jun. 23, 2011, in Great Britain Application No. GB1109575.9. 3 pages.
India Examination Report issued May 15, 2018, in India Application No. 10172/DELNP/2011, with English translation, 6 pages.
International Preliminary Report on Patentability issued Jul. 21, 2016, in International Application No. PCT/US2015/010431, 6 pages.
International Search Report and Written Opinion issued Apr. 30, 2012, in PCT/US2011/057939, 8 pages.
International Search Report and Written Opinion issued Nov. 30, 2010, in PCT/US2010/034870, 7 pages.
Korean Office Action dated Jun. 17, 2016, issued in Korean Patent Application No. 10 2011 7030801, with English translation, 6 pages.
Korean Office Action issued Aug. 19, 2016, in Korean Application No. 10-2015-7016052, with English translation, 5 pages.

(56) References Cited

OTHER PUBLICATIONS

U.S. Final Office Action issued Oct. 25, 2011, in U.S. Appl. No. 13/033,127, 20 pages.
U.S. Interview Summary issued Jun. 21, 2011, in U.S. Appl. No. 13/033,127, 3 pages.
U.S. Applicant-Initiated Interview Summary issued Feb. 24, 2012, in U.S. Appl. No. 13/033,127, 2 pages.
U.S. Applicant-Initiated Interview Summary issued Jun. 14, 2012, issued in U.S. Appl. No. 12/633,792, 2 pages.
U.S. Notice of Allowance issued Feb. 24, 2012, in U.S. Appl. No. 13/033,127, filed Feb. 23, 2011.
U.S. Notice of Allowance issued Jan. 24, 2013, in U.S. Appl. No. 13/072,350, 7 pages.
U.S. Notice of Allowance issued Jun. 25, 2012, in U.S. Appl. No. 12/633,792, 10 pages.
U.S. Notice of Allowance issued Mar. 20, 2012, in U.S. Appl. No. 13/117,843, 8 pages.
U.S. Office Action issued Apr. 12, 2013, in U.S. Appl. No. 13/712,498, 15 pages.
U.S. Office Action issued Feb. 20, 2013, in U.S. Appl. No. 13/726,349, 5 pages.
U.S. Office Action issued Feb. 20, 2013, in U.S. Appl. No. 13/726,339, 5 pages.
U.S. Office Action issued Feb. 20, 2013, in U.S. Appl. No. 13/726,356, 5 pages.
U.S. Office Action issued Jun. 11, 2013, in U.S. Appl. No. 13/860,964, 5 pages.
U.S. Office Action issued Jun. 2, 2011, in U.S. Appl. No. 13/033,127, 9 pages.
U.S. Office Action issued Mar. 11, 2013, in U.S. Appl. No. 13/726,347, 5 pages.
U.S. Office Action issued Mar. 29, 2013, in U.S. Appl. No. 13/712,470, 18 pages.
U.S. Office Action issued Mar. 6, 2013, in U.S. Appl. No. 13/726,330, 5 pages.
U.S. Office Action issued Oct. 24, 2011, in U.S. Appl. No. 12/633,792, 20 pages.
U.S. Office Action issued Sep. 25, 2015, in U.S. Appl. No. 14/104,463, 30 pages.
U.S Office Action Response dated Jun. 24, 2011, filed in U.S. Appl. No. 13/033,127, 11 pages.
U.S. Office Action Response filed Feb. 24, 2012, in U.S. Appl. No. 12/633,792, 20 pages.
U.S. Applicant-Initiated Interview Summary issued Jan. 26, 2012, in U.S. Appl. No. 13/033,127, 2 pages.
Purdy, "Coaxial Cable Continuity Connector," U.S. Appl. No. 12/472,368, filed May 26, 2009, 47 pages.
Haube, "Click-Tight Coaxial Cable Continuity Connector," U.S. Appl. No. 12/783,131 filed May 19, 2010, 43 pages.
Purdy, "Coaxial Cable Continuity Connector," U.S. Appl. No. 12/900,140 filed Oct. 7, 2010, 52 pages.
Purdy et al., "Coaxial Cable Connector Having Electrical Continuity Member," U.S. Appl. No. 13/033,127 filed Feb. 23, 2011, 117 pages.
Amidon et al., "Coaxial Cable Connector Having Electrical Continuity Member," U.S. Appl. No. 13/072,350, filed Mar. 25, 2011, 215 pages.
Amidon et al., "Coaxial Cable Connector Having Electrical Continuity Member," U.S. Appl. No. 13/461,779, filed May 1, 2012, 127 pages.
Purdy et al., "Coaxial Cable Connector Having Electrical Continuity Member," U.S. Appl. No. 13/652,029, filed Oct. 15, 2012, 114 pages.
Purdy et al., "Coaxial Cable Connector Having Electrical Continuity Member," U.S Appl. No. 13/652,124 filed Oct. 15, 2012, 132 pages.
Request for Ex Parte Reexamination of U.S. Pat. No. 7,114,990 B2, U.S. Reexamination Control No. U.S. Appl. No. 90/012,749, filed Dec. 21, 2012, 159 pages.
U.S. Office Action in Ex Parte Reexamination issued Sep. 4, 2012, in U.S. Reexamination Control No. U.S. Appl. No. 90/012,749, 43 pages.
Request for Ex Parte Reexamination of U.S. Pat. No. 8,172,612, U.S. Reexamination Control No. U.S. Appl. No. 90/012,835, filed Apr. 11, 2013, 214 pages.
Corrected Request for Ex Parte Reexamination of U.S. Patent No. 8,172,612, U.S. Reexamination Control No. U.S. Appl. No. 90/012,300, filed Jun. 29, 2012, 59 pages.
Statement Under 37 CFR 3.73(c) filed Jan. 29, 2013, in U.S. Reexamination Control No. U.S. Appl. No. 90/012,300, 3 pages.
Request for Inter Partes Reexamination of U.S. Patent No. 8,192,237 under 35 U.S.C. §§ 311-318 and 37 C.F.R. § 1.902 et. seq., U.S. Reexamination Control No. U.S. Appl. No. 95/002,400, filed Sep. 15, 2012, 136 pages.
Request for Inter Partes Reexamination of U.S. Patent No. 8,192,237 under 35 U.S.C. §§ 311-318 and 37 C.F.R. § 1.902 et. seq., Exhibit A, U.S. Reexamination Control No. U.S. Appl. No. 95/002,400, filed Sep. 15, 2012, 70 pages.
Request for Inter Partes Reexamination of U.S. Patent No. 8,192,237 under 35 U.S.C. §§ 311-318 and 37 C.F.R. § 1.902 et. seq., Exhibit B, U.S. Reexamination Control No. U.S. Appl. No. 95/002,400, filed Sep. 15, 2012, 10 pages.
Request for Inter Partes Reexamination of U.S. Patent No. 8,192,237 under 35 U.S.C. §§ 311-318 and 37 C.F.R. § 1.902 et. seq., Exhibit C, U.S. Reexamination Control No. U.S. Appl. No. 95/002,400, filed Sep. 15, 2012, 12 pages.
Request for Inter Partes Reexamination of U.S. Patent No. 8,192,237 under 35 U.S.C. §§ 311-318 and 37 C.F.R. § 1.902 et. seq., Exhibit D, U.S. Reexamination Control No. U.S. Appl. No. 95/002,400, filed Sep. 15, 2012, 26 pages.
Request for Inter Partes Reexamination of U.S. Patent No. 8,192,237 under 35 U.S.C. §§ 311-318 and 37 C.F.R. § 1.902 et. seq., Exhibit O, U.S. Reexamination Control No. U.S. Appl. No. 95/002,400, filed Sep. 15, 2012, 136 pages.
Transmittal of Order Granting/Denying Request for Inter Partes Reexamination issued Dec. 11, 2012, U.S. Reexamination Control No. U.S. Appl. No. 95/002,400, 22 pages.
Transmittal of Office Action in Inter Partes Reexamination issued Dec. 11, 2012, U.S. Reexamination Control No. U.S. Appl. No. 95/002,400, 57 pages.
Transmittal of Action Closing Prosecution issued May 21, 2014, U.S. Reexamination Control No. U.S. Appl. No. 95/002,400, 48 pages.
Transmittal of Materials Subject to Protective Order filed Jun. 23, 2014, U.S. Reexamination Control No. U.S. Appl. No. 95/002,400, 5 pages.
Transmittal of Right of Appeal Notice issued Aug. 5, 2015, U.S. Reexamination Control No. U.S. Appl. No. 95/002,400, 57 pages.
IPR2013-00340: Decision dated Nov. 26, 2013 (Paper 18); Institution of Inter Partes Review; Appeal from the United States Patent and Trademark Office, Patent Trial and Appeal Board; Case No. IPR2013-00340, 20 pages.
IPR2013-00340: Final Written Decision dated Nov. 21, 2014 (Paper 79); Appeal from the United States Patent and Trademark Office, Patent Trial and Appeal Board; Case No. IPR2013-00340, 56 pages.
IPR2013-00342: Decision dated Nov. 26, 2013 (Paper 14); Institution of Inter Partes Review; Appeal from the United States Patent and Trademark Office, Patent Trial and Appeal Board; Case No. IPR2013-00342, 20 pages.
IPR2013-00342: Declaration of Charles A. Eldering, Ph.D. dated Mar. 26, 2014; Appeal from the United States Patent and Trademark Office, Patent Trial and Appeal Board, Case No. IPR2013-00342, 31 pages.
IPR2013-00342: Final Written Decision dated Nov. 21, 2014 (Paper 49); Appeal from the United States Patent and Trademark Office, Patent Trial and Appeal Board; Case No. IPR2013-00342, 32 pages.
IPR2013-00342: Brief of Appellant; Appeal from the United States Patent and Trademark Office, Patent Trial and Appeal Board, Case No. IPR2013-00342; May 26, 2015, 142 pages.
IPR2013-00342: Brief of Appellee; Appeal from the United States Patent and Trademark Office, Patent Trial and Appeal Board, Case No. IPR2013-00342; Aug. 10, 2015, 44 pages.

(56) References Cited

OTHER PUBLICATIONS

IPR2013-00343: Decision dated Dec. 5, 2013 (Paper 14); Institution of Inter Partes Review; Appeal from the United States Patent and Trademark Office, Patent Trial and Appeal Board; Case No. IPR2013-00343, 26 pages.
IPR2013-00343: Judgment - Request for Adverse Judgment dated Apr. 15, 2014 (Paper 27); Appeal from the United States Patent and Trademark Office, Patent Trial and Appeal Board; Case No. IPR2013-00343, 3 pages.
IPR2013-00343: Inter Partes Review Case IPR2013-00343- U.S. Pat. No. 8,323,060 (Claims 1-9), Final Written Decision, Paper 79, Entered on Nov. 21, 2014, 56 pages.
IPR2013-00345: Decision dated Dec. 5, 2013 (Paper 15); Institution of Inter Partes Review; Appeal from the United States Patent and Trademark Office, Patent Trial and Appeal Board; Case No. IPR2013-00345, 27 pages.
IPR2013-00345: Final Written Decision dated Nov. 21, 2014 (Paper 76); Appeal from the United States Patent and Trademark Office, Patent Trial and Appeal Board; Case No. IPR2013-00345, 57 pages.
IPR2013-00346: Decision dated Nov. 26, 2013 (Paper 15); Institution of Inter Partes Review; Appeal from the United States Patent and Trademark Office, Patent Trial and Appeal Board; Case No. IPR2013-00346, 18 pages.
IPR2013-00346: Final Written Decision dated Nov. 21, 2014 (Paper 76); Appeal from the United States Patent and Trademark Office, Patent Trial and Appeal Board; Case No. IPR2013-00346, 51 pages.
IPR2013-00347: Decision dated Nov. 26, 2013 (Paper 15); Institution of Inter Partes Review; Appeal from the United States Patent and Trademark Office, Patent Trial and Appeal Board; Case No. IPR2013-00347, 16 pages.
IPR2013-00347: Final Written Decision dated Nov. 21, 2014 (Paper 77); Appeal from the United States Patent and Trademark Office, Patent Trial and Appeal Board; Case No. IPR2013-00347, 44 pages.
Ipr2013-00340, IPR2013-00345: Brief of Appellant; Appeal from the United States Patent and Trademark Office, Patent Trial and Appeal Board, Case Nos. IPR2013-00340, IPR2013-00345, IPR2013-00346, and IPR2013-00347; May 26, 2015, 486 pages.
Ipr2013-00340, IPR2013-00345, IPR2013-00346 and IPR2013-00347: Brief of Appellee; Appeal from the United States Patent and Trademark Office, Patent Trial and Appeal Board, Case Nos. IPR2013-00340, IPR2013-00345, IPR2013-00346 and IPR2013-00347; Aug. 10, 2015, 81 pages.
Ipr2013-00340, IPR2013-00345, IPR2013-00346 and IPR2013-00347: Declaration of Charles A. Eldering, Ph.D. dated Mar. 26, 2014; Appeal from the United States Patent and Trademark Office, Patent Trial and Appeal Board, Case Nos. IPR2013-00340, IPR2013-00345, IPR2013-00346 and IPR2013-00347, 63 pages.
Ipr2013-00340, IPR2013-00345, IPR2013-00346 and IPR2013-00347: Declaration of Dr. Roberts. Mroczkowski Comparing Patent Owner and Petitioner's Connectors dated May 16, 2014; Appeal from the United States Patent and Trademark Office, Patent Trial and Appeal Board, Case Nos. IPR2013-00340, IPR2013-00345, IPR2013-00346 and IPR2013-00347, 14 pages.
IPR2014-00440: Petition for Inter Partes Review of U.S. Pat. No. 8,597,041 Under 35 U.S.C. §§ 311-319 and 37 C. F.R. § 42.100, Appeal from the United States Patent and Trademark Office, Patent Trial and Appeal Board; Case No. IPR2014-00440, Feb. 18, 2014, 72 pages.
IPR2014-00440: Decision, Institution of Inter Partes Review (Paper 10), Aug. 19, 2014, Appeal from the United States Patent and Trademark Office, Patent Trial and Appeal Board, Case No. IPR2014-00440, 23 pages.
IPR2014-00440: Patent Owner Response, Nov. 12, 2014, Appeal from the United States Patent and Trademark Office, Patent Trial and Appeal Board, Case No. IPR2014-00440, 67 pages.
IPR2014-00440: Petitioner Reply to Patent Owner Response, Feb. 4, 2015, Appeal from the United States Patent and Trademark Office, Patent Trial and Appeal Board, Case No. IPR2014-00440, 32 pages.
IPR2014-00441. Petition for Inter Partes Review of U.S. Pat. No. 8,562,366 (Claims 31, 37, 39, 41, 42, 55, and 56) Under 35 U.S.C. §§ 311-319 and 37 C.F.R. § 42.100, Feb. 18, 2014, Appeal from the United States Patent and Trademark Office, Patent Trial and Appeal Board, Case No. IPR2014-00441, 69 pages.
IPR2014-00441: Decision, Institution of Inter Partes Review (Paper 10), Aug. 19, 2014, Appeal from the United States Patent and Trademark Office, Patent Trial and Appeal Board; Case No. IPR2014-00441, 29 pages.
IPR2014-00441: Patent Owner Response, Nov. 12, 2014, Appeal from the United States Patent and Trademark Office, Patent Trial and Appeal Board; Case No. IPR2014-00441, 50 pages.
IPR2014-00441: Declaration of Charles A. Eldering, Ph.D. dated Nov. 14, 2014, Appeal from the United States Patent and Trademark Office, Patent Trial and Appeal Board, Case No. IPR2014-00441, 65 pages.
IPR2014-00441. Petitioner Reply to Patent Owner Response, Feb. 4, 2015, Appeal from the United States Patent and Trademark Office, Patent Trial and Appeal Board, Case No. IPR2014-00441, 26 pages.
Ipr2014-00440, IPR2014-00441 and IPR2014-00736: Decision Granting Owner's Motion to Dismiss Petitions for Failure to Name All Real Parties-In-Interest (Paper 66), Aug. 18, 2015, Appeal from the United States Patent and Trademark Office, Patent Trial and Appeal Board, Case Nos. IIPR2014-00440, IPR2014-00441 and IPR2014-00736, 27 pages.
Ipr2014-00440, IPR2014-00441 and IPR2014-00736: Decision Granting Patent Owner's Motion to Dismiss Petitions for Failure to Name All Real Parties-In-Interest (Paper 68), Aug. 18, 2015, Appeal from the United States Patent and Trademark Office, Patent Trial and Appeal Board, Case Nos. IPR2014-00440, IPR2014-00441 and IPR2014-00736, 27 pages.
Declaration of Michael G. Littman, Ph.D. dated Sep. 12, 2012, Inter Partes Reexamination (filed Sep. 13, 2012) of Purdy et al. US Patent No. 8, 192,237 issued Jun. 5, 2012, 228 pages.
Defendant Corning Gilbert Inc.'S Supplemental Disclosure of Non-Infringement, Invalidity, and Unenforceability Contentions, US DS-NDNY Civil Action No. 5:12-cv-911-GLS-DEP, Feb. 11, 2013, including Appendices A-C3, 90 pages.
Appendices C4-9 and D1-D2, Defendant Corning Gilbert Inc.'S Supplemental Disclosure of Non- Infringement, Invalidity, and Unenforceability Contentions, US DS-NDNY Civil Action No. 5:12-CV-911-GLS-DEP, Feb. 11, 2013, 109 pages.
Appendices D2-D6, Defendant Corning Gilbert Inc.'S Supplemental Disclosure of Non- Infringement, Invalidity, and Unenforceability Contentions, US DS-NDNY Civil Action No. 5:12-CV-911-GLS-DEP, Feb. 11, 2013, 129 pages.
Declaration of Ronald P. Locati, Exhibit L—Mathews Opposition 2 (for Interference-in-Fact) filed May 6, 2009 (Interference No, 105,680 (MX)), USDC-NDNY Civil Action No. 5:13-cv-01310, 37 pages.
*PPC Broadband, Inc.* d/b/a PPC, v. *Corning Gilbert, Inc.*, (fomerly known as John Mezzalingua Associates, Inc.), USDC, Northern District of New York, Case No. 5:12-cv-00911-GLS-DEP, Second Amended Complaint, Documents 24,24-1,24-2,24-3,24-4, Filed Dec. 4, 2012, 295 pages.
TECHSPEC1A: "3rd Generation Partnership Project, Technical Specification Group Radio Access Network, Requirements for Evolved Utra (E-Utra) and Evolved Utran (E-Utran) (Release 7)," Technical Report, 3GPP TR 125.913 V7.3.0, Mar. 2006, 18 pages.
TECHSPEC2A: "3rd Generation Partnership Project, Technical Specification Group Radio Access Network, Evolved Universal Terrestrial Radio Access (E-UTRA) and Evolved Universal Terrestrial Radio Access Network (E-UTRAN), Overall description, Stage 2 (Release 8)," Technical Specification, 3GPP TS 36.300 V8.5.0, May 2008, 138 pages.
TECHSPEC3A: "3rd Generation Partnership Project, Technical Specification Group Radio Access Network, Evolved Universal Terrestrial Radio Access (E-UTRA) Medium Access Control (MAC) protocol specification (Release 8)," Technical Specification, 3GPP TS 36.321 V8.2.0, May 2008, 35 pages.
TECHSPEC4A: "3rd Generation Partnership Project, Technical Specification Group Radio Access Network, Evolved Universal

(56) References Cited

OTHER PUBLICATIONS

Terrestrial Radio Access (E-UTRA), Physical layer procedures (Release 8)," Technical Specification, 3GPP TS 36.213 V8.4.0, Sep. 2008, 62 pages.
TECHSPEC5A: Society of Cable Telecommunications Engineers, Engineering Committee, Interface Practices Subcommittee, American National Standard, ANSI/SCTE 01 2006; "Specification for "F" Port, Female, Outdoor," Jan. 2006, 9 pages.
TECHSPEC6A: Society of Cable Telecommunications Engineers, Engineering Committee, Interface Practices Subcommittee; American National Standard; ANSI/SCTE 02 2006, "Specification for "F" Port, Female, Indoor," Feb. 2006, 9 pages.
European Telecommunications Standards Institute (ESTI), "3rd Generation Partnership Project, Evolved Universal Terrestrial Radio Access (E-UTRA), Multiplexing and channel coding," Technical Specification, 3 GPP TS 36.212 Version 8.3.0 Release 8, Nov. 2008, 50 pages.
Defendant Corning Gilbert Inc.'S Disclosure of Non-Infringement, Invalidity, and Unenforceability Contentions, US DC-NDNY Civil Action No. 5:12-cv-911-GLS-DEP, Nov. 19, 2012, including Exhibits A-D, 231 pages.
Defendant Corning Gilbert Inc.'S Supplemental Disclosure of Non-Infringement, Invalidity, and Unenforceability Contentions, US DC-NDNY Civil Action No. 5:12-cv-911-GLS-DEP, Feb. 11, 2013, including Appendices A-C3, 90 pages.
Appendices C4-9 and D1-D2, Defendant Corning Gilbert Inc.'S Supplemental Disclosure of Non-Infringement, Invalidity, and Unenforceability Contentions, US DC-NDNY Civil Action No. 5:12-cv-911-GLS-DEP, Feb. 11, 2013, 109 pages.
Appendices D2-D6, Defendant Corning Gilbert Inc.'S Supplemental Disclosure of Non-Infringement, Invalidity, and Unenforceability Contentions, US DC-NDNY Civil Action No. 5:12- CV-911-GLS-DEP, Feb. 11, 2013, 129 pages.
Declaration of Ronald P. Locati, Feb. 18, 2014, U.S. District Court for the Northern District of New York, *PPC Broadband, Inc.* d/b/a PPC, Plaintiff, vs. *Corning Gilbert Inc., Defendant*, Civil Action No. 5:13-cv-01310, 35 pages.
Declaration of Ronald P. Locati, Exhibit A—Curriculum Vitae of Ronald P. Locati filed Feb. 18, 2014, USDC-NDNY Civil Action No. 5:13-cv-01310, 7 pages.
Declaration of Ronald P. Locati, Exhibit B—Material Considered filed Feb. 18, 2014, USDC-NDNY Civil Action No. 5:13-cv-01310, 4 pages.
Declaration of Ronald P. Locati, Exhibit C—Petition for Inter Partes Review of U.S. Pat. No. 8,323,060 filed Jun. 10, 2013, USDC-NDNY Civil Action No. 5:13-cv-01310, 59 pages.
Declaration of Ronald P. Locati, Exhibit E—Judgment—Request for Adverse—Bd. R. 127(b) (Paper No. 111) entered Apr. 9, 2010, USDC-NDNY Civil Action No. 5:13-cv-01310, 4 pages.
Declaration of Ronald P. Locati, Exhibit I—Decision, Institution of Inter Partes Review (Paper 18) entered Nov. 26, 2013, USDC-NDNY Civil Action No. 5:13-cv-01310, 21 pages.
Declaration of Ronald P. Locati, Exhibit J—Declaration of Ronald P. Locati for Inter Partes Review of U.S. Pat. No. 8,597,041 dated Feb. 18, 2014, USDC-NDNY Civil Action No. 5:13-cv-01310, 92 pages.
Declaration of Ronald P. Locati, Exhibit K—Declaration of Ronald P. Locati for Inter Partes Review of U.S. Pat. No. 8,562,366 dated Feb. 18, 2014, USDC-NDNY Civil Action No. 5:13-cv-01310, 121 pages.
Declaration of Ronald P. Locati, Exhibit L—Mathews Opposition 2 (for Interference-in-Fact) filed May 6, 2009 (Interference No, 105,680 (MX)), USDC-NDCY Civil Action No. 5:13-cv-01310, 37 pages.
Report and Recommendation, issued Jul. 9, 2015, U.S. District Court for the Northern District of New York, *PPC Broadband, Inc.*, Plaintiff, vs. *Corning Optical Communications RF, LLC*, Defendant, Civil Action No. 5:13-cv-01310, 44 pages.
Defendant Corning Optical Commuications RF, LLC's Disclosure of Non-Infringement, Invalidity and Unenforceability Contentions (with Appendices 1A, 1B and 2), filed Jan. 8, 2014, U.S. District Court for the Northern District of New York, *PPC Broadband, Inc.*, Plaintiff, vs. *Corning Optical Communications RF, LLC*, Defendant, Civil Action No. 14-cv-01170-GLS-DEP, 95 pages.
Report and Recommendation, issued Jul. 9, 2015, U.S. District Court for the Northern District of New York, *PPC Broadband, Inc.*, Plaintiff, vs. *Corning Optical Communications RF, LLC*, Defendant, Civil Action No. 5:14-cv-01170-GLS-DEP, 62 pages.
Exhibit P2—Patent Owner's Response to the Action Closing Prosecution in the Inter Partes Reexamination of the '237 Patent dated Jun. 23, 2014 (Redacted Version), Inter Partes Reexamination of U.S. Pat. No. 8,192,237, Control No. U.S. Appl. No. 95/002,400, 43 pages.
Appendix E—Request for Inter Partes Reexamination of U.S. Pat. No. 8,192,237 Under 35 U.S.C. §§ 311-318 and 37 C.F.R. § 1.902 et. seq. dated Sep. 15, 2012, 137 pages.
Transmittal of Communication to Third Party Requester—Right of Appeal Notice issued Aug. 5, 2015, Inter Partes Reexamination Control No. U.S. Appl. No. 95/002,400, 57 pages.
Federal Circuit Appeal 2015-1364, Brief of Appellant PPC Broadband, Inc., May 26, 2015.
Federal Circuit Appeals 2015-1361, 2015-1366, 2015-1368 and 2015-1369, Brief of Appellant PPC Broadband, Inc., May 26, 2015.
*John Mezzalingua Associates, Inc.*, d/b/a PPC, v. *Corning Gilbert, Inc.*, USDC, Northern District of New York, Case No. 5:12-cv-00911-LEK-DEP, Complaint, Document 1, Filed Jun. 5, 2012, 76 pages.
*John Mezzalingua Associates, Inc.*, d/b/a PPC, v. *Corning Gilbert, Inc.*, Northern District of New York, Case No. 5:12-cv-00911-LEK-DEP, Defendant Corning Gilbert Inc.'s Answer & Counterclaim to PPC's Complaint, Document 8, Filed Oct. 1, 2012, 12 pages.
*John Mezzalingua Associates, Inc.*, d/b/a PPC, v. *Corning Gilbert, Inc.*, Northern District of New York, Case No. 5:12-cv-00911-LEK-DEP, Amended Complaint, Documents 15, 15-1, 15-2, Filed Oct. 16, 2012, 149 pages.
*John Mezzalingua Associates, Inc.*, d/b/a PPC, v. *Corning Gilbert, Inc.*, Northern District of New York, Case No. 5:12-CV-00911-LEK-DEP, Defendant Corning Gilbert Inc.'s Answer & Counterclaim to PPC's Amended Complaint, Document 17, Filed Oct. 29, 2012, 16 pages.
*John Mezzalingua Associates, Inc.*, d/b/a PPC, v. *Corning Gilbert, Inc.*, Northern District of New York, Case No. 5:12-cv-00911-GLS-DEP, Reply to Counterclaim, Document 19, Filed Nov. 5, 2012, 4 pages.
*John Mezzalingua Associates, Inc.*, d/b/a PPC, v. *Corning Gilbert, Inc.*, Northern District of New York, Case No. 5:12-cv-00911-GLS-DEP, Stipulation Regarding Amendment of Complaint, Amendment of Caption, and Modification of the Uniform Pretrial Scheduling Order, Documents 22,22-1, Filed Nov. 28, 2012, 14 pages.
*John Mezzalingua Associates, Inc.*, d/b/a PPC, v. *Corning Gilbert, Inc.*, Northern District of New York, Case No. 5:12-cv-00911-GLS-DEP, Stipulation Regarding Amendment of Complaint, Amendment of Caption, and Modification of the Uniform Pretrial Scheduling Order, Document 23, Filed Nov. 29, 2012, 3 pages.
*John Mezzalingua Associates, Inc.*, d/b/a PPC, v. *Corning Gilbert, Inc.*, Northern District of New York, Case No. 5:12-cv-00911-LEK-DEP, Plaintiff's Disclosure of Asserted Claims and Preliminary Infringement Contentions (redacted), Served Oct. 19, 2012, 74 pages.
*John Mezzalingua Associates, Inc.*, d/b/a PPC, v. *Corning Gilbert, Inc.*, Northern District of New York, Case No. 5:12-cv-00911-GLS-DEP, Defendant Corning Gilbert Inc.'s Disclosure of Non-Infringement, Invalidity, and Unenforceability Contentions with Appendices, Dated Nov. 19, 2012, 1095 pages.
*PPC Broadband, Inc.* d/b/a PPC, v. *Corning Gilbert, Inc.*, (formerly known as John Mezzalingua Associates, Inc.), USDC, Northern District of New York, Case No. 5:12-cv-00911-GLS-DEP, Second Amended Complaint, Documents 24,24-1,24-2,24-3,24-4, Filed Dec. 4, 2012, 295 pages.
Defendant Corning Gilbert Inc.'S Disclosure of Non-Infringement, Invalidity, and Unenforceability Contentions (Appendix E), USDC-NDNY Civil Action—No. 5:12-cv-911, Sep. 15, 2012.

(56) References Cited

OTHER PUBLICATIONS

Defendant Corning Gilbert Inc.'S Disclosure of Non-Infringement, Invalidity, and Unenforceability Contentions {Appendix E-Exhibit O), USDC-NDNY Civil Action No. 5:12-cv-911, Oct. 13, 2012.
Defendant Corning Optical Communications RF, LLC's Disclosure of Non-Infringement, Invalidity, and Unenforceability Contentions, USDC-NDNY Civil Action No. 5:14-cv-1170, Jan. 8, 2014.
IPR2013-00340: Inter Partes Review Case IPR2013-00340—U.S. Pat. No. 8,323,060 (Claims 1-9), Nov. 21, 2014.
IPR2013-00342: Inter Partes Review Case IPR2013-00342—U.S. Pat. No. 8,323,060 (Claims 10-25), Oct. 12, 2016.
IPR2013-00343: Inter Partes Review Case IPR2013-00343—U.S. Pat. No. 8,313,353 (Claims 1-6), Jul. 1, 2013.
IPR2013-00345: Inter Partes Review Case IPR2013-00345—U.S. Pat. No. 8,313,353 (Claims 7-27), Mar. 26, 2014.
IPR2013-00346: Inter Partes Review Case IPR2013-00346—U.S. Pat. No. 8,287,320 (Claims 1-8, 10-16, and 18-31), Mar. 26, 2014.
IPR2013-00347. Inter Partes Review Case IPR2013-00347—U.S. Pat. No. 8,287,320 (Claims 9 17 and 32), Mar. 26, 2014.
IPR2014-00440, IPR2014-00441 and IPR2014-00736: Real Parties-In-Interest, Appeal from the United States Patent and Trademark Office, Patent Trial and Appeal Board, Case Nos. IPR2014-00440, IPR2014-00441, IPR2014-00736, Aug. 18, 2015.
Declaration of Dr. Robert S. Mroczkowski for Inter Partes Review of U.S. Pat. No. 8,323,060 {Claims 1-9), dated Jun. 10, 2013, Appeal from the United States Patent and Trademark Office, Patent Trial and Appeal Board, 91 pages.
Declaration of Dr. Robert S. Mroczkowski for Inter Partes Review of U.S. Pat. No. 8,323,060 {Claims 10-25), dated Jun. 10, 2013, Appeal from the United States Patent and Trademark Office, Patent Trial and Appeal Board, 103 pages.
Declaration of Dr. Robert S. Mroczkowski for Inter Partes Review of U.S. Pat. No. 8,313,353 {Claims 1-6), dated Jun. 10, 2013, Appeal from the United States Patent and Trademark Office, Patent Trial and Appeal Board, 91 pages.
Declaration of Dr. Robert S. Mroczkowski for Inter Partes Review of U.S. Pat. No. 8,313,353 {Claims 7-27), dated Jun. 10, 2013, Appeal from the United States Patent and Trademark Office, Patent Trial and Appeal Board, 145 pages.
Declaration of Dr. Robert S. Mroczkowski for Inter Partes Review of U.S. Pat. No. 8,287,320 {Claims 1-8, 10-16 and 18-31), dated Jun. 10, 2013, Appeal from the United States Patent and Trademark Office, Patent Trial and Appeal Board, 248 pages.
Declaration of Dr. Robert S. Mroczkowski for Inter Partes Review of U.S. Pat. No. 8,287,320 {Claims 9, 17 and 32), dated Jun. 10, 2013, Appeal from the United States Patent and Trademark Office, Patent Trial and Appeal Board, 99 pages.
Declaration of Ronald P. Locati for Inter Partes Review of U.S. Pat. No. 8,647,136 {Claims 27, 30 and 34-38), dated Sep. 23, 2015, Appeal from the United States Patent and Trademark Office, Patent Trial and Appeal Board, 104 pages.
Declaration of Ronald P. Locati for Inter Partes Review of U.S. Pat. No. 8,647,136 {Claims 50, 53 and 57-61), dated Sep. 23, 2015, Appeal from the United States Patent and Trademark Office, Patent Trial and Appeal Board, 108 pages.
Declaration of Ronald P. Locati for Inter Partes Review of U.S. Pat. No. 8,562,366, dated Feb. 18, 2014, Appeal from the United States Patent and Trademark Office, Patent Trial and Appeal Board, 120 pages.
Declaration of Ronald P. Locati for Inter Partes Review of U.S. Pat. No. 8,597,041, dated Feb. 18, 2014, Appeal from the United States Patent and Trademark Office, Patent Trial and Appeal Board, 91 pages.
Declaration of Eric Purdy; ITC Inv. No. 337-TA-938; Aug. 12, 2015, 6 Pages.
ITC Inv. No. 337-TA-938: Witness Statement of Michael Lawrence; ITC Inv. No. 337-TA-938; Aug. 14, 2015, 13 pages.
ITC Inv. No. 337-TA-938: Witness Statement of Noah Montena; ITC Inv. No. 337-TA-938; Aug. 14, 2015, 16 pages.
ITC Inv. No. 337-TA-938: Witness Statement of Eric Purdy; ITC Inv. No. 337-TA-938; Aug. 14, 2015, 19 pages.
Expert Report of Ronald P. Locati Regarding Invalidity of U.S. Pat. No. 8,801,448; ITC Inv. No. 337-TA-938; Jun. 19, 2015, 299 pages.
Direct Witness Statement of Ronald P. Locati Regarding Invalidity of U.S. Pat. No. 8,801,448; ITC Inv. No. 337-TA-938; Aug. 14, 2015, 346 pages.
LIT8_Appendix_ABC: *John Mezzalingua Associates, Inc.*, d/b/a PPC, v. *Corning Gilbert, Inc.*, USDC, Northern District of New York, Case No. 5:12-cv-00911-GLS-DEP, Defendant Corning Gilbert Inc.'s Disclosure of Non-Infringement, Invalidity, and Unenforceability Contentions with Appendices A, B and C, Dated Nov. 19, 2012, 55 pages.
LIT8_Appendix_D: *John Mezzalingua Associates, Inc.*, d/b/a PPC, v. *Corning Gilbert, Inc.*, USDC, Northern District of New York, Case No. 5:12-cv-00911-GLS-DEP, Defendant Corning Gilbert Inc.'s Disclosure of Non-Infringement, Invalidity, and Unenforceability Contentions with Appendix D, Dated Nov. 19, 2012, 108 pages.
LIT8_Appendix_E1: *John Mezzalingua Associates, Inc.*, d/b/a PPC, v. *Corning Gilbert, Inc.*, USDC,, Northern District of New York, Case No. 5:12-cv-00911-GLS-DEP, Defendant Corning Gilbert Inc.'s Disclosure of Non-Infringement, Invalidity, and Unenforceability Contentions with Appendix E, Dated Nov. 19, 2012, pp. 1-90.
LIT8_Appendix_E2: *John Mezzalingua Associates, Inc.*, d/b/a PPC, v. *Corning Gilbert, Inc.*, USDC, Northern District of New York, Case No. 5:12-cv-00911-GLS-DEP, Defendant Corning Gilbert Inc.'s Disclosure of Non-Infringement, Invalidity, and Unenforceability Contentions with Appendix E, Dated Nov. 19, 2012, pp. 91-180.
LIT8_Appendix_E3: *John Mezzalingua Associates, Inc.*, d/b/a PPC, v. *Corning Gilbert, Inc.*, USDC, Northern District of New York, Case No. 5:12-cv-00911-GLS-DEP, Defendant Corning Gilbert Inc.'s Disclosure of Non-Infringement, Invalidity, and Unenforceability Contentions with Appendix E, Dated Nov. 19, 2012, pp. 181-271.
LIT8_Appendix_E4: *John Mezzalingua Associates, Inc.*, d/b/a PPC, v. *Corning Gilbert, Inc.*, USDC, Northern District of New York, Case No. 5:12-cv-00911-GLS-DEP, Defendant Corning Gilbert Inc.'s Disclosure of Non-Infringement, Invalidity, and Unenforceability Contentions with Appendix E, Dated Nov. 19, 2012, pp. 272-362.
LIT8_Appendix_E5: *John Mezzalingua Associates, Inc.*, d/b/a PPC, v. *Corning Gilbert, Inc.*, USDC, Northern District of New York, Case No. 5:12-cv-00911-GLS-DEP, Defendant Corning Gilbert Inc.'s Disclosure of Non-Infringement, Invalidity, and Unenforceability Contentions with Appendix E, Dated Nov. 19, 2012, pp. 365-461.
LIT8_Appendix_E6: *John Mezzalingua Associates, Inc.*, d/b/a PPC, v. *Corning Gilbert, Inc.*, USDC, Northern District of New York, Case No. 5:12-cv-00911-GLS-DEP, Defendant Corning Gilbert Inc.'s Disclosure of Non-Infringement, Invalidity, and Unenforceability Contentions with Appendix E, Dated Nov. 19, 2012, 54 pages.
LIT8_Appendix_E7: *John Mezzalingua Associates, Inc.*, d/b/a PPC, v. *Corning Gilbert, Inc.*, USDC, Northern District of New York, Case No. 5:12-cv-00911-GLS-DEP, Defendant Corning Gilbert Inc.'s Disclosure of Non-Infringement, Invalidity, and Unenforceability Contentions with Appendix E, Dated Nov. 19, 2012. 33 pages.
LIT8_CG_Infringement: *John Mezzalingua Associates, Inc.*, d/b/a PPC, v. *Corning Gilbert, Inc.*, USDC, Northern District of New York, Case No. 5:12-cv-00911-GLS-DEP, Defendant Corning Gilbert Inc.'s Disclosure of Non-Infringement, Invalidity, and Unenforceability Contentions with Appendices, Dated Nov. 19, 2012, 20 pages.
LIT8_Ex 1-23: *John Mezzalingua Associates, Inc.*, d/b/a PPC, v. *Corning Gilbert, Inc.*, USDC, Northern District of New York, Case No. 5:12-cv-00911-GLS-DEP, Defendant Corning Gilbert Inc.'s Disclosure of Non-Infringement, Invalidity, and Unenforceability Contentions, Exhibits 1-23, Dated Nov. 19, 2012, 229 pages.

(56) References Cited

OTHER PUBLICATIONS

LIT8_Ex 24-45: *John Mezzalingua Associates, Inc.*, d/b/a PPC, v. *Corning Gilbert, Inc.*, USDC, Northern District of New York, Case No. 5:12-cv-00911-GLS-DEP, Defendant Corning Gilbert Inc.'s Disclosure of Non-Infringement, Invalidity, and Unenforceability Contentions, Exhibits 24-45, Dated Nov. 19, 2012, 200 pages.
LIT10: Defendant's Disclosure of Preliminary Invalidity Contentions, Served Oct. 31, 2013, *PPC Broadband, Inc.* d/ b/a PPC v. *Times Fiber Communications, Inc.*, United States District Court Northern District of New York, Civil Action No. 5:13-CV-0460-TJM-DEP, 49 pages.
LIT12a: Defendant Corning Gilbert, Inc.'s Supplemental Disclosure of Non-Infringement, Invalidity, and Unenforceability Contentions (including Appendices A-D), Served Feb. 11, 2013, *John Mezzalingua Associates, Inc.*, d/b/a PPC, v. *Corning Gilbert, Inc.*, United States District Court Northern District of New York, Civil Action No. 5:12-CV-00911-GLS-DEP, pp. 1-90.
LIT12b: Defendant Corning Gilbert, Inc.'s Supplemental Disclosure of Non-Infringement, Invalidity, and Unenforceability Contentions (including Appendices A-D), Served Feb. 11, 2013, *John Mezzalingua Associates, Inc.*, d/b/a PPC, v. *Corning Gilbert, Inc.*, United States District Court Northern District of New York, Civil Action No. 5:12-CV-00911-GLS-DEP, pp. 91-199.
LIT12c; Defendant Corning Gilbert, Inc.'s Supplemental Disclosure of Non-Infringement, Invalidity, and Unenforceability Contentions (including Appendices A-D), Served Feb. 11, 2013, *John Mezzalingua Associates, Inc.*, d/b/a PPC, v. *Corning Gilbert, Inc.*, United States District Court Northern District of New York, Civil Action No. 5:12-CV-00911-GLS-DEP, pp. 200-328.
LIT16: Report and Recommendation, Issued Dec. 5, 2013, *John Mezzalingua Associates, Inc.*, d/b/a PPC, v. *Corning Gilbert, Inc.*, United States District Court Northern District of New York, Civil Action No. 5:12-CV-00911-GLS-DEP, 52 pages.
TECHDOC1: Philips, NXP, "PDCCH message information content for persistent scheduling," R1-081506, Agenda Item: 6.1.3, 3GPP TSG RAN WG1 Meeting #52bis, Shenzhen, China, Mar. 31-Apr. 4, 2008, 3 pages.
TECHDOC2: NTT DaCoMa, Inc. "UL semi-persistent resource deactivation," R2-082483 (resubmission of R2-081859), Agenda Item: 5.1.1.8, 3GPP TSG RAN WG2 #62, Kansas City, MO, USA, May 5-9, 2008, 4 pages.
TECHDOC3: Panasonic, "Configuration for semi-persistent scheduling," R2-081575, Agenda Item: 5.1.1.8, 3GPP TSG RAN WG2 61bis, Shenzhen, China, Mar. 31-Apr. 4, 2008, 4 pages.
TECHDOC4: Panasonic, "Remaining issues on Persistent scheduling," R2-083311, derived from R2-082228 and R2-082229, Agenda Item: 6.1.1.8, 3GPP TSG RAN WG2 #62bis, Warsaw, Poland, Jun. 30-Jul. 4, 2008, 12 pages.
TECHDOC5: Qualcomm Europe, "Release of semi-persistent resources," R2-082500 (was R2-081828), Agenda Item: 5.1.1.8 3GPP TSG-RANWG2 meeting #62, Kansas City, Mo, USA, May 5-9, 2008, 2 pages.
TECHDOC6: Samsung, "C-RNTI and NDI for SPS," R2-084464, Agenda Item: 6.1.1.3, 3GPP TSG RAN2#63 meeting, Jeju, South Korea, Aug. 18-22, 2008, 3 pages.
TECHDOC7: Nokia Corporation, Nokia Siemens Networks, "Persistent Scheduling for DL," R2-080683 (RS-080018), 3GPP TSG-RAN WG2 Meeting #61, Agenda Item: 5.1.1.8, Sorrento, Italy, Feb. 11-15, 2008, 6 pages.
TECHDOC8: Panasonic, "SPS activation and release," R1-084233, 3GPP TSG-RAN WG1 Meeting #55, Prague, Czech Republic, Nov. 10-14, 2008, 7 pages.
TECHDOC9: PCT International, Inc., Compression Connectors Installation Guide, Aug. 3, 2009, 11 pages.
TECHDOC10: PPC Product Guide (Catalog), 2008, 92 pages.
TECHDOC11: NTT DoCoMo, Alcatel, Cingular Wireless, CMCC, Ericsson, Fujitsu, Huawei, LG Electronics, Lucent Technologies, Mitsubishi Electric, Motorola, NEC, Nokia, Nortel Networks, Orange, Panasonic, Philips, Qualcomm Europe, Samsung, Sharp Siemens, Telecom Italia, Telefonica, TeliaSonera, T-Mobile, Vodafone, "Proposed Study Item on Evolved UTRA and Utran," RP-040461, Agenda Item: 8.12, TSG-RAN Meeting #26, Athens, Greece, Dec. 8-10, 2004, 5 pages.

* cited by examiner

GROUND PORTION FOR MAINTAINING A GROUND PATH IN A COAXIAL CABLE CONNECTOR

PRIORITY CLAIM

This application is a Continuation of application Ser. No. 15/601,967, filed May 22, 2017, now U.S. Pat. No. 10,862,251, which is a Continuation of application Ser. No. 14/134,892, filed Dec. 19, 2013, now U.S. Pat. No. 9,660,398, which is a Continuation of application Ser. No. 13/652,073, filed Oct. 15, 2012, now U.S. Pat. No. 8,647,136, which is a Continuation of application Ser. No. 12/633,792, filed Dec. 8, 2009, now U.S. Pat. No. 8,287,320, which claims the benefit and priority of U.S. Provisional Application No. 61/180,835, filed May 22, 2009. The disclosure of the prior applications is hereby incorporated by reference herein in its entirety.

CROSS REFERENCE TO RELATED APPLICATIONS

This application is related to the following commonly-owned, patent applications: (a) U.S. patent application Ser. No. 14/104,463, filed on Dec. 12, 2013, now U.S. Pat. No. 9,419,389; (b) U.S. patent application Ser. No. 14/104,393, filed on Dec. 12, 2013, now U.S. Pat. No. 9,496,661; (c) U.S. patent application Ser. No. 14/092,103, filed on Nov. 27, 2013, now U.S. Pat. No. 8,920,182; (d) U.S. patent application Ser. No. 14/092,003, filed on Nov. 27, 2013, now U.S. Pat. No. 8,915,754; (e) U.S. patent application Ser. No. 14/091,875, filed on Nov. 27, 2013, now U.S. Pat. No. 8,858,251; (f) U.S. patent application Ser. No. 13/971,147, filed on Aug. 20, 2013, now U.S. Pat. No. 8,801,448; (g) U.S. patent application Ser. No. 13/913,043, filed on Jun. 7, 2013, now U.S. Pat. No. 8,159,581; (h) U.S. patent application Ser. No. 13/758,586, filed on Feb. 4, 2013, now U.S. Pat. No. 9,017,101; and (i) U.S. patent application Ser. No. 13/712,470, filed on Dec. 12, 2012, now U.S. Pat. No. 8,920,192.

FIELD OF THE INVENTION

The present invention relates to connectors used in coaxial cable communication applications, and more specifically to coaxial connectors having electrical continuity members that extend continuity of an electromagnetic interference shield from the cable and through the connector.

BACKGROUND

Broadband communications have become an increasingly prevalent form of electromagnetic information exchange and coaxial cables are common conduits for transmission of broadband communications. Coaxial cables are typically designed so that an electromagnetic field carrying communications signals exists only in the space between inner and outer coaxial conductors of the cables. This allows coaxial cable runs to be installed next to metal objects without the power losses that occur in other transmission lines, and provides protection of the communications signals from external electromagnetic interference. Connectors for coaxial cables are typically connected onto complementary interface ports to electrically integrate coaxial cables to various electronic devices and cable communication equipment. Connection is often made through rotatable operation of an internally threaded nut of the connector about a corresponding externally threaded interface port. Fully tightening the threaded connection of the coaxial cable connector to the interface port helps to ensure a ground connection between the connector and the corresponding interface port. However, often connectors are not properly tightened or otherwise installed to the interface port and proper electrical mating of the connector with the interface port does not occur. Moreover, typical component elements and structures of common connectors may permit loss of ground and discontinuity of the electromagnetic shielding that is intended to be extended from the cable, through the connector, and to the corresponding coaxial cable interface port. Hence a need exists for an improved connector having structural component elements included for ensuring ground continuity between the coaxial cable, the connector and its various applicable structures, and the coaxial cable connector interface port.

SUMMARY

The invention is directed toward a first aspect of providing a coaxial cable connector comprising; a connector body; a post engageable with the connector body, wherein the post includes a flange; a nut, axially rotatable with respect to the post and the connector body, the nut having a first end and an opposing second end, wherein the nut includes an internal lip, and wherein a second end portion of the nut corresponds to the portion of the nut extending from the second end of the nut to the side of the lip of the nut facing the first end of the nut at a point nearest the second end of the nut, and a first end portion of the nut corresponds to the portion of the nut extending from the first end of the nut to the same point nearest the second end of the nut of the same side of the lip facing the first end of the nut; and a continuity member disposed within the second end portion of the nut and contacting the post and the nut, so that the continuity member extends electrical grounding continuity through the post and the nut.

A second aspect of the present invention provides a coaxial cable connector comprising a connector body; a post engageable with the connector body, wherein the post includes a flange; a nut, axially rotatable with respect to the post and the connector body, the nut having a first end and an opposing second end, wherein the nut includes an internal lip, and wherein a second end portion of the nut starts at a side of the lip of the nut facing the first end of the nut and extends rearward to the second end of the nut; and a continuity member disposed only rearward the start of the second end portion of the nut and contacting the post and the nut, so that the continuity member extends electrical grounding continuity through the post and the nut.

A third aspect of the present invention provides a coaxial cable connector comprising a connector body; a post operably attached to the connector body, the post having a flange; a nut axially rotatable with respect to the post and the connector body, the nut including an inward lip; and an electrical continuity member disposed axially rearward of a surface of the internal lip of the nut that faces the flange.

A fourth aspect of the present invention provides a method of obtaining electrical continuity for a coaxial cable connection, the method comprising: providing a coaxial cable connector including: a connector body; a post operably attached to the connector body, the post having a flange; a nut axially rotatable with respect to the post and the connector body, the nut including an inward lip; and an electrical continuity member disposed axially rearward of a surface of the internal lip of the nut that faces the flange;

securely attaching a coaxial cable to the connector so that the grounding sheath of the cable electrically contacts the post; extending electrical continuity from the post through the continuity member to the nut; and fastening the nut to a conductive interface port to complete the ground path and obtain electrical continuity in the cable connection.

The foregoing and other features of construction and operation of the invention will be more readily understood and fully appreciated from the following detailed disclosure, taken in conjunction with accompanying drawings.

DETAILED DESCRIPTION

Although certain embodiments of the present invention are shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as an example of embodiments of the present invention.

As a preface to the detailed description, it should be noted that, as used in this specification and the appended claims, the singular forms “a”, “an” and “the” include plural referents, unless the context clearly dictates otherwise.

Figure 1:
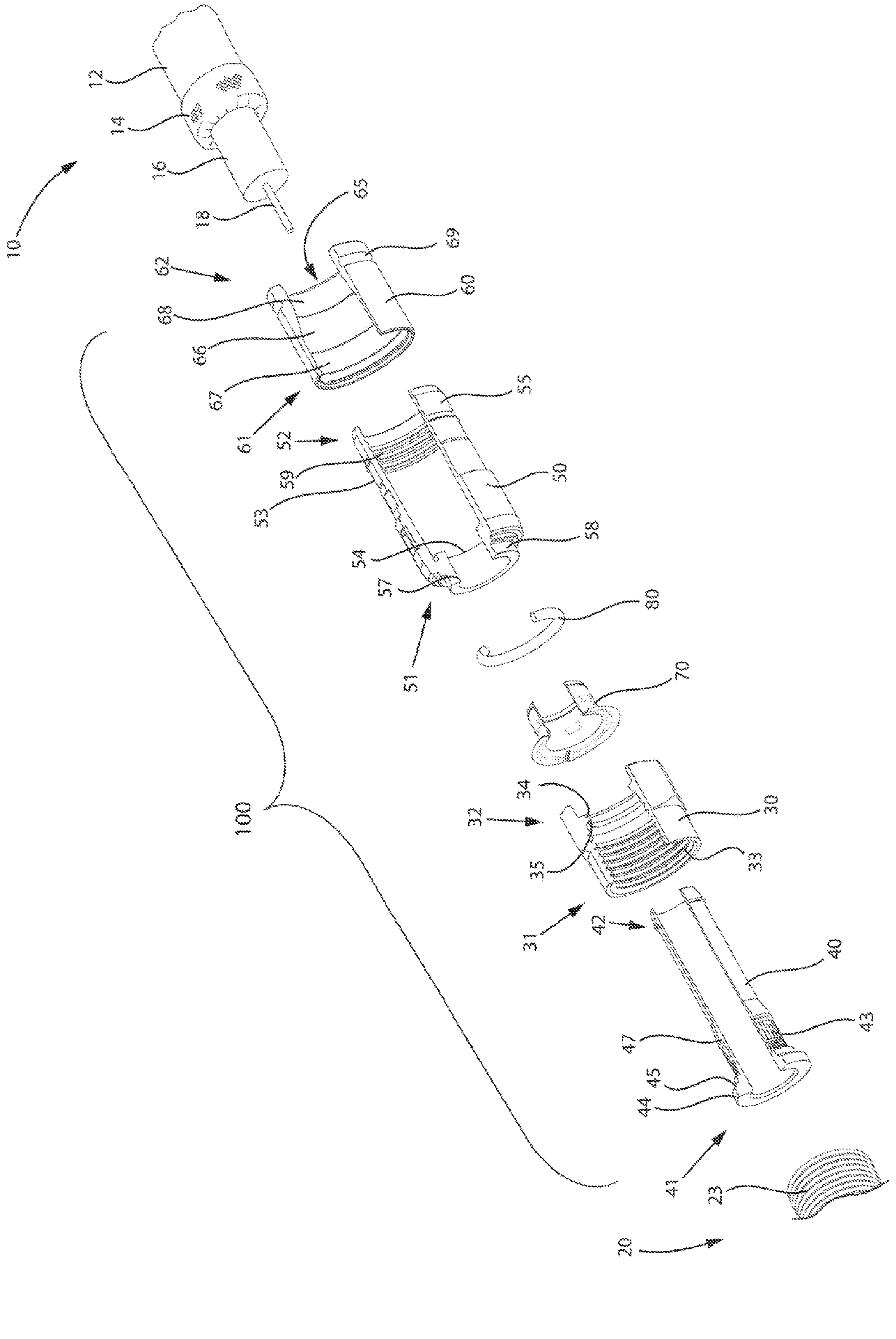
FIG. 1 depicts an exploded perspective cut-away view of an embodiment of the elements of an embodiment of a coaxial cable connector having an embodiment of an electrical continuity member, in accordance with the present invention.

Referring to the drawings, FIG. 1 depicts one embodiment of a coaxial cable connector 100 having an embodiment of an electrical continuity member 70. The coaxial cable connector 100 may be operably affixed, or otherwise functionally attached, to a coaxial cable 10 having a protective outer jacket 12, a conductive grounding shield 14, an interior dielectric 16 and a center conductor 18. The coaxial cable 10 may be prepared as embodied in FIG. 1 by removing the protective outer jacket 12 and drawing back the conductive grounding shield 14 to expose a portion of the interior dielectric 16. Further preparation of the embodied coaxial cable 10 may include stripping the dielectric 16 to expose a portion of the center conductor 18. The protective outer jacket 12 is intended to protect the various components of the coaxial cable 10 from damage which may result from exposure to dirt or moisture and from corrosion. Moreover, the protective outer jacket 12 may serve in some measure to secure the various components of the coaxial cable 10 in a contained cable design that protects the cable 10 from damage related to movement during cable installation. The conductive grounding shield 14 may be comprised of conductive materials suitable for providing an electrical ground connection, such as cuprous braided material, aluminum foils, thin metallic elements, or other like structures. Various embodiments of the shield 14 may be employed to screen unwanted noise. For instance, the shield 14 may comprise a metal foil wrapped around the dielectric 16, or several conductive strands formed in a continuous braid around the dielectric 16. Combinations of foil and/or braided strands may be utilized wherein the conductive shield 14 may comprise a foil layer, then a braided layer, and then a foil layer. Those in the art will appreciate that various layer combinations may be implemented in order for the conductive grounding shield 14 to effectuate an electromagnetic buffer helping to prevent ingress of environmental noise that may disrupt broadband communications. The dielectric 16 may be comprised of materials suitable for electrical insulation, such as plastic foam material, paper materials, rubber-like polymers, or other functional insulating materials. It should be noted that the various materials of which all the various components of the coaxial cable 10 are comprised should have some degree of elasticity allowing the cable 10 to flex or bend in accordance with traditional broadband communication standards, installation methods and/or equipment. It should further be recognized that the radial thickness of the coaxial cable 10, protective outer jacket 12, conductive grounding shield 14, interior dielectric 16 and/or center conductor 18 may vary based upon generally recognized parameters corresponding to broadband communication standards and/or equipment.

Referring further to FIG. 1, the connector 100 may also include a coaxial cable interface port 20. The coaxial cable interface port 20 includes a conductive receptacle for receiving a portion of a coaxial cable center conductor 18 sufficient to make adequate electrical contact. The coaxial cable interface port 20 may further comprise a threaded exterior surface 23. It should be recognized that the radial thickness and/or the length of the coaxial cable interface port 20 and/or the conductive receptacle of the port 20 may vary based upon generally recognized parameters corresponding to broadband communication standards and/or equipment. Moreover, the pitch and height of threads which may be formed upon the threaded exterior surface 23 of the coaxial cable interface port 20 may also vary based upon generally recognized parameters corresponding to broadband communication standards and/or equipment. Furthermore, it should be noted that the interface port 20 may be formed of a single conductive material, multiple conductive materials, or may be configured with both conductive and non-conductive materials corresponding to the port's 20 operable electrical interface with a connector 100. However, the receptacle of the port 20 should be formed of a conductive material, such as a metal, like brass, copper, or aluminum. Further still, it will be understood by those of ordinary skill that the interface port 20 may be embodied by a connective interface component of a coaxial cable communications device, a television, a modem, a computer port, a network receiver, or other communications modifying devices such as a signal splitter, a cable line extender, a cable network module and/or the like.

Referring still further to FIG. 1, an embodiment of a coaxial cable connector 100 may further comprise a threaded nut 30, a post 40, a connector body 50, a fastener member 60, a continuity member 70 formed of conductive material, and a connector body sealing member 80, such as, for example, a body O-ring configured to fit around a portion of the connector body 50.

The threaded nut 30 of embodiments of a coaxial cable connector 100 has a first forward end 31 and opposing second rearward end 32. The threaded nut 30 may comprise internal threading 33 extending axially from the edge of first forward end 31 a distance sufficient to provide operably effective threadable contact with the external threads 23 of a standard coaxial cable interface port 20 (as shown, by way of example, in FIG. 20). The threaded nut 30 includes an internal lip 34, such as an annular protrusion, located proximate the second rearward end 32 of the nut. The internal lip 34 includes a surface 35 facing the first forward end 31 of the nut 30. The forward facing surface 35 of the lip 34 may be a tapered surface or side facing the first forward end 31 of the nut 30. The structural configuration of the nut 30 may vary according to differing connector design parameters to accommodate different functionality of a coaxial cable connector 100. For instance, the first forward end 31 of the nut 30 may include internal and/or external structures such as ridges, grooves, curves, detents, slots, openings, chamfers, or other structural features, etc., which may facilitate the operable joining of an environmental sealing member, such a water-tight seal or other attachable component element, that may help prevent ingress of environmental contaminants, such as moisture, oils, and dirt, at the first forward end 31 of a nut 30, when mated with an interface port 20. Moreover, the second rearward end 32, of the nut 30 may extend a significant axial distance to reside radially extent, or otherwise partially surround, a portion of the connector body 50, although the extended portion of the nut 30 need not contact the connector body 50. Those in the art should appreciate that the nut need not be threaded. Moreover, the nut may comprise a coupler commonly used in connecting RCA-type, or BNC-type connectors, or other common coaxial cable connectors having standard coupler interfaces. The threaded nut 30 may be formed of conductive materials, such as copper, brass, aluminum, or other metals or metal alloys, facilitating grounding through the nut 30. Accordingly, the nut 30 may be configured to extend an electromagnetic buffer by electrically contacting conductive surfaces of an interface port 20 when a connector 100 is advanced onto the port 20. In addition, the threaded nut 30 may be formed of both conductive and non-conductive materials. For example the external surface of the nut 30 may be formed of a polymer, while the remainder of the nut 30 may be comprised of a metal or other conductive material. The threaded nut 30 may be formed of metals or polymers or other materials that would facilitate a rigidly formed nut body. Manufacture of the threaded nut 30 may include casting, extruding, cutting, knurling, turning, tapping, drilling, injection molding, blow molding, combinations thereof, or other fabrication methods that may provide efficient production of the component. The forward facing surface 35 of the nut 30 faces a flange 44 of the post 40 when operably assembled in a connector 100, so as to allow the nut to rotate with respect to the other component elements, such as the post 40 and the connector body 50, of the connector 100.

Referring still to FIG. 1, an embodiment of a connector 100 may include a post 40. The post 40 comprises a first forward end 41 and an opposing second rearward end 42. Furthermore, the post 40 may comprise a flange 44, such as an externally extending annular protrusion, located at the first end 41 of the post 40. The flange 44 includes a rearward facing surface 45 that faces the forward facing surface 35 of the nut 30, when operably assembled in a coaxial cable connector 100, so as to allow the nut to rotate with respect to the other component elements, such as the post 40 and the connector body 50, of the connector 100. The rearward facing surface 45 of flange 44 may be a tapered surface facing the second rearward end 42 of the post 40. Further still, an embodiment of the post 40 may include a surface feature 47 such as a lip or protrusion that may engage a portion of a connector body 50 to secure axial movement of the post 40 relative to the connector body 50. However, the post need not include such a surface feature 47, and the coaxial cable connector 100 may rely on press-fitting and friction-fitting forces and/or other component structures having features and geometries to help retain the post 40 in secure location both axially and rotationally relative to the connector body 50. The location proximate or near where the connector body is secured relative to the post 40 may include surface features 43, such as ridges, grooves, protrusions, or knurling, which may enhance the secure attachment and locating of the post 40 with respect to the connector body 50. Moreover, the portion of the post 40 that contacts embodiments of a continuity member 70 may be of a different diameter than a portion of the nut 30 that contacts the connector body 50. Such diameter variance may facilitate assembly processes. For instance, various components having larger or smaller diameters can be readily press-fit or otherwise secured into connection with each other. Additionally, the post 40 may include a mating edge 46, which may be configured to make physical and electrical contact with a corresponding mating edge 26 of an interface port 20 (as shown in exemplary fashion in FIG. 20). The post 40 should be formed such that portions of a prepared coaxial cable 10 including the dielectric 16 and center conductor 18 (examples shown in FIGS. 1 and 20) may pass axially into the second end 42 and/or through a portion of the tube-like body of the post 40. Moreover, the post 40 should be dimensioned, or otherwise sized, such that the post 40 may be inserted into an end of the prepared coaxial cable 10, around the dielectric 16 and under the protective outer jacket 12 and conductive grounding shield 14. Accordingly, where an embodiment of the post 40 may be inserted into an end of the prepared coaxial cable 10 under the drawn back conductive grounding shield 14, substantial physical and/or electrical contact with the shield 14 may be accomplished thereby facilitating grounding through the post 40. The post 40 should be conductive and may be formed of metals or may be formed of other conductive materials that would facilitate a rigidly formed post body. In addition, the post may be formed of a combination of both conductive and non-conductive materials. For example, a metal coating or layer may be applied to a polymer of other non-conductive material. Manufacture of the post 40 may include casting, extruding, cutting, turning, drilling, knurling, injection molding, spraying, blow molding, component overmolding, combinations thereof, or other fabrication methods that may provide efficient production of the component.

Embodiments of a coaxial cable connector, such as connector 100, may include a connector body 50. The connector body 50 may comprise a first end 51 and opposing second end 52. Moreover, the connector body may include a post mounting portion 57 proximate or otherwise near the first end 51 of the body 50, the post mounting portion 57 configured to securely locate the body 50 relative to a portion of the outer surface of post 40, so that the connector body 50 is axially secured with respect to the post 40, in a manner that prevents the two components from moving with respect to each other in a direction parallel to the axis of the connector 100. The internal surface of the post mounting portion 57 may include an engagement feature 54 that facilitates the secure location of a continuity member 70 with respect to the connector body 50 and/or the post 40, by physically engaging the continuity member 70 when assembled within the connector 100. The engagement feature 54 may simply be an annular detent or ridge having a different diameter than the rest of the post mounting portion 57. However other features such as grooves, ridges, protrusions, slots, holes, keyways, bumps, nubs, dimples, crests, rims, or other like structural features may be included to facilitate or possibly assist the positional retention of embodiments of electrical continuity member 70 with respect to the connector body 50. Nevertheless, embodiments of a continuity member 70 may also reside in a secure position with respect to the connector body 50 simply through press-fitting and friction-fitting forces engendered by corresponding tolerances, when the various coaxial cable connector 100 components are operably assembled, or otherwise physically aligned and attached together. In addition, the connector body 50 may include an outer annular recess 58 located proximate or near the first end 51 of the connector body 50. Furthermore, the connector body 50 may include a semi-rigid, yet compliant outer surface 55, wherein an inner surface opposing the outer surface 55 may be configured to form an annular seal when the second end 52 is deformably compressed against a received coaxial cable 10 by operation of a fastener member 60. The connector body 50 may include an external annular detent 53 located proximate or close to the second end 52 of the connector body 50. Further still, the connector body 50 may include internal surface features 59, such as annular serrations formed near or proximate the internal surface of the second end 52 of the connector body 50 and configured to enhance frictional restraint and gripping of an inserted and received coaxial cable 10, through tooth-like interaction with the cable. The connector body 50 may be formed of materials such as plastics, polymers, bendable metals or composite materials that facilitate a semi-rigid, yet compliant outer surface 55. Further, the connector body 50 may be formed of conductive or non-conductive materials or a combination thereof. Manufacture of the connector body 50 may include casting, extruding, cutting, turning, drilling, knurling, injection molding, spraying, blow molding, component overmolding, combinations thereof, or other fabrication methods that may provide efficient production of the component.

With further reference to FIG. 1, embodiments of a coaxial cable connector 100 may include a fastener member 60. The fastener member 60 may have a first end 61 and opposing second end 62. In addition, the fastener member 60 may include an internal annular protrusion 63 (see FIG. 20) located proximate the first end 61 of the fastener member 60 and configured to mate and achieve purchase with the annular detent 53 on the outer surface 55 of connector body 50 (shown again, by way of example, in FIG. 20). Moreover, the fastener member 60 may comprise a central passageway 65 defined between the first end 61 and second end 62 and extending axially through the fastener member 60. The central passageway 65 may comprise a ramped surface 66 which may be positioned between a first opening or inner bore 67 having a first diameter positioned proximate with the first end 61 of the fastener member 60 and a second opening or inner bore 68 having a second diameter positioned proximate with the second end 62 of the fastener member 60. The ramped surface 66 may act to deformably compress the outer surface 55 of a connector body 50 when the fastener member 60 is operated to secure a coaxial cable 10. For example, the narrowing geometry will compress squeeze against the cable, when the fastener member is compressed into a tight and secured position on the connector body. Additionally, the fastener member 60 may comprise an exterior surface feature 69 positioned proximate with or close to the second end 62 of the fastener member 60. The surface feature 69 may facilitate gripping of the fastener member 60 during operation of the connector 100. Although the surface feature 69 is shown as an annular detent, it may have various shapes and sizes such as a ridge, notch, protrusion, knurling, or other friction or gripping type arrangements. The first end 61 of the fastener member 60 may extend an axial distance so that, when the fastener member 60 is compressed into sealing position on the coaxial cable 100, the fastener member 60 touches or resides substantially proximate significantly close to the nut 30. It should be recognized, by those skilled in the requisite art, that the fastener member 60 may be formed of rigid materials such as metals, hard plastics, polymers, composites and the like, and/or combinations thereof. Furthermore, the fastener member 60 may be manufactured via casting, extruding, cutting, turning, drilling, knurling, injection molding, spraying, blow molding, component overmolding, combinations thereof, or other fabrication methods that may provide efficient production of the component.

The manner in which the coaxial cable connector 100 may be fastened to a received coaxial cable 10 (such as shown, by way of example, in FIG. 20) may also be similar to the way a cable is fastened to a common CMP-type connector having an insertable compression sleeve that is pushed into the connector body 50 to squeeze against and secure the cable 10. The coaxial cable connector 100 includes an outer connector body 50 having a first end 51 and a second end 52. The body 50 at least partially surrounds a tubular inner post 40. The tubular inner post 40 has a first end 41 including a flange 44 and a second end 42 configured to mate with a coaxial cable 10 and contact a portion of the outer conductive grounding shield or sheath 14 of the cable 10. The connector body 50 is secured relative to a portion of the tubular post 40 proximate or close to the first end 41 of the tubular post 40 and cooperates, or otherwise is functionally located in a radially spaced relationship with the inner post 40 to define an annular chamber with a rear opening. A tubular locking compression member may protrude axially into the annular chamber through its rear opening. The tubular locking compression member may be slidably coupled or otherwise movably affixed to the connector body 50 to compress into the connector body and retain the cable 10 and may be displaceable or movable axially or in the general direction of the axis of the connector 100 between a first open position (accommodating insertion of the tubular inner post 40 into a prepared cable 10 end to contact the grounding shield 14), and a second clamped position compressibly fixing the cable 10 within the chamber of the connector 100, because the compression sleeve is squeezed into retraining contact with the cable 10 within the connector body 50. A coupler or nut 30 at the front end of the inner post 40 serves to attach the connector 100 to an interface port. In a CMP-type connector having an insertable compression sleeve, the structural configuration and functional operation of the nut 30 may be similar to the structure and functionality of similar components of a connector 100 described in FIGS. 1-20, and having reference numerals denoted similarly.

Figure 2:
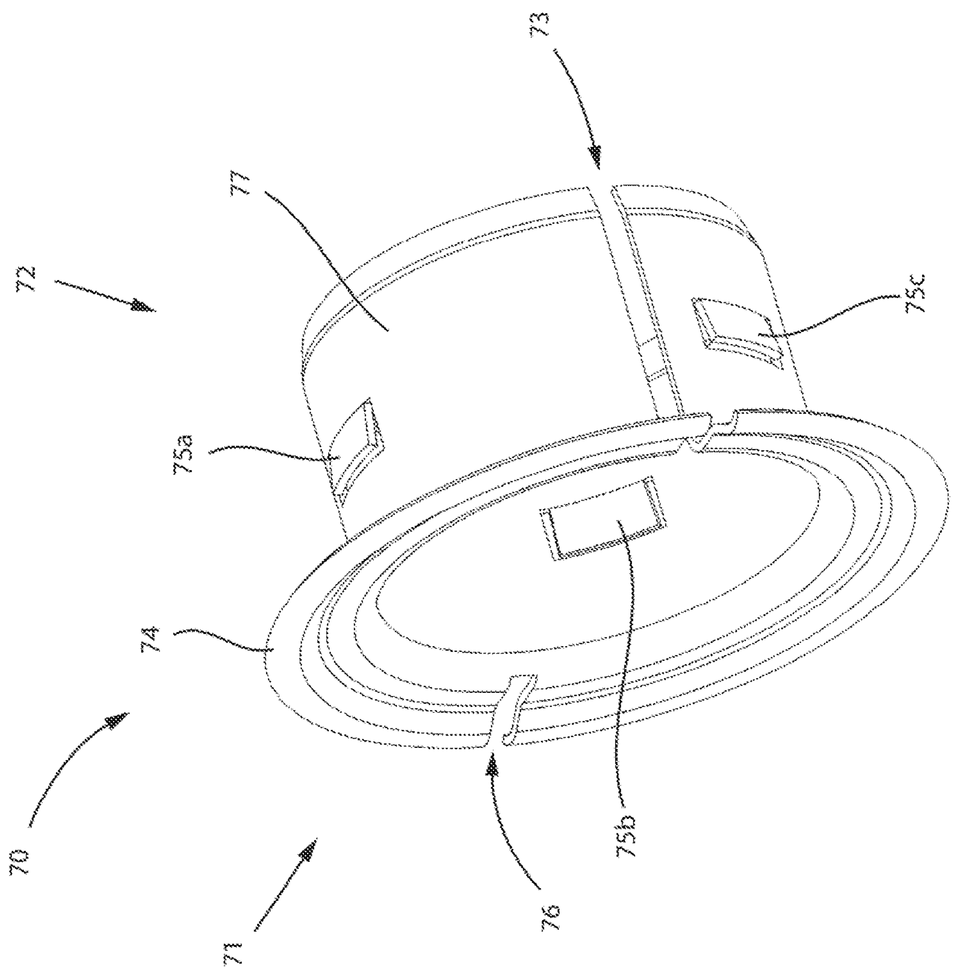
FIG. 2 depicts a perspective view of an embodiment of the electrical continuity member depicted in FIG. 1, in accordance with the present invention.
Figure 3:
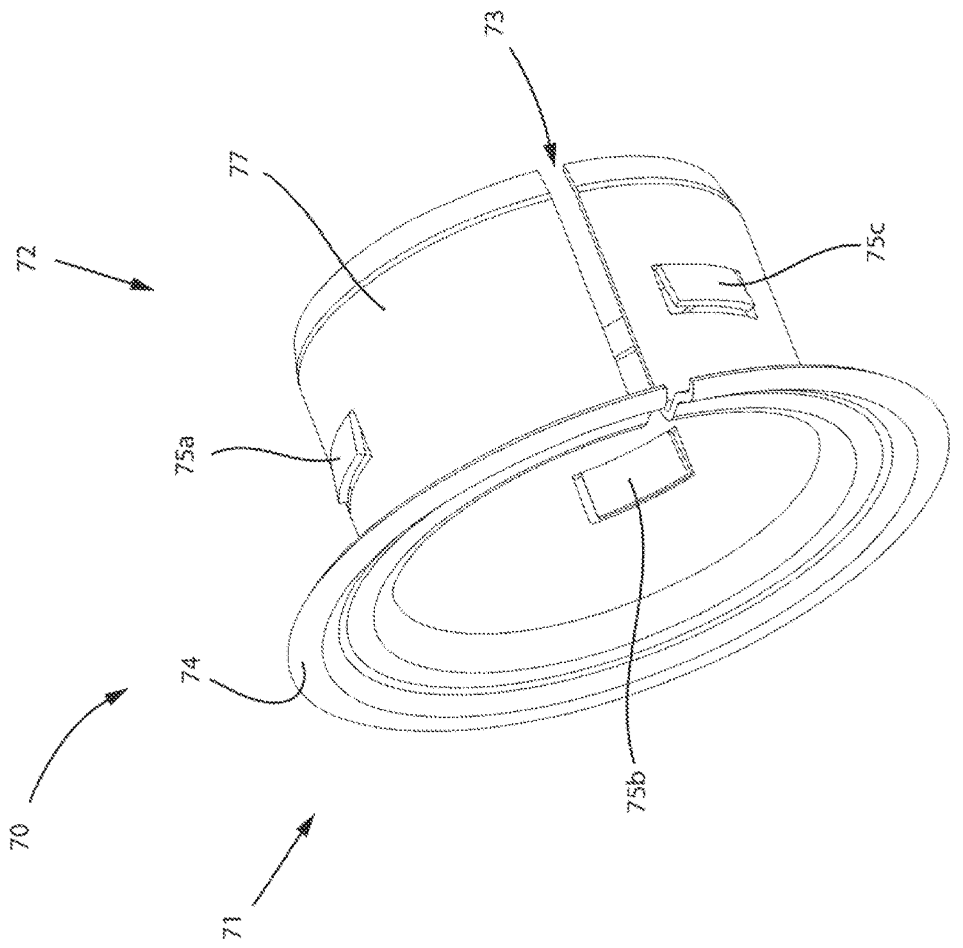
FIG. 3 depicts a perspective view of a variation of the embodiment of the electrical continuity member depicted in FIG. 1, without a flange cutout, in accordance with the present invention.
Figure 4:
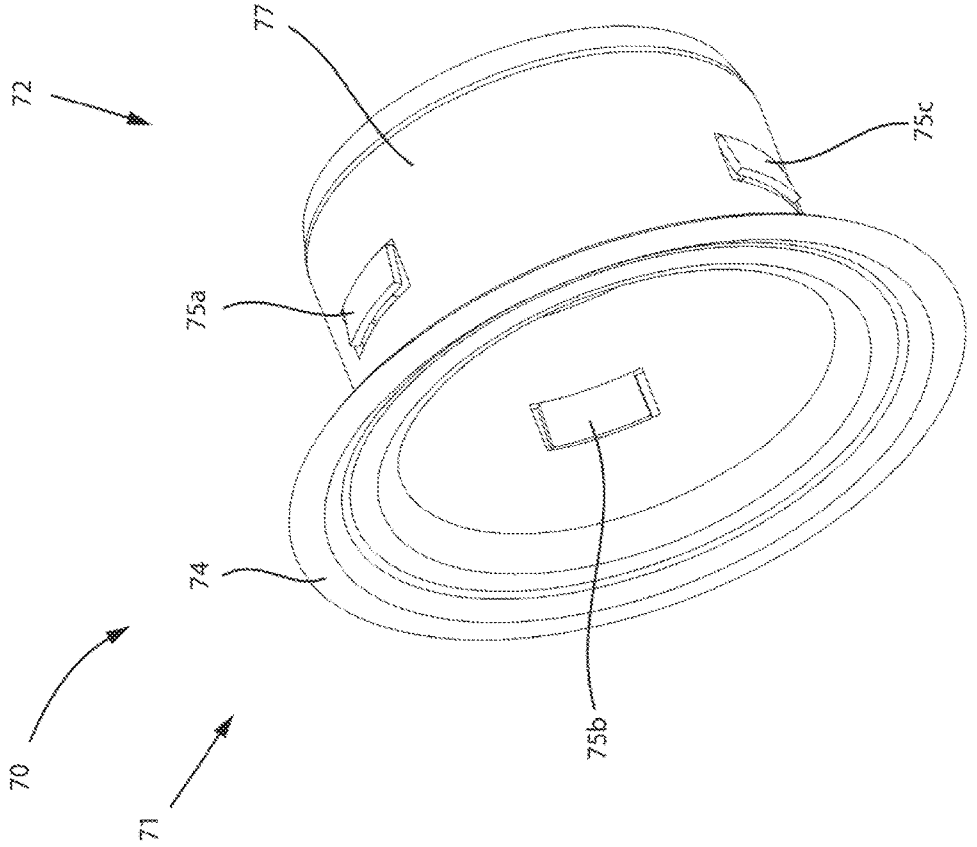
FIG. 4 depicts a perspective view of a variation of the embodiment of the electrical continuity member depicted in FIG. 1, without a flange cutout or a through-slit, in accordance with the present invention.

Turning now to FIGS. 2-4, variations of an embodiment of an electrical continuity member 70 are depicted. A continuity member 70 is conductive. The continuity member may have a first end 71 and an axially opposing second end 72. Embodiments of a continuity member 70 include a post contact portion 77. The post contact portion 77 makes physical and electrical contact with the post 40, when the coaxial cable connector 100 is operably assembled, and helps facilitate the extension of electrical ground continuity through the post 40. As depicted in FIGS. 2-4, the post contact portion 77 comprises a substantially cylindrical body that includes an inner dimension corresponding to an outer dimension of a portion of the post 40. A continuity member 70 may also include a securing member 75 or a plurality of securing members, such as the tabs 75*a*-*c*, which may help to physically secure the continuity member 70 in position with respect to the post 40 and/or the connector body 50. The securing member 75 may be resilient and, as such, may be capable of exerting spring-like force on operably adjoining coaxial cable connector 100 components, such as the post 40. Embodiments of a continuity member 70 include a nut contact portion 74. The nut contact portion 74 makes physical and electrical contact with the nut 30, when the coaxial cable connector 100 is operably assembled or otherwise put together in a manner that renders the connector 100 functional, and helps facilitate the extension of electrical ground continuity through the nut 30. The nut contact portion 74 may comprise a flange-like element that may be associated with various embodiments of a continuity member 70. In addition, as depicted in FIGS. 2-3, various embodiments of a continuity member 70 may include a through-slit 73. The through-slit 73 extends through the entire continuity member 70. Furthermore, as depicted in FIG. 2, various embodiments of a continuity member 70 may include a flange cutout 76 located on a flange-like nut contact portion 74 of the continuity member 70. A continuity member 70 is formed of conductive materials. Moreover, embodiments of a continuity member 70 may exhibit resiliency, which resiliency may be facilitated by the structural configuration of the continuity member 70 and the material make-up of the continuity member 70.

Embodiments of a continuity member 70 may be formed, shaped, fashioned, or otherwise manufactured via any operable process that will render a workable component, wherein the manufacturing processes utilized to make the continuity member may vary depending on the structural configuration of the continuity member. For example, a continuity member 70 having a through-slit 73 may be formed from a sheet of material that may be stamped and then bent into an operable shape, that allows the continuity member 70 to function as it was intended. The stamping may accommodate various operable features of the continuity member 70. For instance, the securing member 75, such as tabs 75*a*-*c*, may be cut during the stamping process. Moreover, the flange cutout 76 may also be rendered during a stamping process. Those in the art should appreciate that various other surface features may be provided on the continuity member 70 through stamping or by other manufacturing and shaping means. Accordingly, it is contemplated that features of the continuity member 70 may be provided to mechanically interlock or interleave, or otherwise operably physically engage complimentary and corresponding features of embodiments of a nut 30, complimentary and corresponding features of embodiments of a post 40, and/or complimentary and corresponding features of embodiments of a connector body 50. The flange cutout 76 may help facilitate bending that may be necessary to form a flange-like nut contact member 74. However, as is depicted in FIG. 3, embodiments of a continuity member 70 need not have a flange cutout 76. In addition, as depicted in FIG. 4, embodiments of a continuity member 70 need also not have a through-slit 73. Such embodiments may be formed via other manufacturing methods. Those in the art should appreciate that manufacture of embodiments of a continuity member 70 may include casting, extruding, cutting, knurling, turning, coining, tapping, drilling, bending, rolling, forming, component overmolding, combinations thereof, or other fabrication methods that may provide efficient production of the component.

Figure 5:
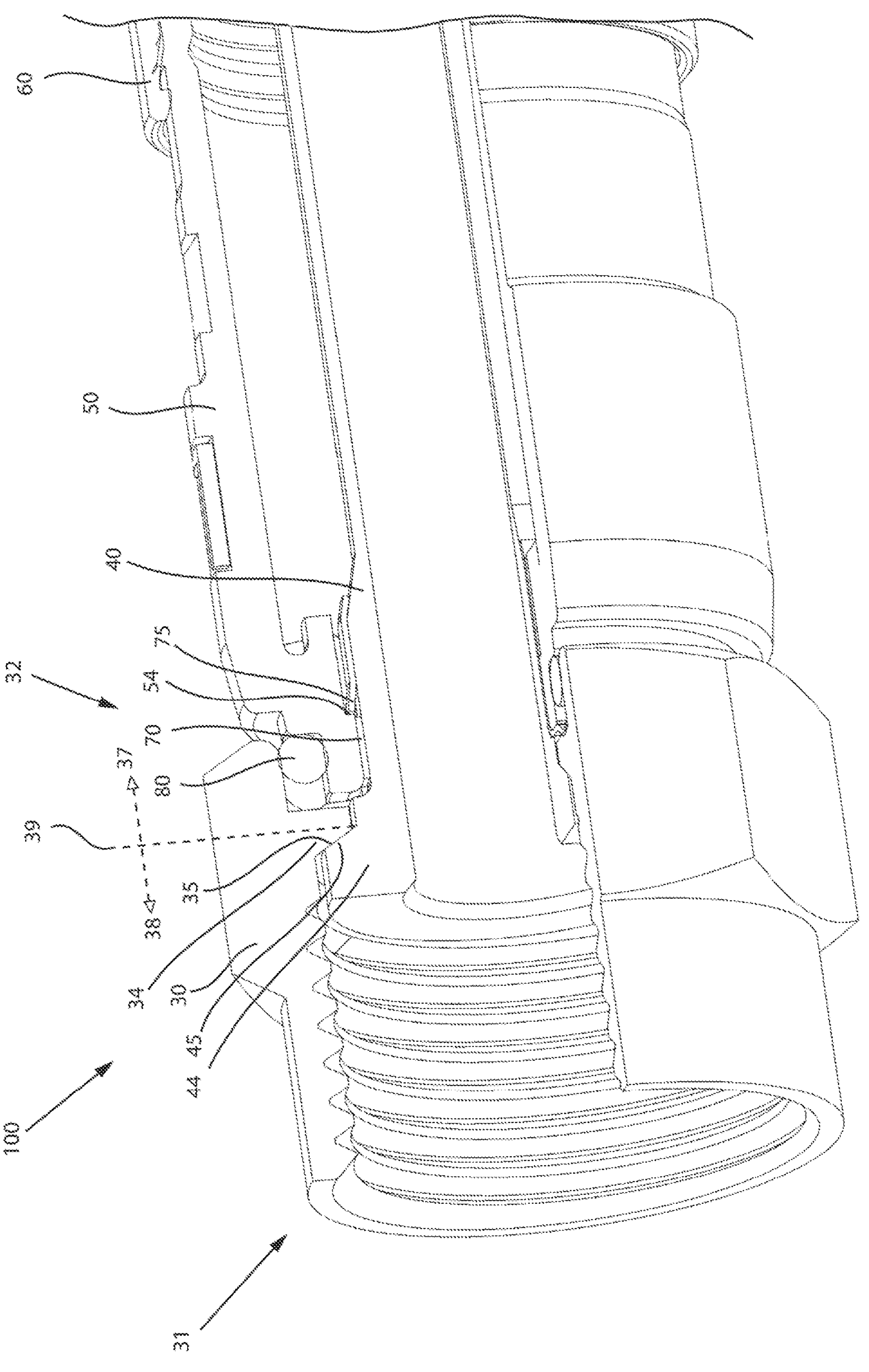
FIG. 5 depicts a perspective cut-away view of a portion of the embodiment of a coaxial cable connector having an electrical continuity member of FIG. 1, as assembled, in accordance with the present invention.
Figure 6:
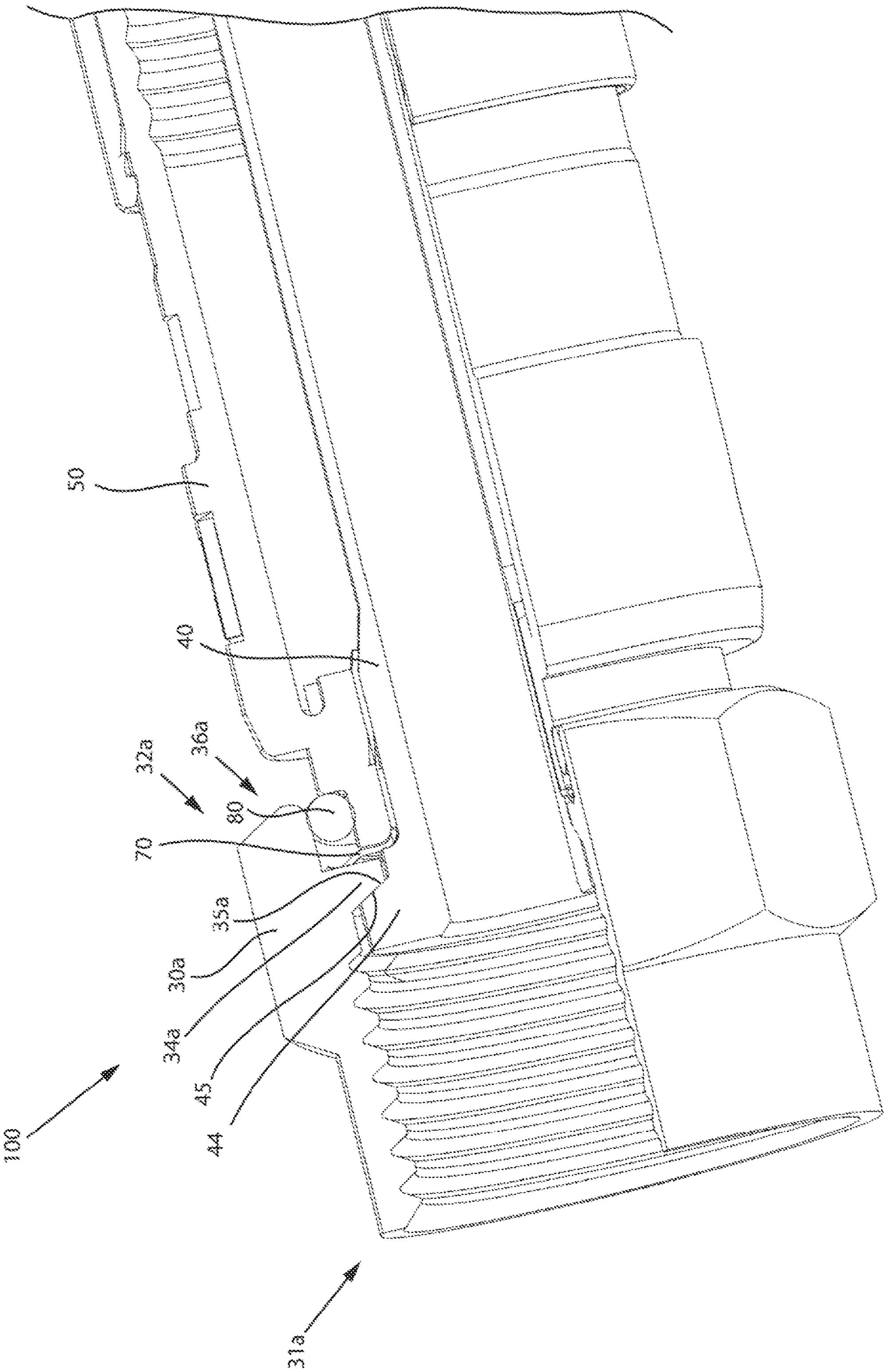
FIG. 6 depicts a perspective cut-away view of a portion of an assembled embodiment of a coaxial cable connector having an electrical continuity member and a shortened nut, in accordance with the present invention.
Figure 7:
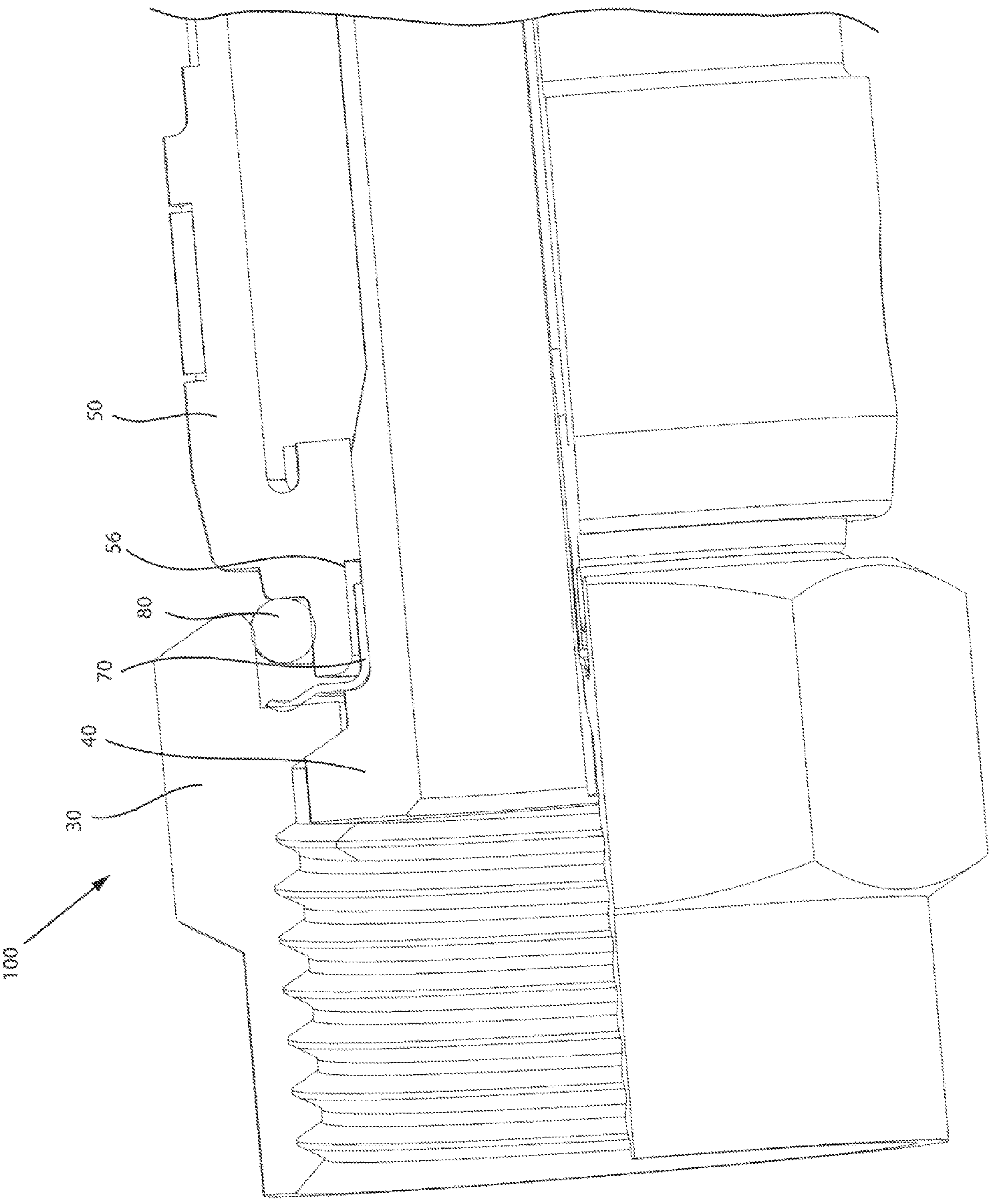
FIG. 7 depicts a perspective cut-away view of a portion of an assembled embodiment of a coaxial cable connector having an electrical continuity member that does not touch the connector body, in accordance with the present invention.
Figure 8:
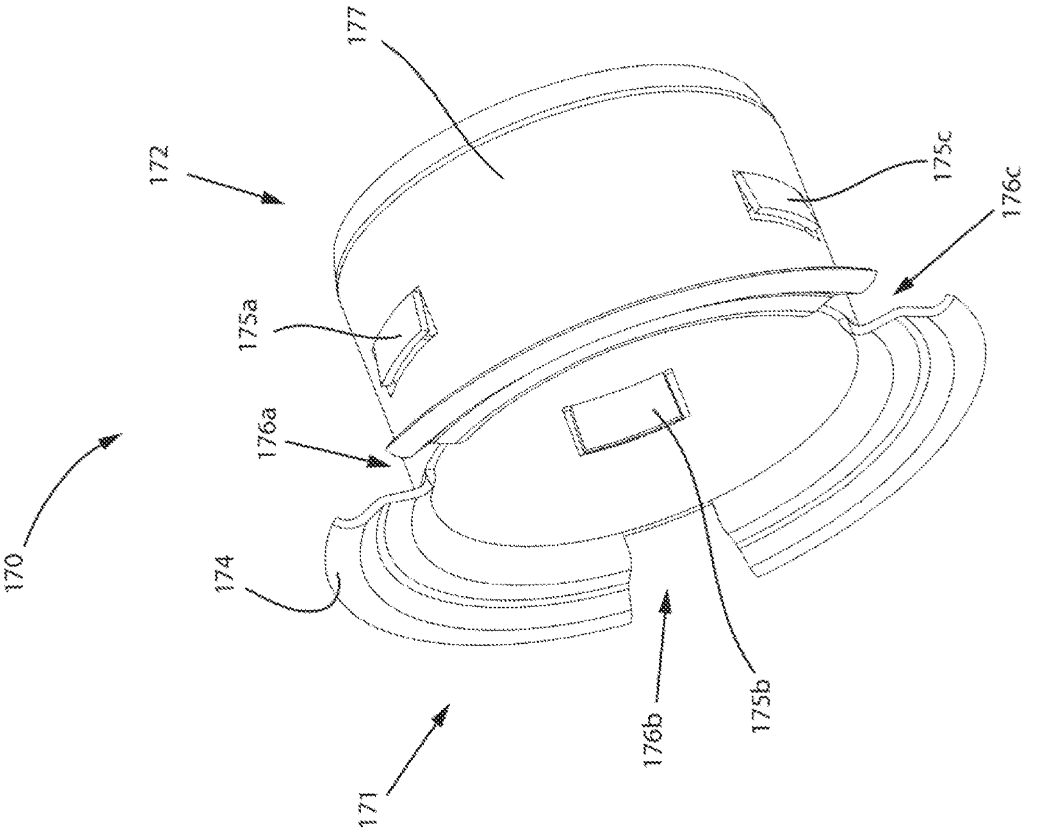
FIG. 8 depicts a perspective view of another embodiment of an electrical continuity member, in accordance with the present invention.
Figure 9:
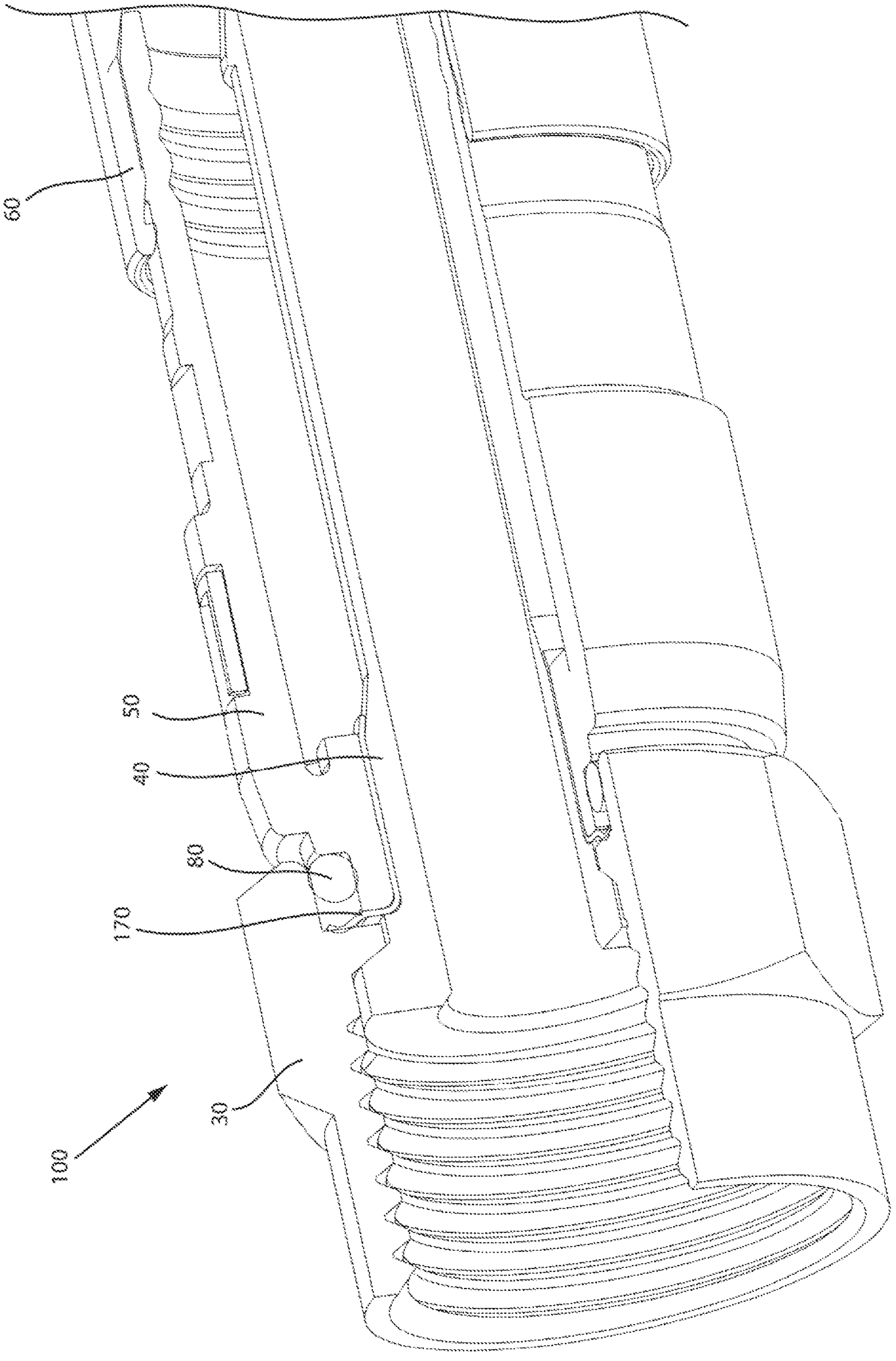
FIG. 9 depicts a perspective cut-away view of a portion of an assembled embodiment of a coaxial cable connector having the electrical continuity member of FIG. 8, in accordance with the present invention.
Figure 10:
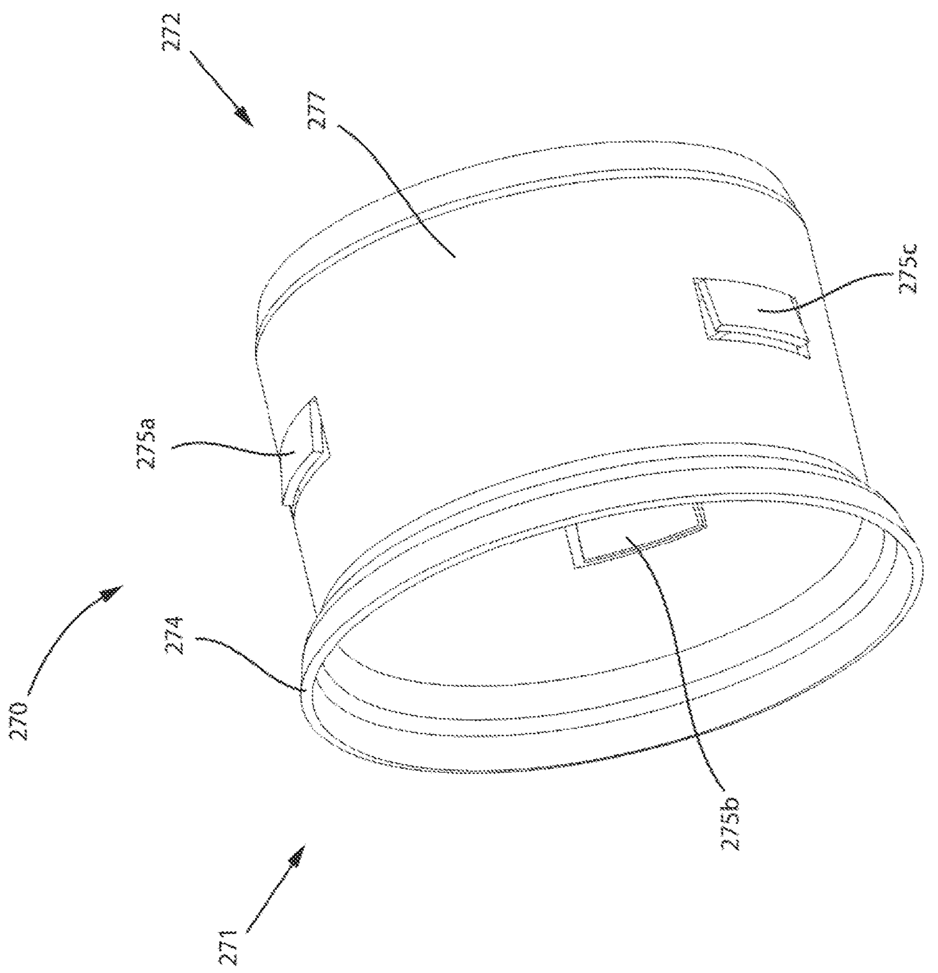
FIG. 10 depicts a perspective view of a further embodiment of an electrical continuity member, in accordance with the present invention.
Figure 11:
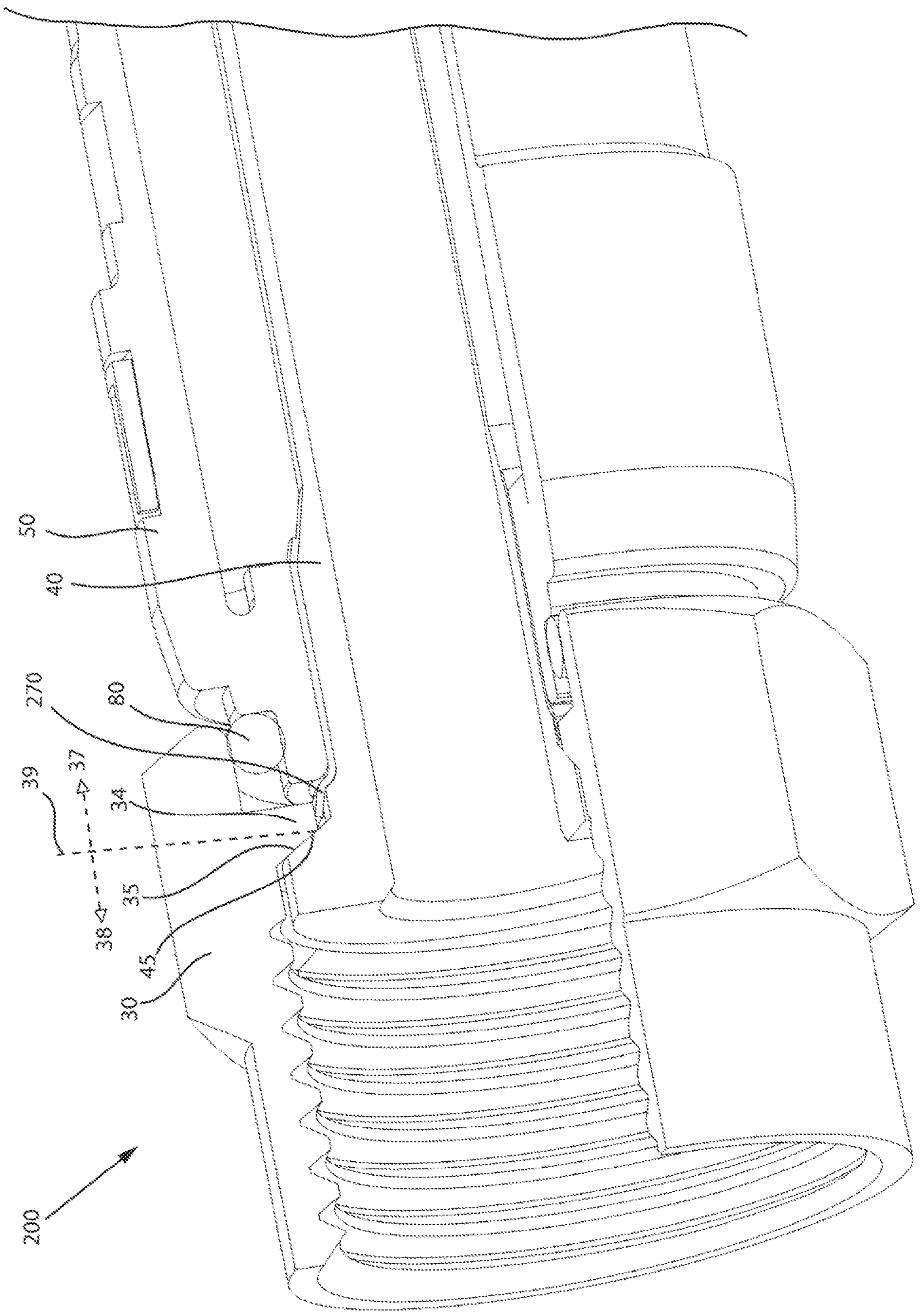
FIG. 11 depicts a perspective cut-away view of a portion of an assembled embodiment of a coaxial cable connector having the electrical continuity member of FIG. 10, in accordance with the present invention.
Figure 12:
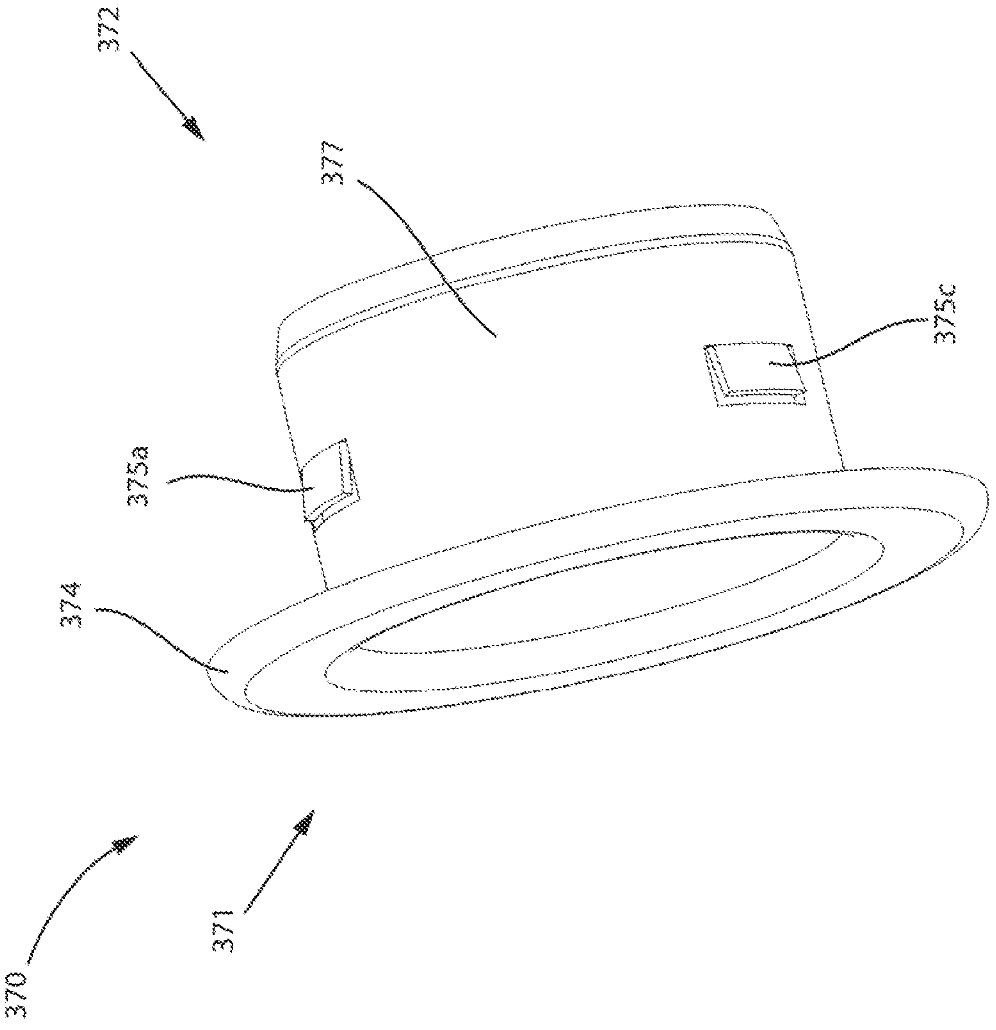
FIG. 12 depicts a perspective view of still another embodiment of an electrical continuity member, in accordance with the present invention.
Figure 13:
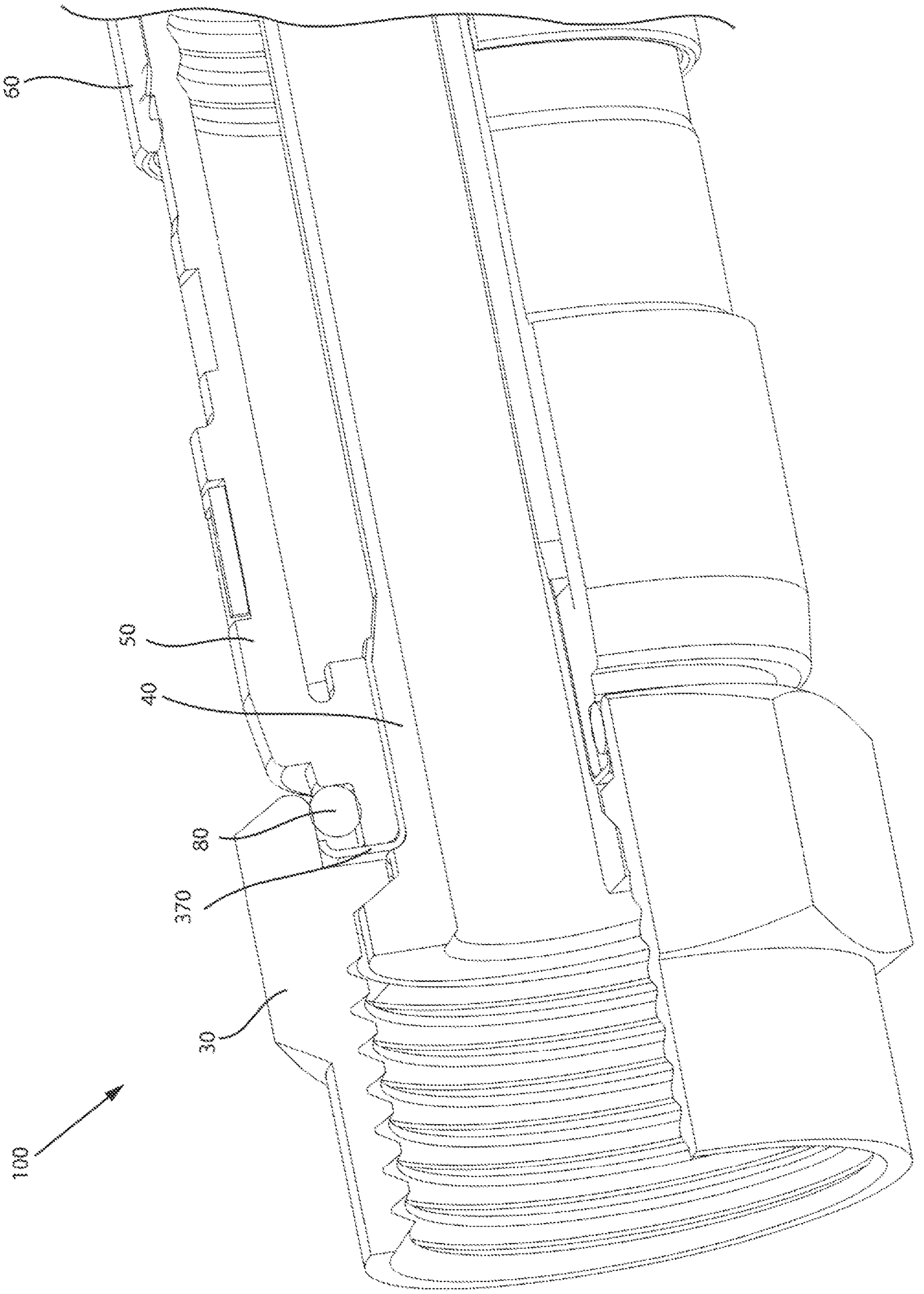
FIG. 13 depicts a perspective cut-away view of a portion of an assembled embodiment of a coaxial cable connector having the electrical continuity member of FIG. 12, in accordance with the present invention.
Figure 14:
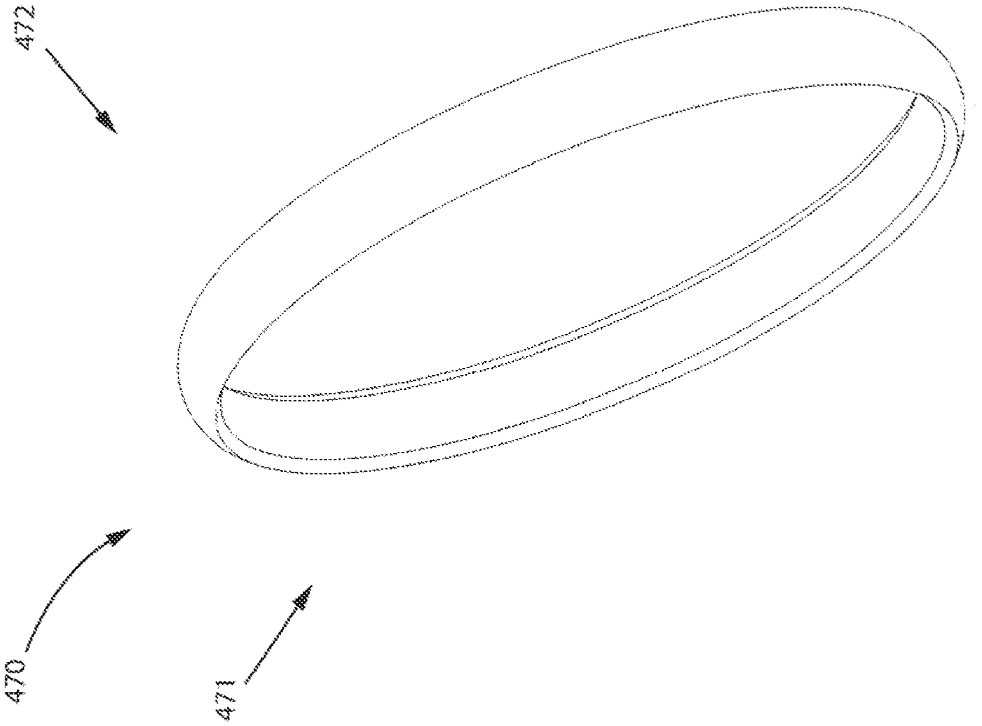
FIG. 14 depicts a perspective view of a still further embodiment of an electrical continuity member, in accordance with the present invention.
Figure 15:
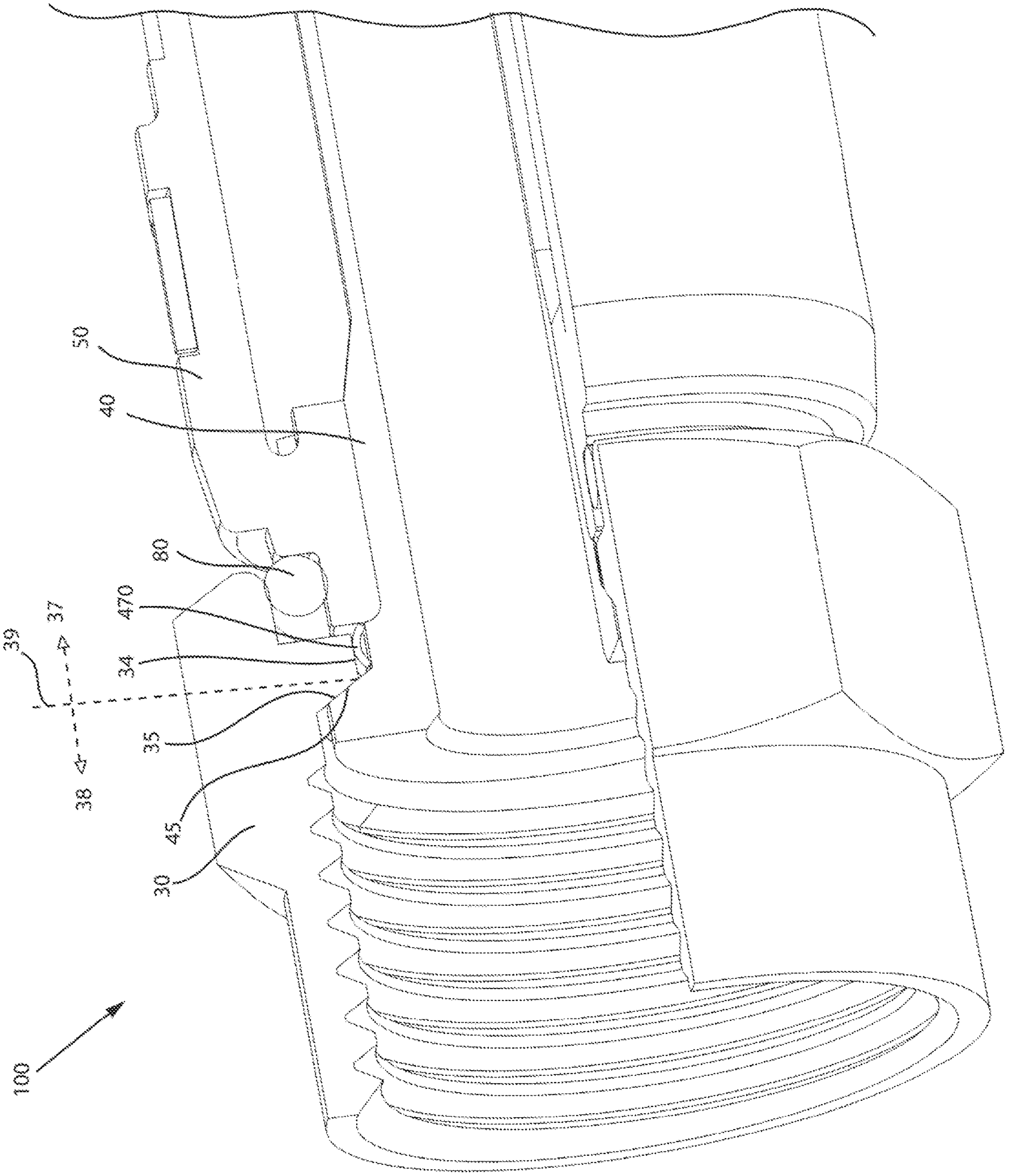
FIG. 15 depicts a perspective cut-away view of a portion of an assembled embodiment of a coaxial cable connector having the electrical continuity member of FIG. 14, in accordance with the present invention.
Figure 16:
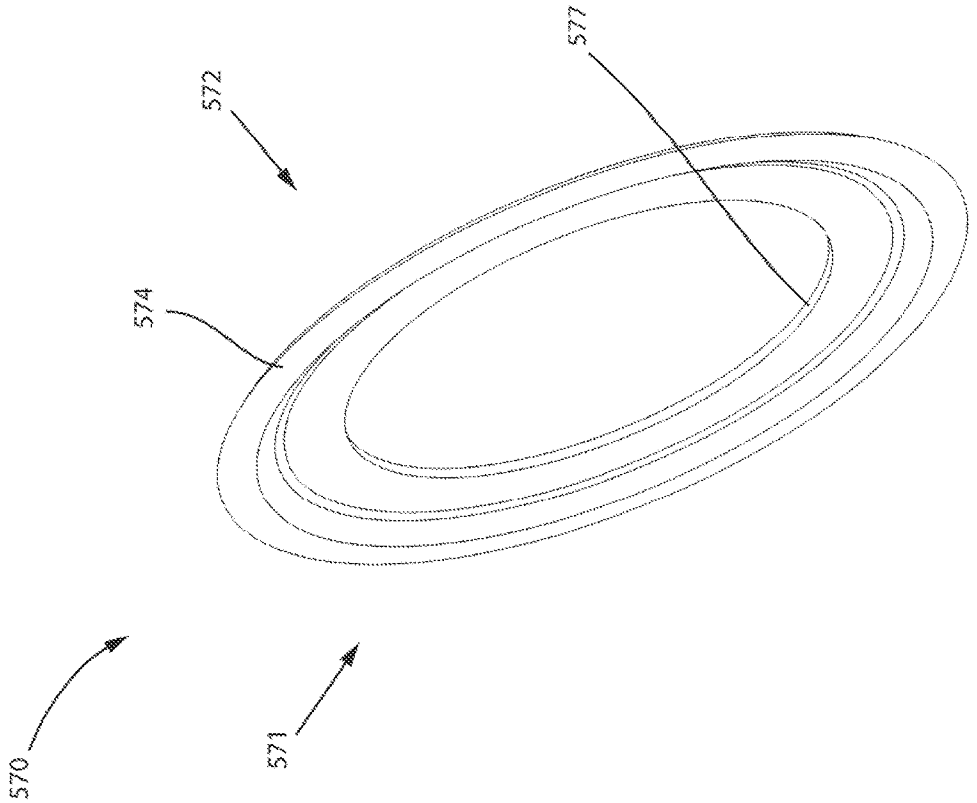
FIG. 16 depicts a perspective view of even another embodiment of an electrical continuity member, in accordance with the present invention.
Figure 17:
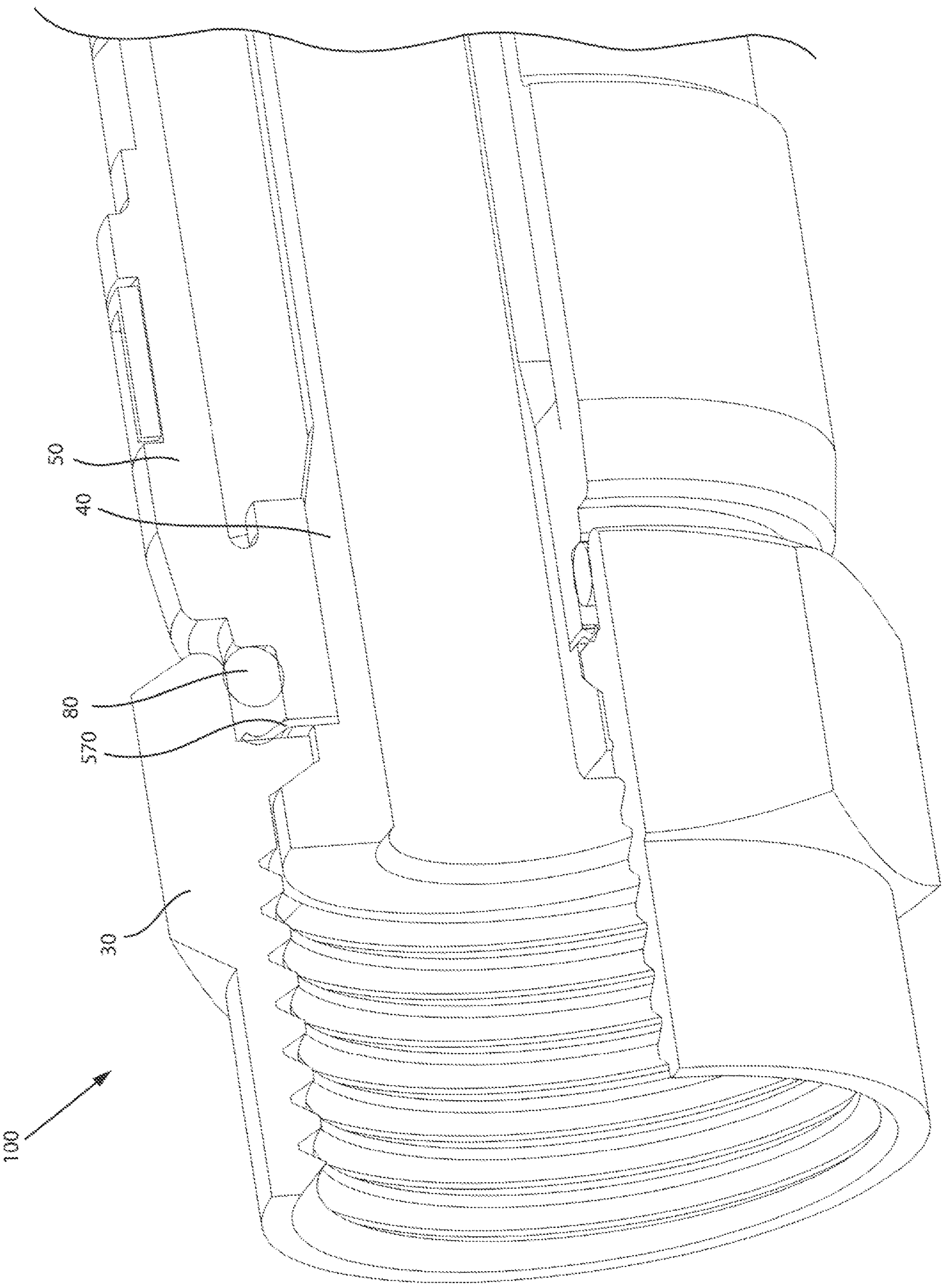
FIG. 17 depicts a perspective cut-away view of a portion of an assembled embodiment of a coaxial cable connector having the electrical continuity member of FIG. 16, in accordance with the present invention.
Figure 18:
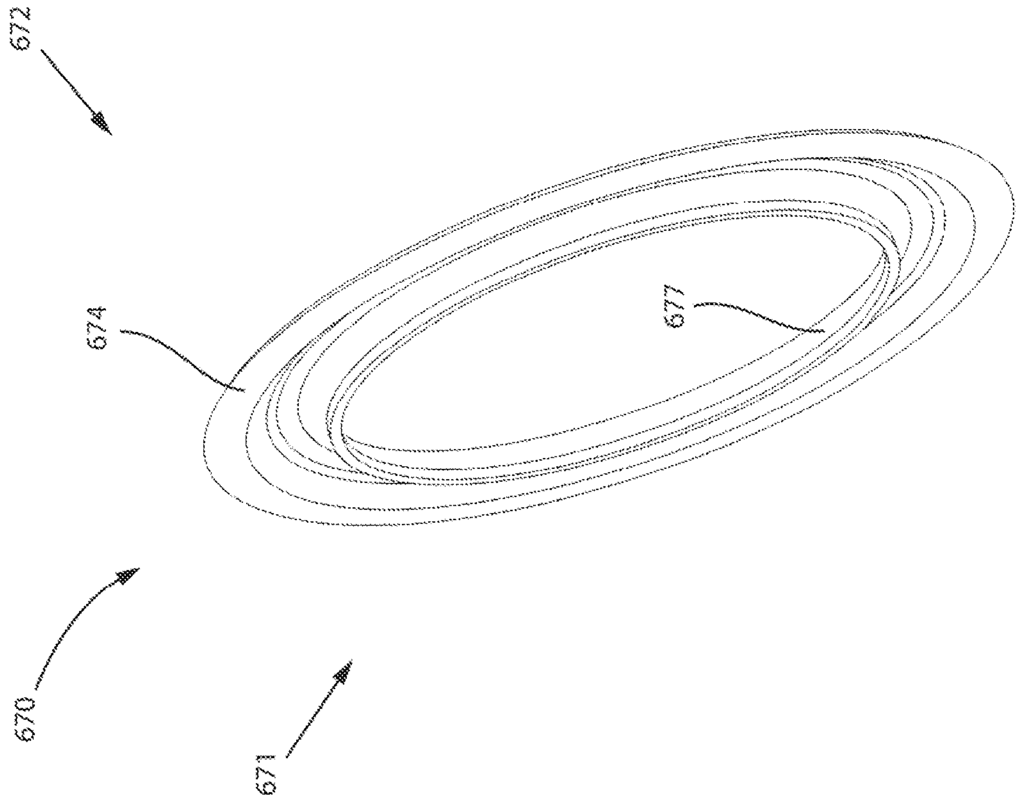
FIG. 18 depicts a perspective view of still even a further embodiment of an electrical continuity member, in accordance with the present invention.
Figure 19:
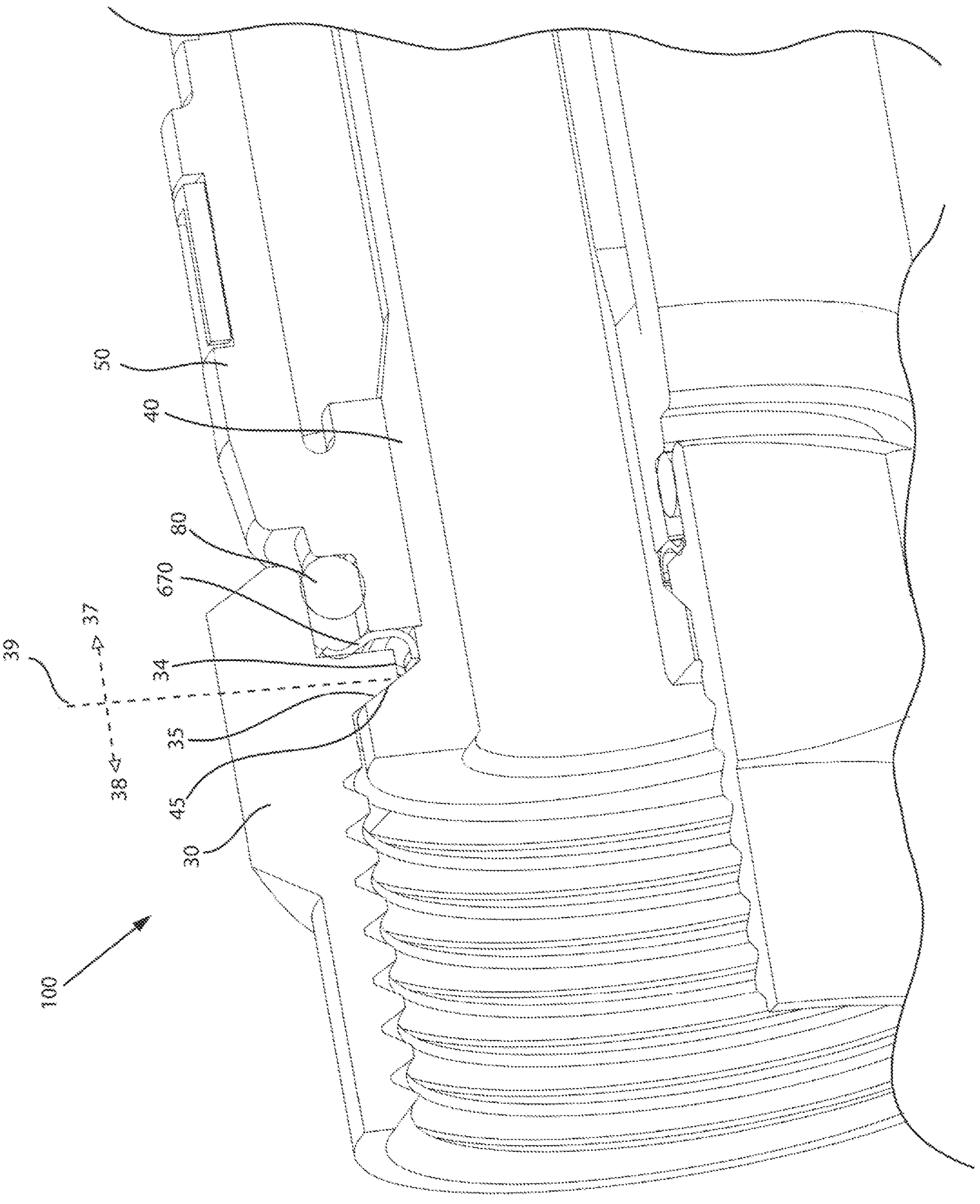
FIG. 19 depicts a perspective cut-away view of a portion of an assembled embodiment of a coaxial cable connector having the electrical continuity member of FIG. 18, in accordance with the present invention.

With continued reference to the drawings, FIGS. 5-7 depict perspective cut-away views of portions of embodiments of coaxial cable connectors 100 having an electrical continuity member 70, as assembled, in accordance with the present invention. In particular, FIG. 6 depicts a coaxial cable connector embodiment 100 having a shortened nut 30*a*, wherein the second rearward end 32*a* of the nut 30*a* does not extend as far as the second rearward end 32 of nut 30 depicted in FIG. 5. FIG. 7 depicts a coaxial cable connector embodiment 100 including an electrical continuity member 70 that does not touch the connector body 50, because the connector body 50 includes an internal detent 56 that, when assembled, ensures a physical gap between the continuity member 70 and the connector body 50. A continuity member 70 may be positioned around an external surface of the post 40 during assembly, while the post 40 is axially inserted into position with respect to the nut 30. The continuity member 70 should have an inner diameter sufficient to allow it to move up a substantial length of the post body 40 until it contacts a portion of the post 40 proximate the flange 44 at the first end 41 of the post 40.

The continuity member 70 should be configured and positioned so that, when the coaxial cable connector 100 is assembled, the continuity member 70 resides rearward a second end portion 37 of the nut 30, wherein the second end portion 37 starts at a side 35 of the lip 34 of the nut facing the first end 31 of the nut 30 and extends rearward to the second end 32 of the nut 30. The location or the continuity member 70 within a connector 100 relative to the second end portion 37 of the nut being disposed axially rearward of a surface 35 of the internal lip 34 of the nut 30 that faces the flange 44 of the post 40. The second end portion 37 of the nut 30 extends from the second rearward end 32 of the nut 30 to the axial location of the nut 30 that corresponds to the point of the forward facing side 35 of the internal lip 34 that faces the first forward end 31 of the nut 30 that is also nearest the second end 32 of the nut 30. Accordingly, the first end portion 38 of the nut 30 extends from the first end 31 of the nut 30 to that same point of the forward facing side 35 of the lip 34 that faces the first forward end 31 of the nut 30 that is nearest the second end 32 of the nut 30. For convenience, dashed line 39 shown in FIG. 5, depicts the axial point and a relative radial perpendicular plane defining the demarcation of the first end portion 38 and the second end portion 37 of embodiments of the nut 30. As such, the continuity member 70 does not reside between opposing complimentary surfaces 35 and 45 of the lip 34 of the nut 30 and the flange 44 of the post 40. Rather, the continuity member 70 contacts the nut 30 at a location rearward and other than on the side 35 of the lip 34 of the nut 30 that faces the flange 44 of the post 40, at a location only pertinent to and within the second end 37 portion of the nut 30.

With further reference to FIGS. 5-7, a body sealing member 80, such as an O-ring, may be located proximate the second end portion 37 of the nut 30 in front of the internal lip 34 of the nut 30, so that the sealing member 80 may compressibly rest or be squeezed between the nut 30 and the connector body 50. The body sealing member 80 may fit snugly over the portion of the body 50 corresponding to the annular recess 58 proximate the first end 51 of the body 50. However, those in the art should appreciate that other locations of the sealing member 80 corresponding to other structural configurations of the nut 30 and body 50 may be employed to operably provide a physical seal and barrier to ingress of environmental contaminants. For example, embodiments of a body sealing member 80 may be structured and operably assembled with a coaxial cable connector 100 to prevent contact between the nut 30 and the connector body 50.

When assembled, as in FIGS. 5-7, embodiments of a coaxial cable connector 100 may have axially secured components. For example, the body 50 may obtain a physical fit with respect to the continuity member 70 and portions of the post 40, thereby securing those components together both axially and rotationally. This fit may be engendered through press-fitting and/or friction-fitting forces, and/or the fit may be facilitated through structures which physically interfere with each other in axial and/or rotational configurations. Keyed features or interlocking structures on any of the post 40, the connector body 50, and/or the continuity member 70, may also help to retain the components with respect to each other. For instance, the connector body 50 may include an engagement feature 54, such as an internal ridge that may engage the securing member(s) 75, such as tabs 75*a-c*, to foster a configuration wherein the physical structures, once assembled, interfere with each other to prevent axial movement with respect to each other. Moreover, the same securing structure(s) 75, or other structures, may be employed to help facilitate prevention of rotational movement of the component parts with respect to each other. Additionally, the flange 44 of the post 40 and the internal lip 34 of the nut 30 work to restrict axial movement of those two components with respect to each other toward each other once the lip 34 has contacted the flange 44. However, the assembled configuration should not prevent rotational movement of the nut 30 with respect to the other coaxial cable connector 100 components. In addition, when assembled, the fastener member 60 may be secured to a portion of the body 50 so that the fastener member 60 may have some slidable axial freedom with respect to the body 50, thereby permitting operable attachment of a coaxial cable 10. Notably, when embodiments of a coaxial cable connector 100 are assembled, the continuity member 70 is disposed at the second end portion 37 of the nut 30, so that the continuity member 70 physically and electrically contacts both the nut 30 and the post 40, thereby extending ground continuity between the components.

With continued reference to the drawings, FIGS. 8-19 depict various continuity member embodiments 170-670 and show how those embodiments are secured within coaxial cable connector 100 embodiments, when assembled. As depicted, continuity members may vary in shape and functionality. However, all continuity members have at least a conductive portion and all reside rearward of the forward facing surface 35 of the internal lip 34 of the nut 30 and rearward the start of the second end portion 37 of the nut 30 of each coaxial cable connector embodiment 100 into which they are assembled. For example, a continuity member embodiment 170 may have multiple flange cutouts 176*a-c*. A continuity member embodiment 270 includes a nut contact portion 274 configured to reside radially between the nut 30 and the post 40 rearward the start of the second end portion 37 of the nut 30, so as to be rearward of the forward facing surface 35 of the internal lip 34 of the nut. A continuity member embodiment 370 is shaped in a manner kind of like a top hat, wherein the nut contact portion 374 contacts a portion of the nut 30 radially between the nut 30 and the connector body 50. A continuity member embodiment 470 resides primarily radially between the innermost part of the lip 34 of nut 30 and the post 40, within the second end portion 37 of the nut 30. In particular, the nut 30 of the coaxial cable connector 100 having continuity member 470 does not touch the connector body 50 of that same coaxial cable connector 100. A continuity member embodiment 570 includes a post contact portion 577, wherein only a radially inner edge of the continuity member 570, as assembled, contacts the post 40. A continuity member embodiment 670 includes a post contact portion that resides radially between the lip 34 of the nut 30 and the post 40, rearward the start of the second end portion 37 of the nut 30.

Figure 20:
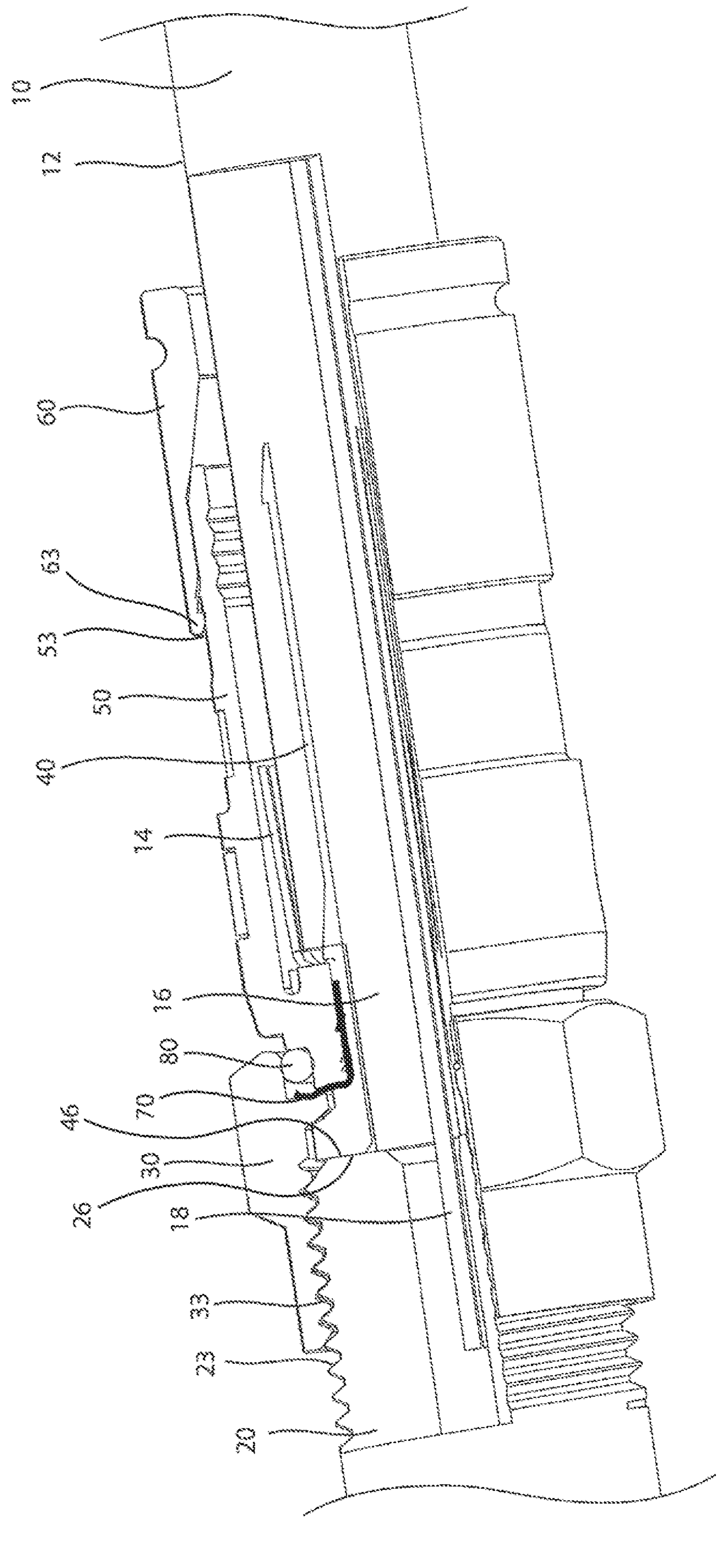
FIG. 20 depicts a perspective cut-away view of an embodiment of a coaxial cable connector including an electrical continuity member and having an attached coaxial cable, the connector mated to an interface port, in accordance with the present invention.

Turning now to FIG. 20, an embodiment of a coaxial cable connector 100 is depicted in a mated position on an interface port 20. As depicted, the coaxial cable connector 100 is fully tightened onto the interface port 20 so that the mating edge 26 of the interface port 20 contacts the mating edge 46 of the post 40 of the coaxial cable connector 100. Such a fully tightened configuration provides optimal grounding performance of the coaxial cable connector 100. However, even when the coaxial connector 100 is only partially installed on the interface port 20, the continuity member 70 maintains an electrical ground path between the mating port 20 and the outer conductive shield (ground 14) of cable 10. The ground path extends from the interface port 20 to the nut 30, to the continuity member 70, to the post 40, to the conductive grounding shield 14. Thus, this continuous grounding path provides operable functionality of the coaxial cable connector 100 allowing it to work as it was intended even when the connector 100 is not fully tightened.

Figure 21:
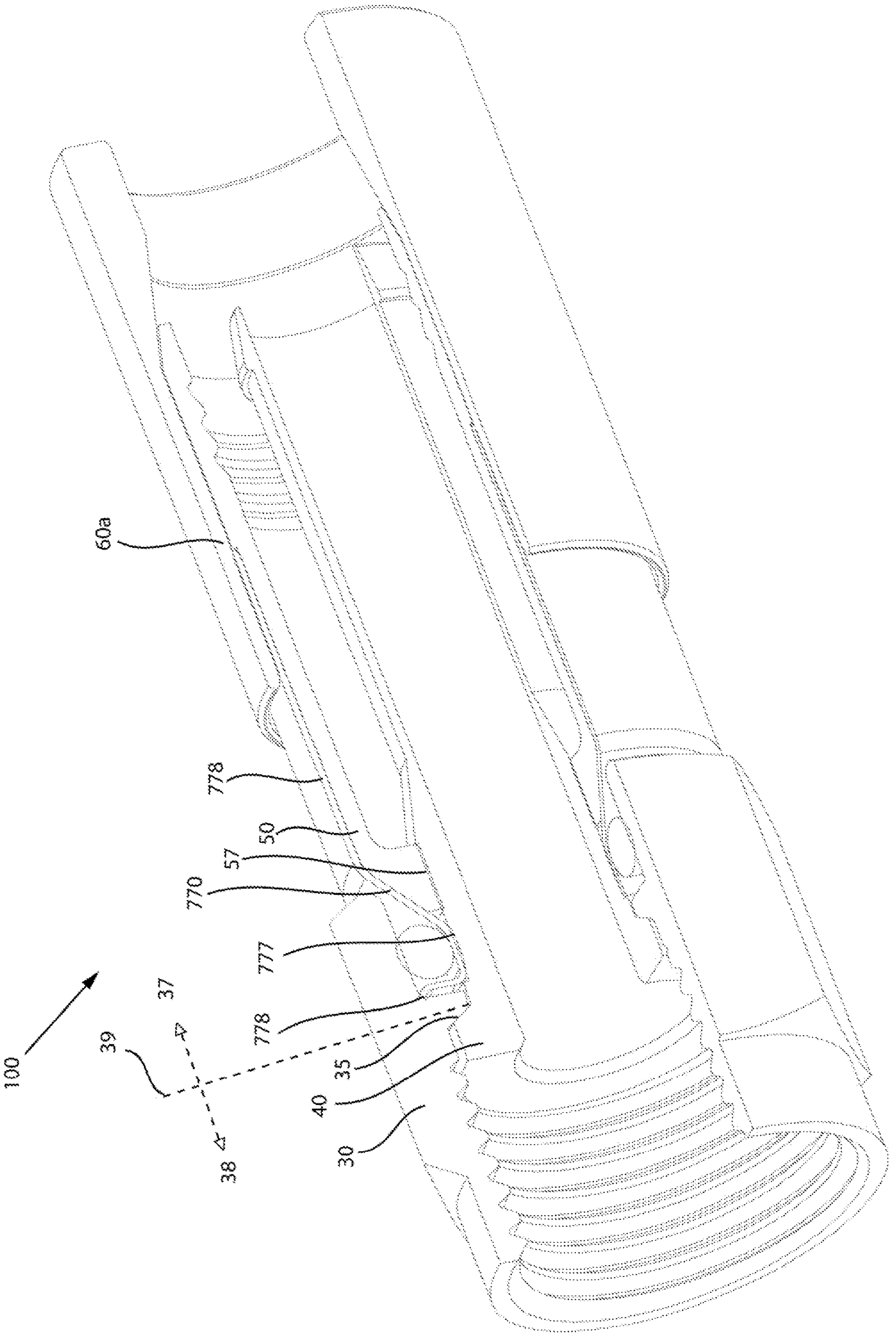
FIG. 21 depicts a perspective cut-away view of an embodiment of a coaxial cable connector having still even another embodiment of an electrical continuity member, in accordance with the present invention.
Figure 22:
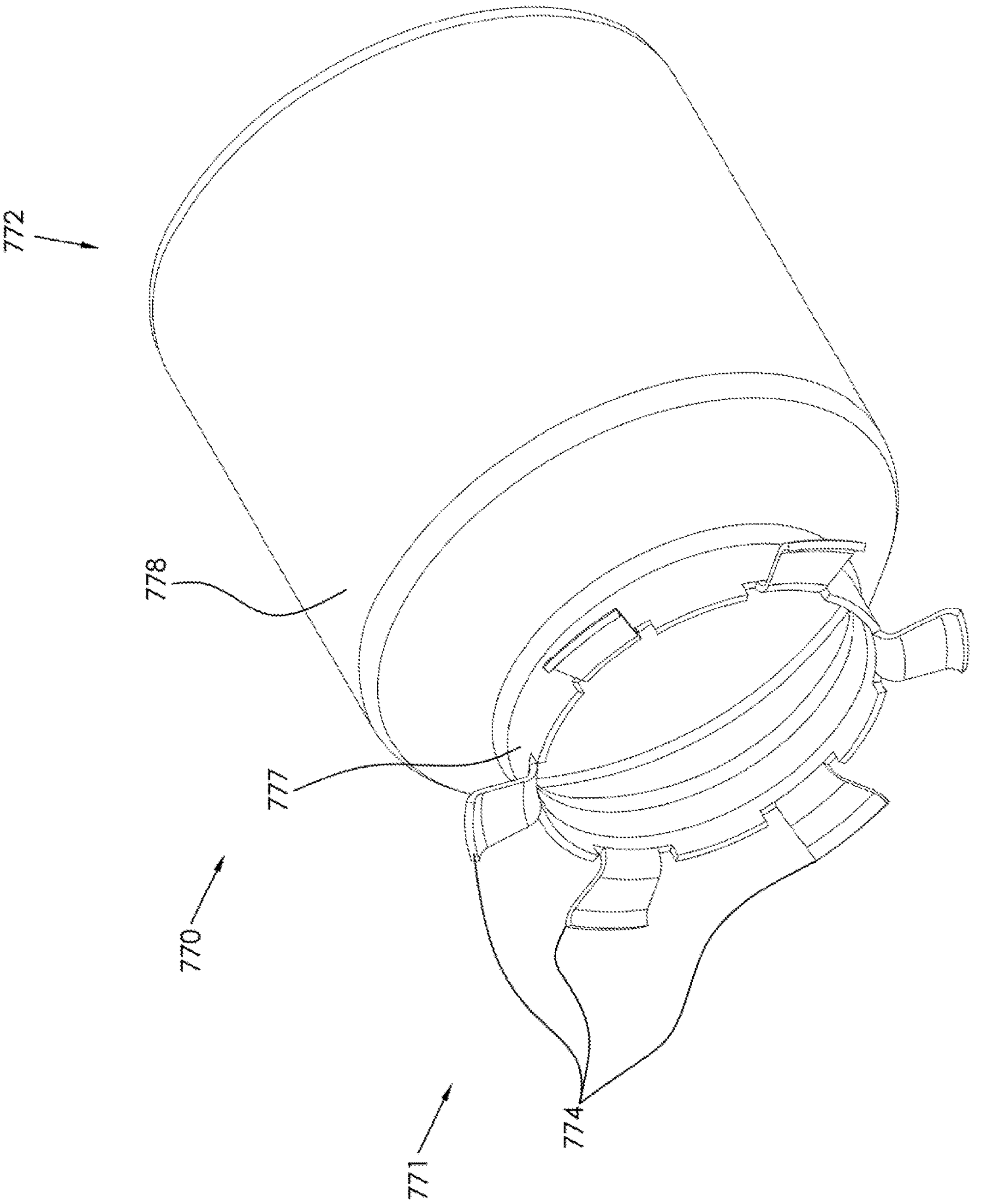
FIG. 22 depicts a perspective view of the embodiment of the electrical continuity member depicted in FIG. 21, in accordance with the present invention.
Figure 23:
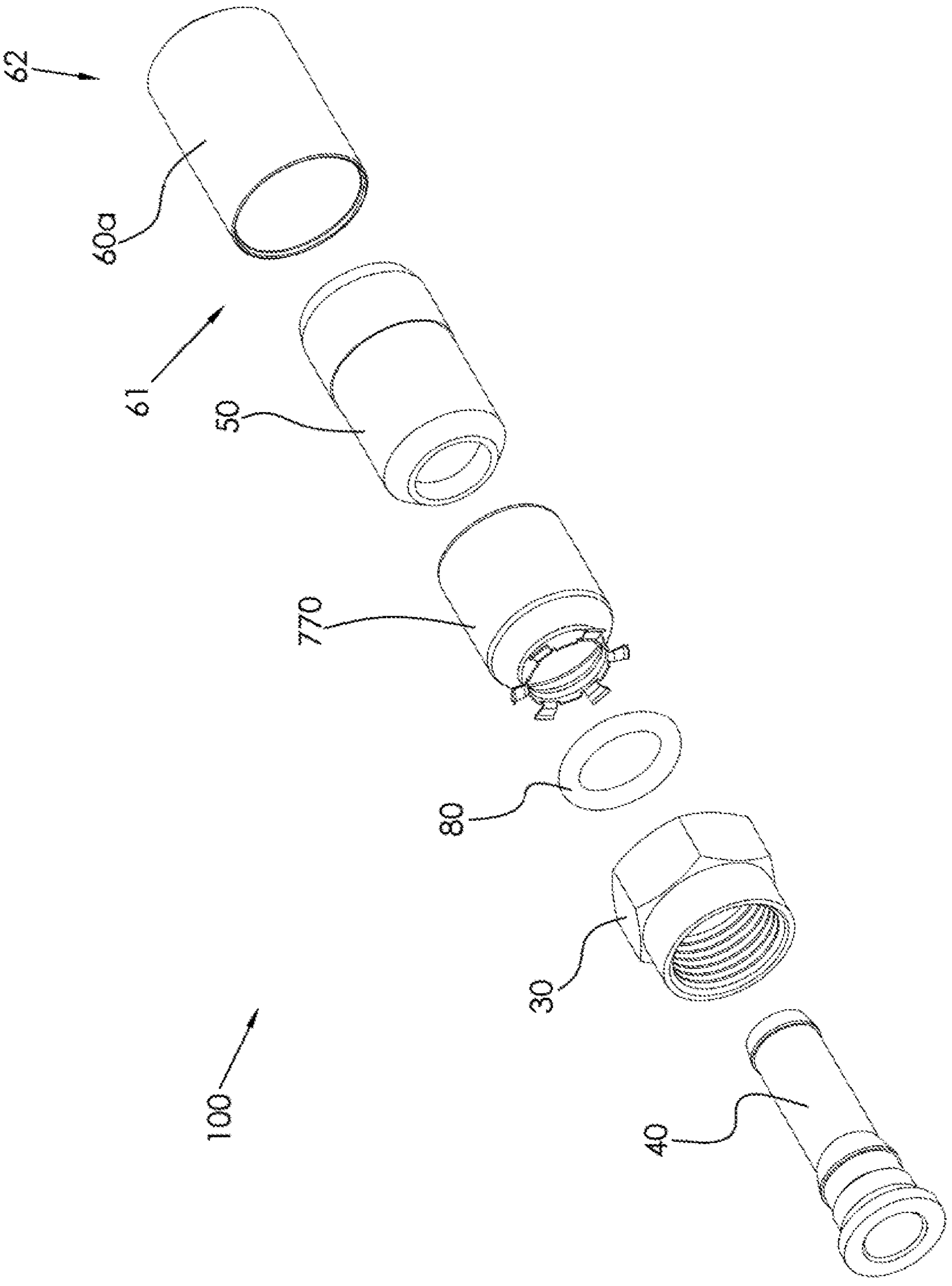
FIG. 23 an exploded perspective view of the embodiment of the coaxial cable connector of FIG. 21, in accordance with the present invention.

With continued reference to the drawings, FIG. 21-23 depict cut-away, exploded, perspective views of an embodiment of a coaxial cable connector 100 having still even another embodiment of an electrical continuity member 770, in accordance with the present invention. As depicted, the continuity member 770 does not reside in the first end portion 38 of the nut 30. Rather, portions of the continuity member 770 that contact the nut 30 and the post 40, such as the nut contacting portion(s) 774 and the post contacting portion 777, reside rearward the start (beginning at forward facing surface 35) of the second end portion 37 of the nut 30, like all other embodiments of continuity members. The continuity member 770, includes a larger diameter portion 778 that receives a portion of a connector body 50, when the coaxial cable connector 100 is assembled. In essence, the continuity member 770 has a sleeve-like configuration and may be press-fit onto the received portion of the connector body 50. When the coaxial cable connector 100 is assembled, the continuity member 770 resides between the nut 30 and the connector body 50, so that there is no contact between the nut 30 and the connector body 50. The fastener member 60*a* may include an axially extended first end 61. The first end 61 of the fastener member 60 may extend an axial distance so that, when the fastener member 60*a* is compressed into sealing position on the coaxial cable 100 (not shown, but readily comprehensible by those of ordinary skill in the art), the fastener member 60*a* touches or otherwise resides substantially proximate or very near the nut 30. This touching, or otherwise close contact between the nut 30 and the fastener member 60 coupled with the in-between or sandwiched location of the continuity member 770 may facilitate enhanced prevention of RF ingress and/or ingress of other environmental contaminants into the coaxial cable connector 100 at or near the second end 32 of the nut 30. As depicted, the continuity member 770 and the associated connector body 50 may be press-fit onto the post 40, so that the post contact portion 777 of the continuity member 770 and the post mounting portion 57 of the connector body 50 are axially and rotationally secured to the post 40. The nut contacting portion(s) 774 of the continuity member 770 are depicted as resilient members, such as flexible fingers, that extend to resiliently engage the nut 30. This resiliency of the nut contact portions 774 may facilitate enhanced contact with the nut 30 when the nut 30 moves during operation of the coaxial cable connector 100, because the nut contact portions 774 may flex and retain constant physical and electrical contact with the nut 30, thereby ensuring continuity of a grounding path extending through the nut 30.

Figure 24:
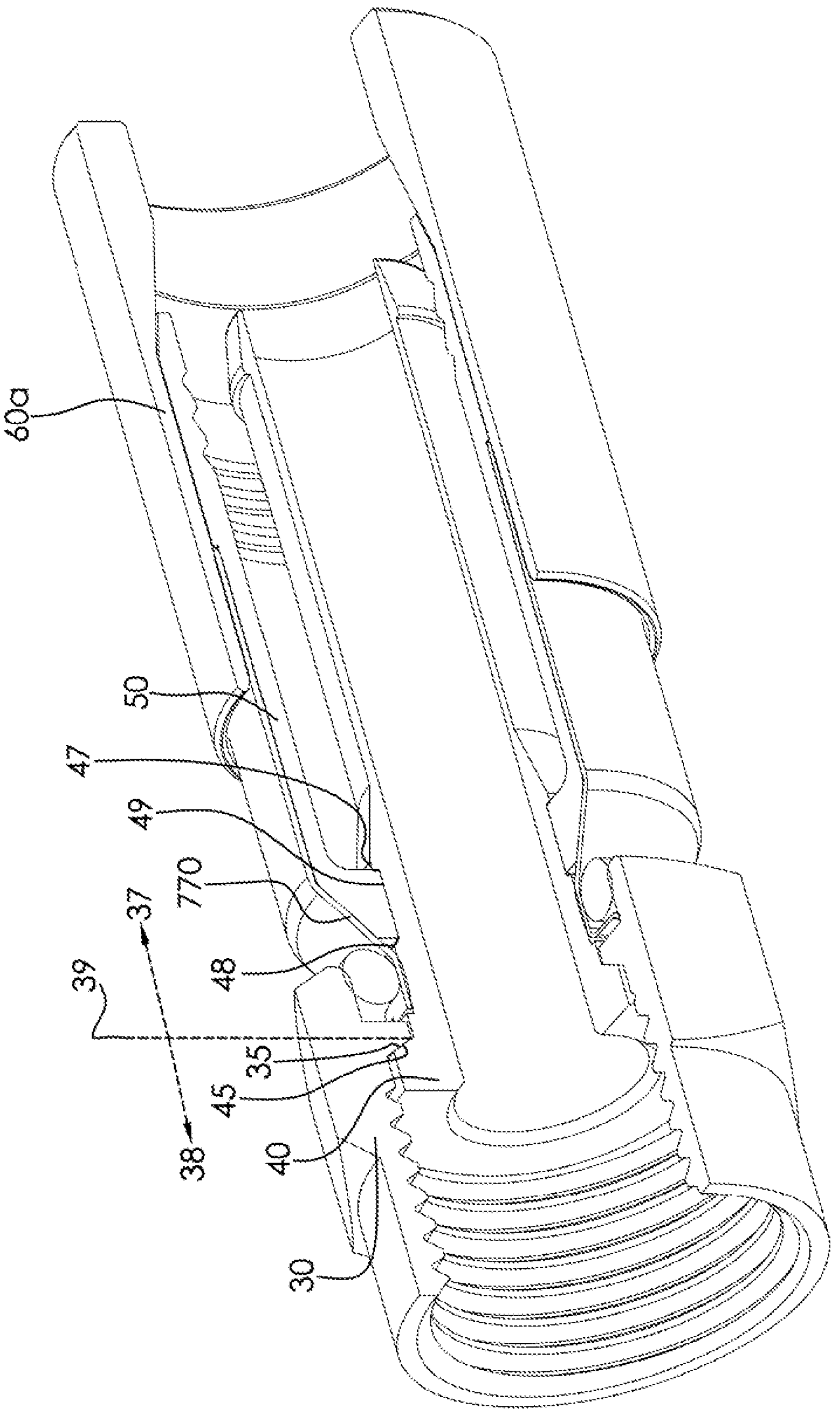
FIG. 24 depicts a perspective cut-away view of another embodiment of a coaxial cable connector having the embodiment of the electrical continuity member depicted in FIG. 22, in accordance with the present invention.
Figure 25:
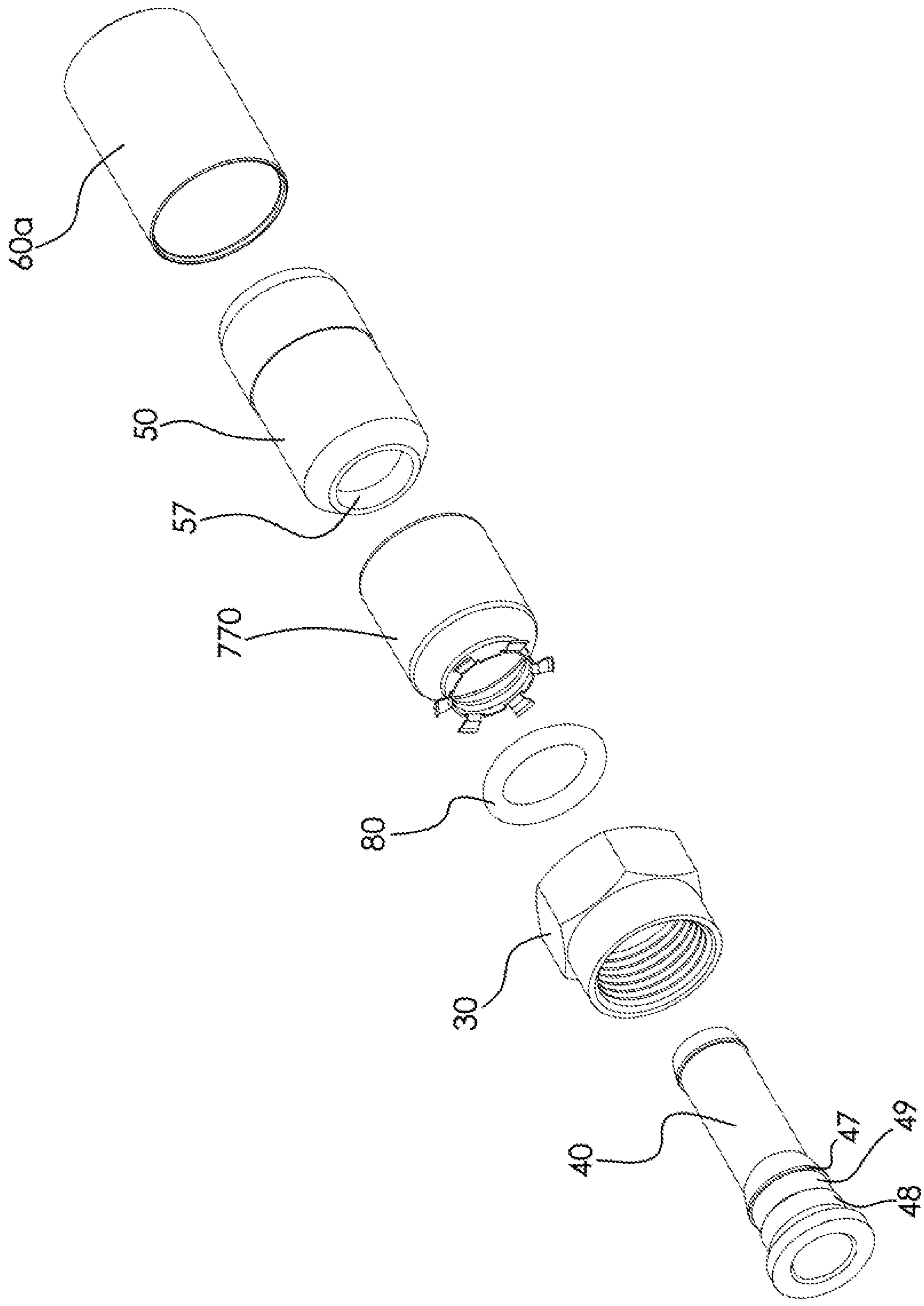
FIG. 25 depicts an exploded perspective view of the embodiment of the coaxial cable connector of FIG. 24, in accordance with the present invention.

Referring still further to the drawings, FIGS. 24-25 depict perspective views of another embodiment of a coaxial cable connector 100 having a continuity member 770. As depicted, the post 40 may include a surface feature 47, such as a lip extending from a connector body engagement portion 49 having a diameter that is smaller than a diameter of a continuity member engagement portion 48. The surface feature lip 47, along with the variably-diametered continuity member and connector body engagement portions 48 and 49, may facilitate efficient assembly of the connector 100 by permitting various component portions having various structural configurations and material properties to move into secure location, both radially and axially, with respect to one another.

Figure 26:
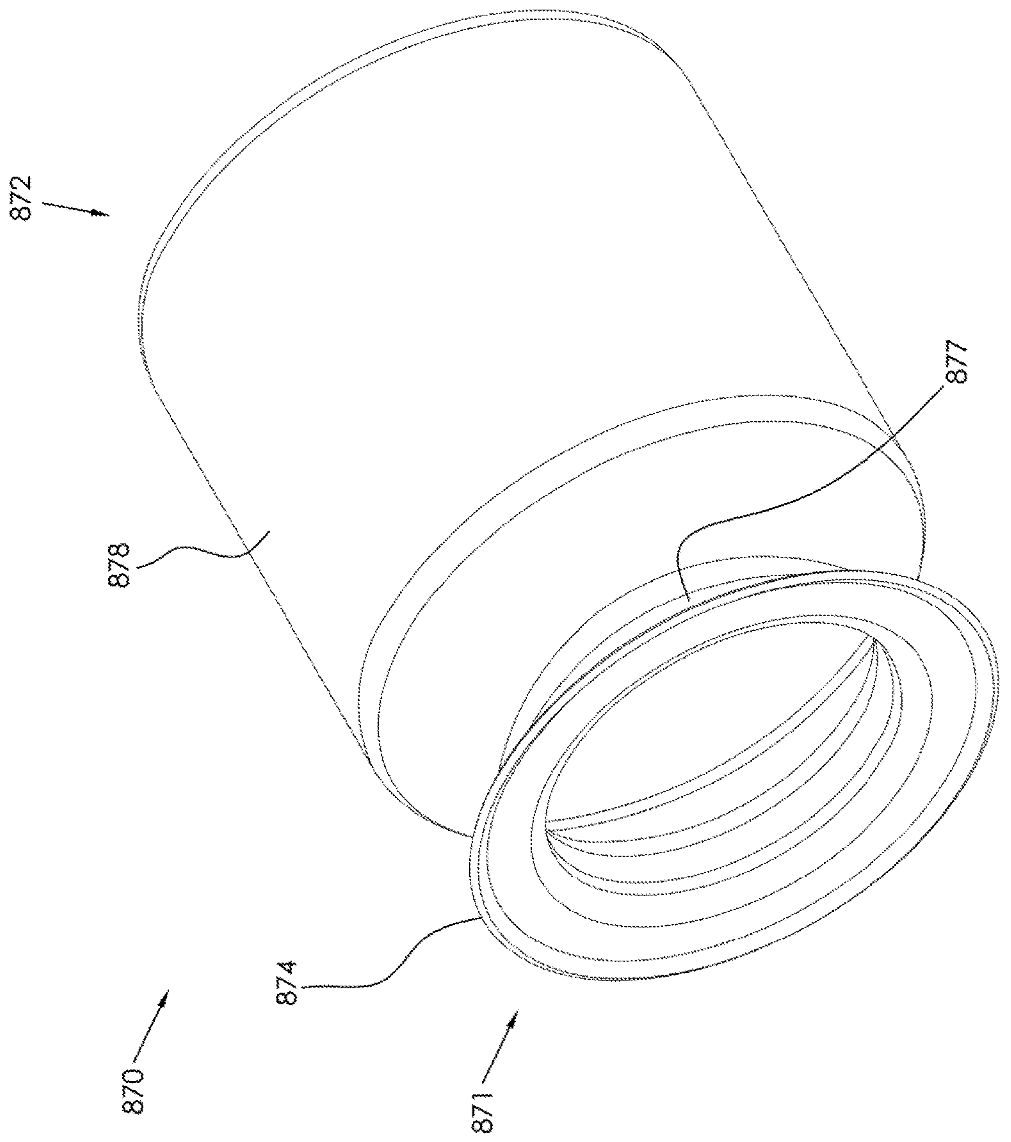
FIG. 26 depicts a perspective view of still further even another embodiment of an electrical continuity member, in accordance with the present invention.
Figure 27:
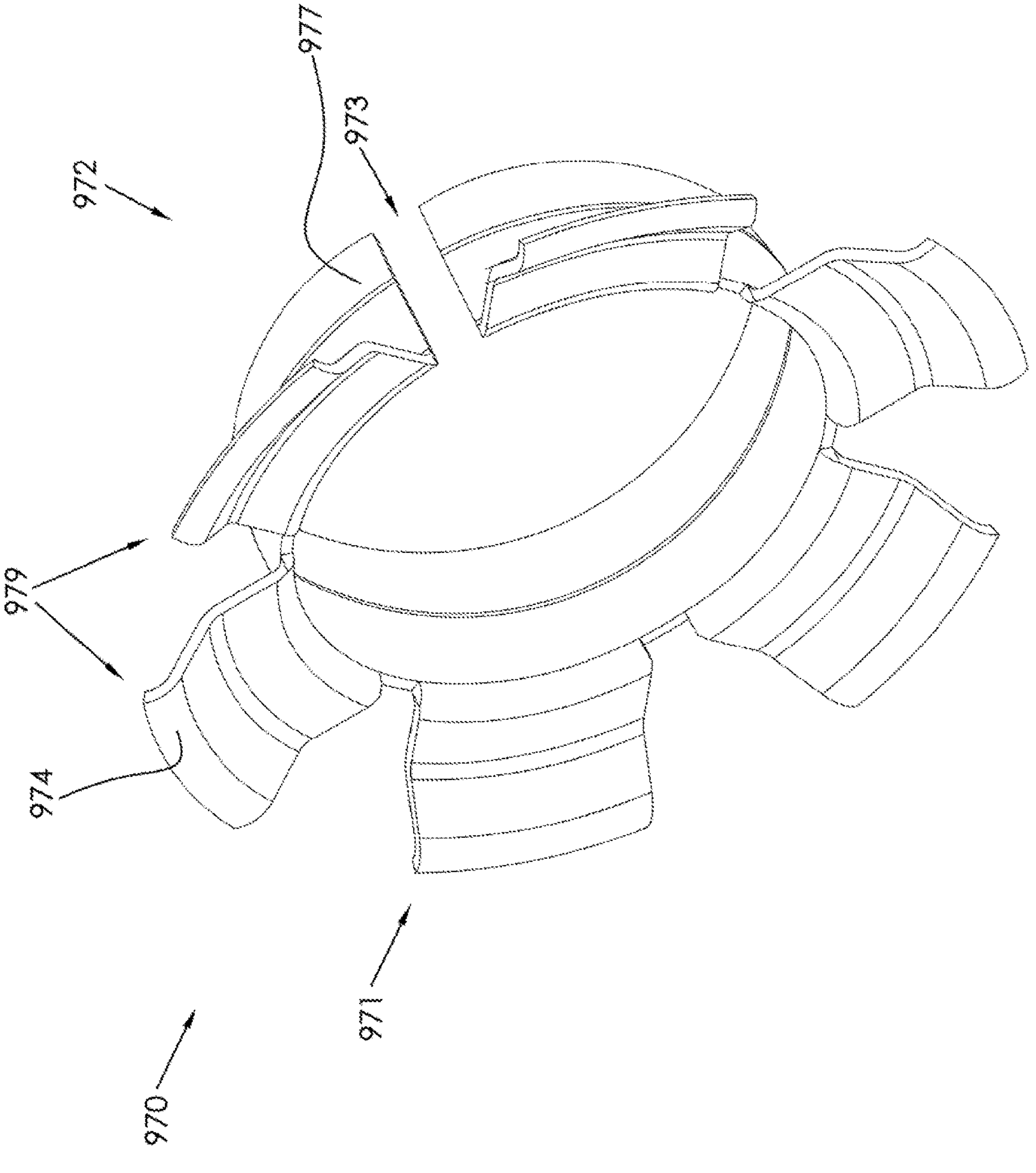
FIG. 27 depicts a perspective view of another embodiment of an electrical continuity member, in accordance with the present invention.
Figure 28:
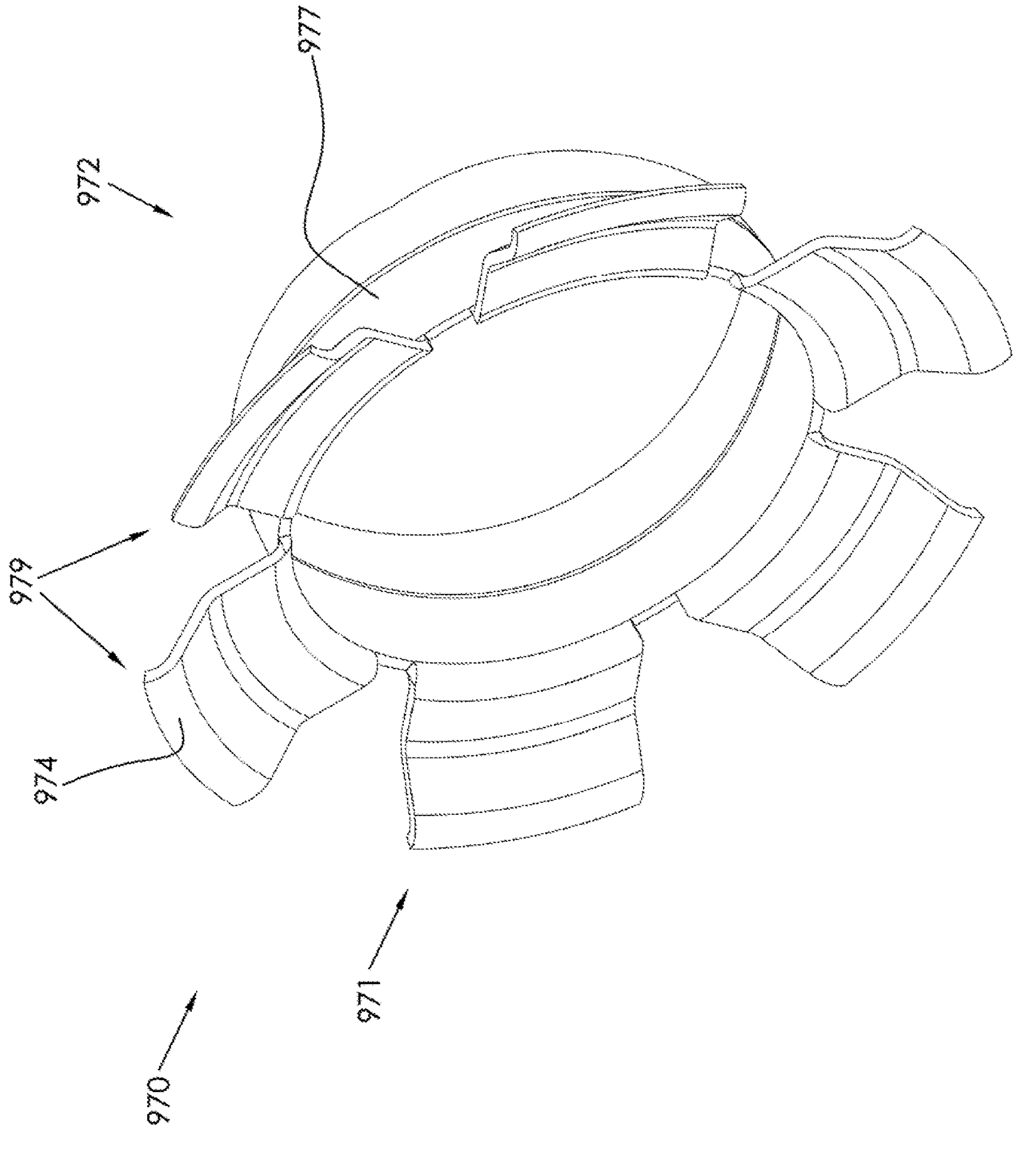
FIG. 28 depicts a perspective view of an embodiment of an electrical continuity depicted in FIG. 27, yet comprising a completely annular post contact portion with no through-slit, in accordance with the present invention.
Figure 29:
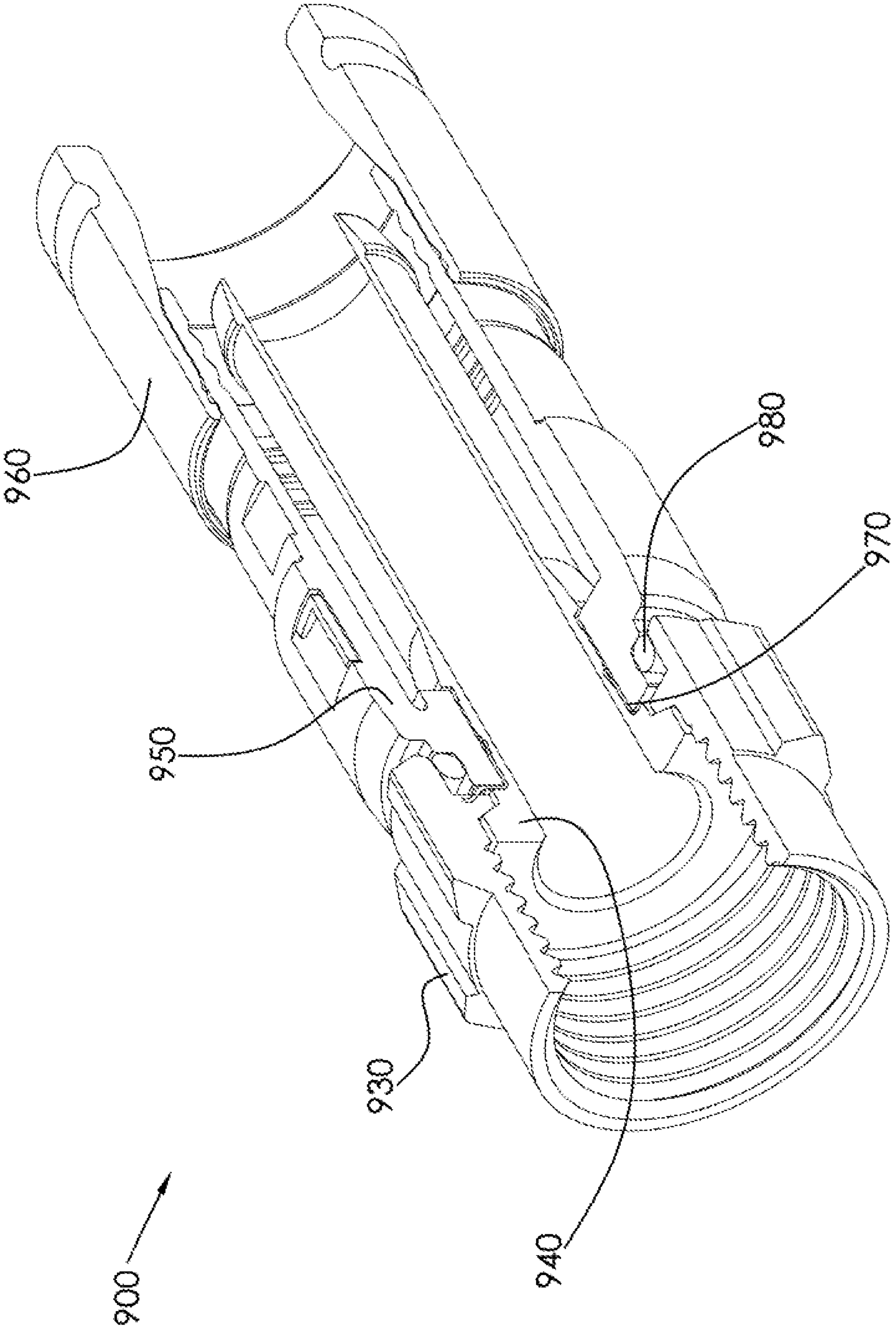
FIG. 29 depicts a perspective cut-away view of another embodiment of a coaxial cable connector operably having either of the embodiments of the electrical continuity member depicted in FIG. 27 or 28, in accordance with the present invention.
Figure 30:
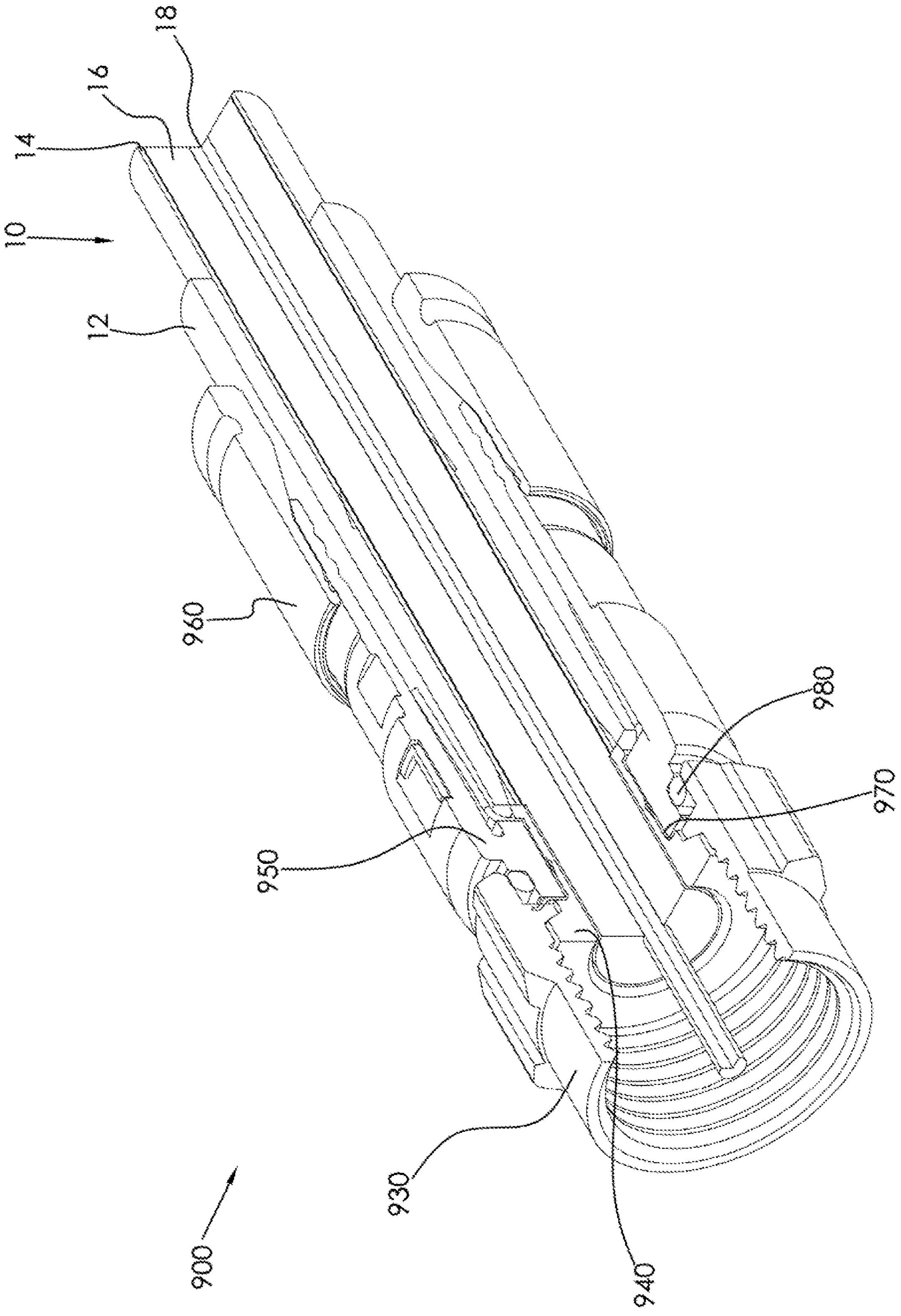
FIG. 30 depicts a perspective cut-away view of the embodiment of a coaxial cable connector of FIG. 29, wherein a cable is attached to the connector, in accordance with the present invention.
Figure 31:
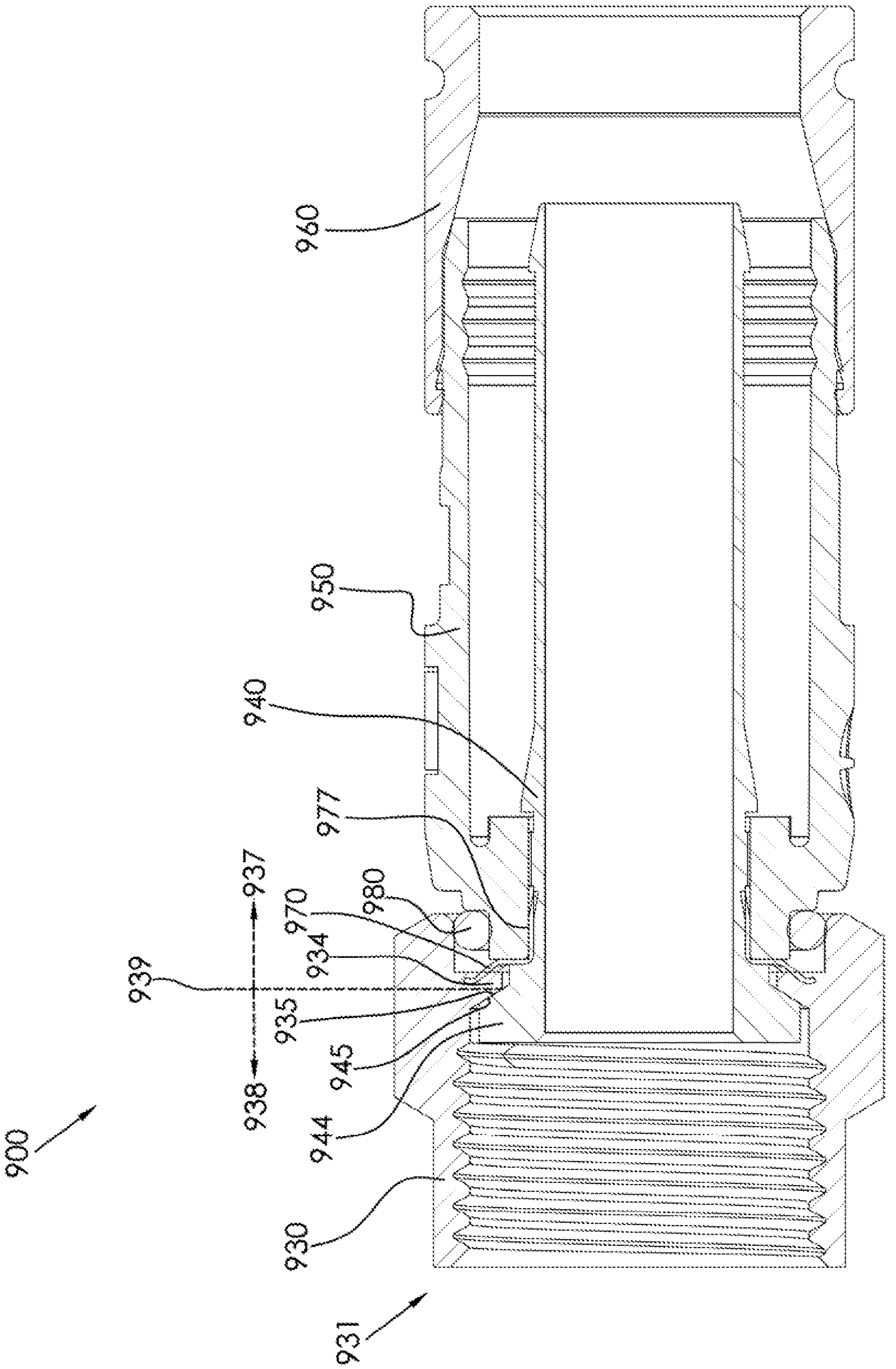
FIG. 31 depicts a side cross-section view of the embodiment of a coaxial cable connector of FIG. 29, in accordance with the present invention.
Figure 32:
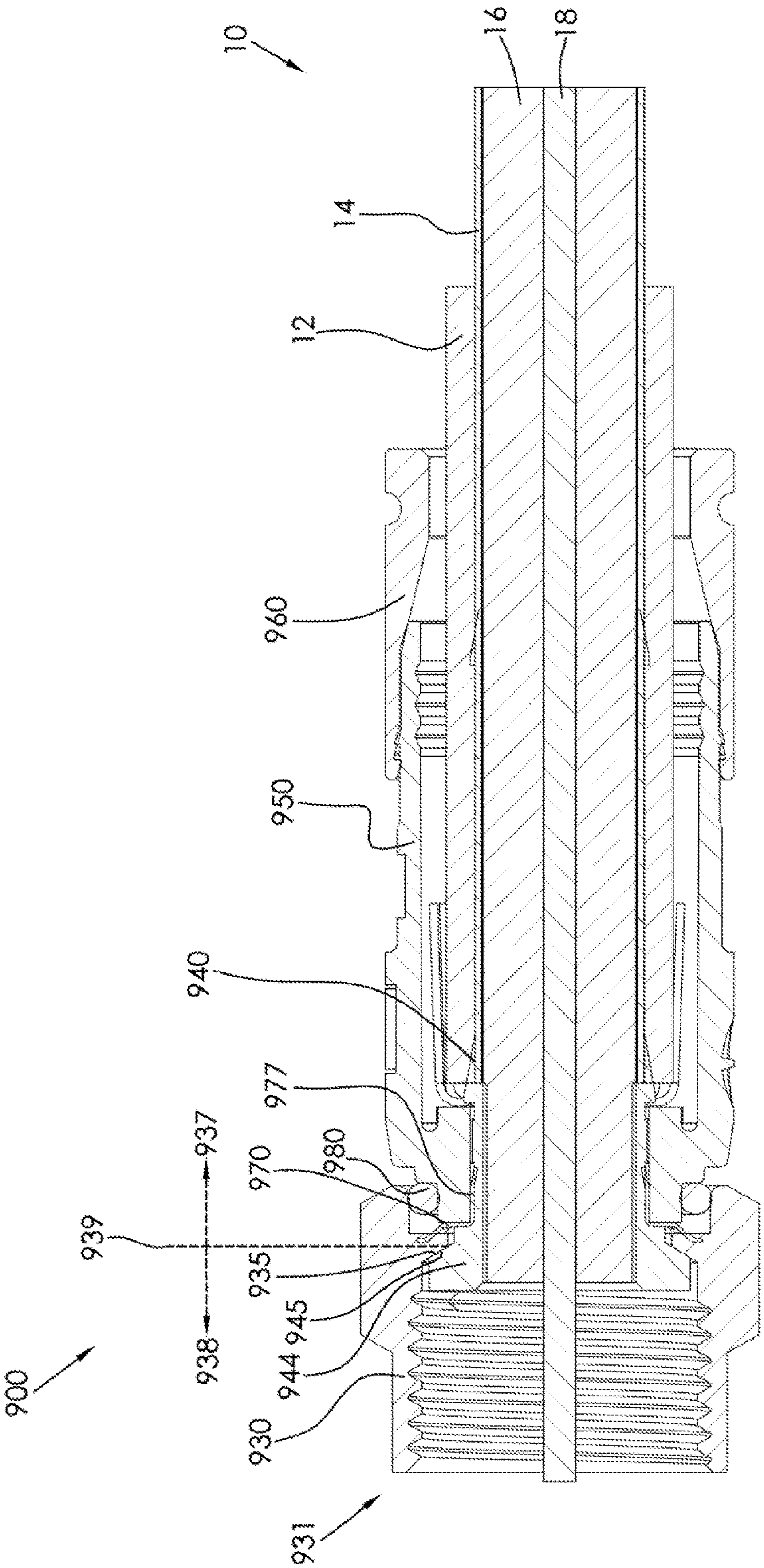
FIG. 32 depicts a perspective cut-away view of the embodiment of a coaxial cable connector of FIG. 29, wherein a cable is attached to the connector, in accordance with the present invention.
Figure 33:
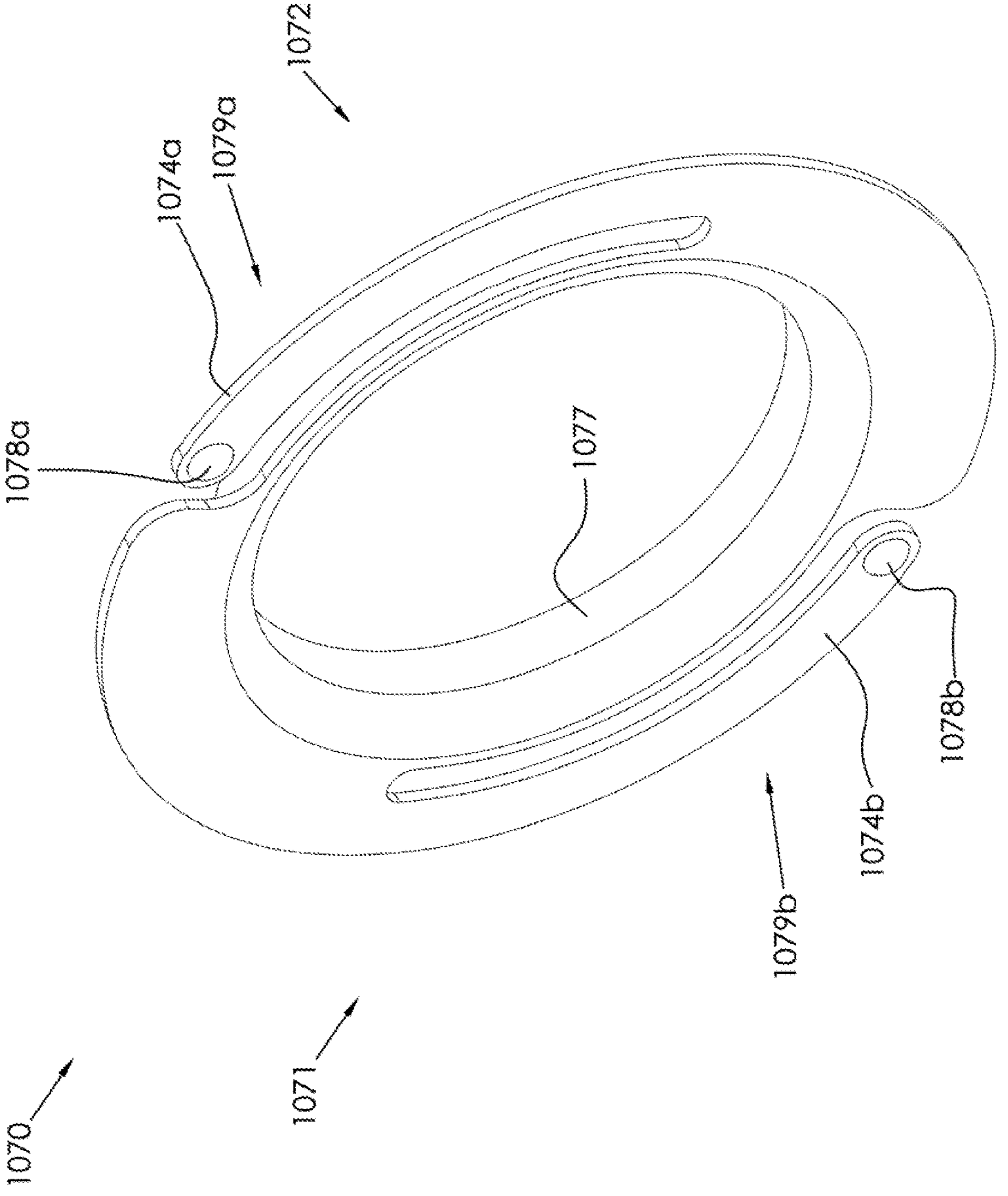
FIG. 33 depicts a perspective view of yet another embodiment of an electrical continuity member, in accordance with the present invention.
Figure 34:
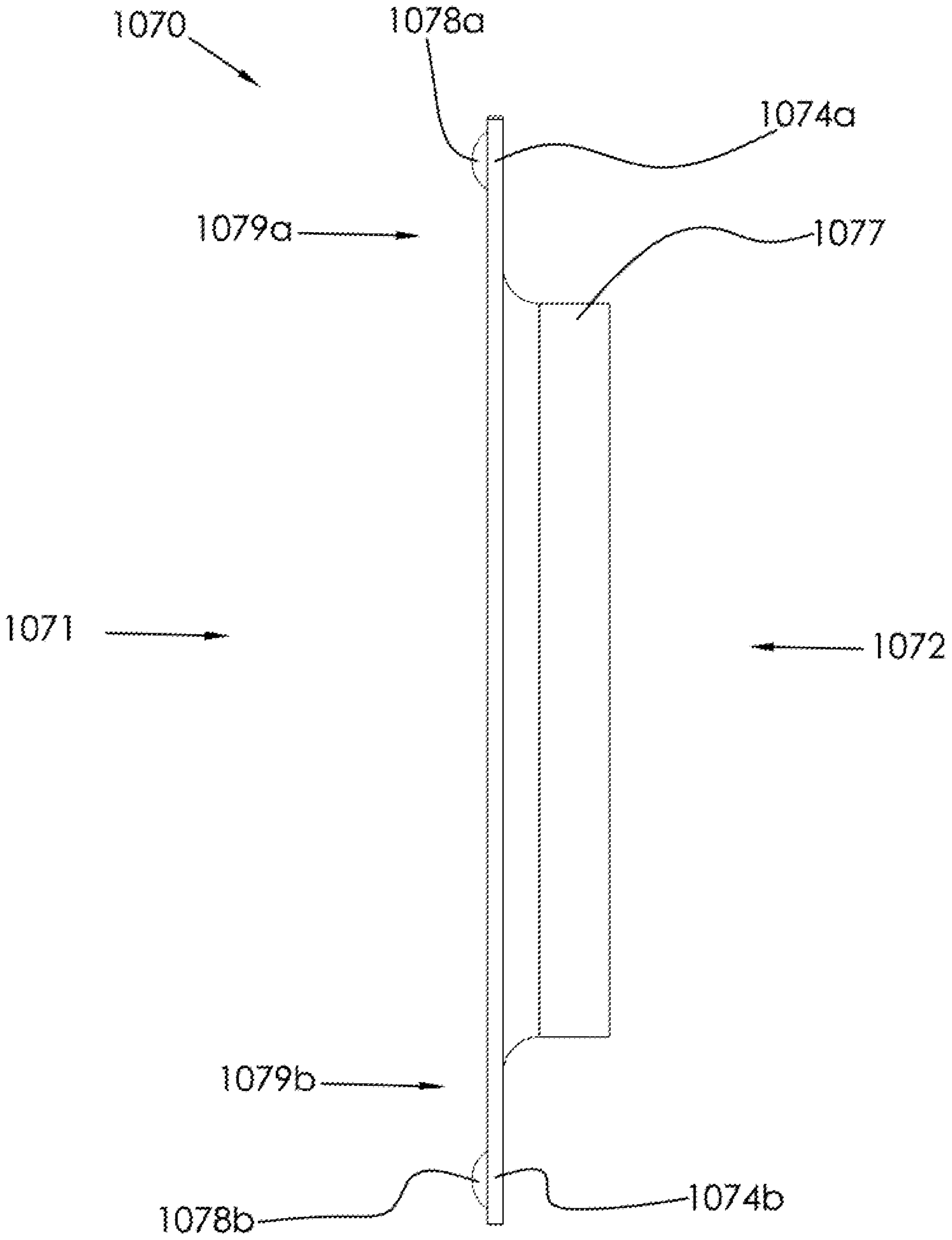
FIG. 34 depicts a side view of the embodiment of an electrical continuity member depicted in FIG. 33, in accordance with the present invention.

With still further reference to the drawings, FIG. 26 depicts a perspective view of still further even another embodiment of an electrical continuity member 870, in accordance with the present invention. The continuity member 870 may be similar in structure to the continuity member 770, in that it is also sleeve-like and extends about a portion of connector body 50 and resides between the nut 30 and the connector body 50 when the coaxial cable connector 100 is assembled. However, the continuity member 870 includes an unbroken flange-like nut contact portion 874 at the first end 871 of the continuity member 870. The flange-like nut contact portion 874 may be resilient and include several functional properties that are very similar to the properties of the finger-like nut contact portion(s) 774 of the continuity member 770. Accordingly, the continuity member 870 may efficiently extend electrical continuity through the nut 30.

With an eye still toward the drawings and with particular respect to FIGS. 27-32, another embodiment of an electrical continuity member 970 is depicted in several views, and is also shown as included in a further embodiment of a coaxial cable connector 900. The electrical continuity member 970 has a first end 971 and a second end 972. The first end 971 of the electrical continuity member 970 may include one or more flexible portions 979. For example, the continuity member 970 may include multiple flexible portions 979, each of the flexible portions 979 being equidistantly arranged so that in perspective view the continuity member 970 looks somewhat daisy-like. However, those knowledgeable in the art should appreciate that a continuity member 970 may only need one flexible portion 979 and associated not contact portion 974 to obtain electrical continuity for the connector 900. Each flexible portion 979 may associate with a nut contact portion 974 of the continuity member 970. The nut contact portion 974 is configured to engage a surface of the nut 930, wherein the surface of the nut 930 that is engaged by the nut contact portion 974 resides rearward the forward facing surface 935 of nut 930 and the start of the second end portion 937 of the nut 930. A post contact portion 977, may physically and electrically contact the post 940. The electrical continuity member 970 may optionally include a through-slit 973, which through-slit 973 may facilitate various processes for manufacturing the member 970, such as those described in like manner above. Moreover, a continuity member 970 with a through-slit 973 may also be associated with different assembly processes and/or operability than a corresponding electrical continuity member 970 that does not include a through-slit.

When in operation, an electrical continuity member 970 should maintain electrical contact with both the post 940 and the nut 930, as the nut 930 operably moves rotationally about an axis with respect to the rest of the coaxial cable connector 900 components, such as the post 940, the connector body 950 and the fastener member 960. Thus, when the connector 900 is fastened with a coaxial cable 10, a continuous electrical shield may extend from the outer grounding sheath 14 of the cable 10, through the post 940 and the electrical continuity member 970 to the nut or coupler 930, which coupler 930 ultimately may be fastened to an interface port (see, for example port 20 of FIG. 1), thereby completing a grounding path from the cable 10 through the port 20. A sealing member 980 may be operably positioned between the nut 930, the post 940, and the connector body 950, so as to keep environmental contaminants from entering within the connector 900, and to further retain proper component placement and prevent ingress of environmental noise into the signals being communicated through the cable 10 as attached to the connector 900. Notably, the design of various embodiments of the coaxial cable connector 900 includes elemental component configuration wherein the nut 930 does not (and even can not) contact the body 950.

Figure 35:
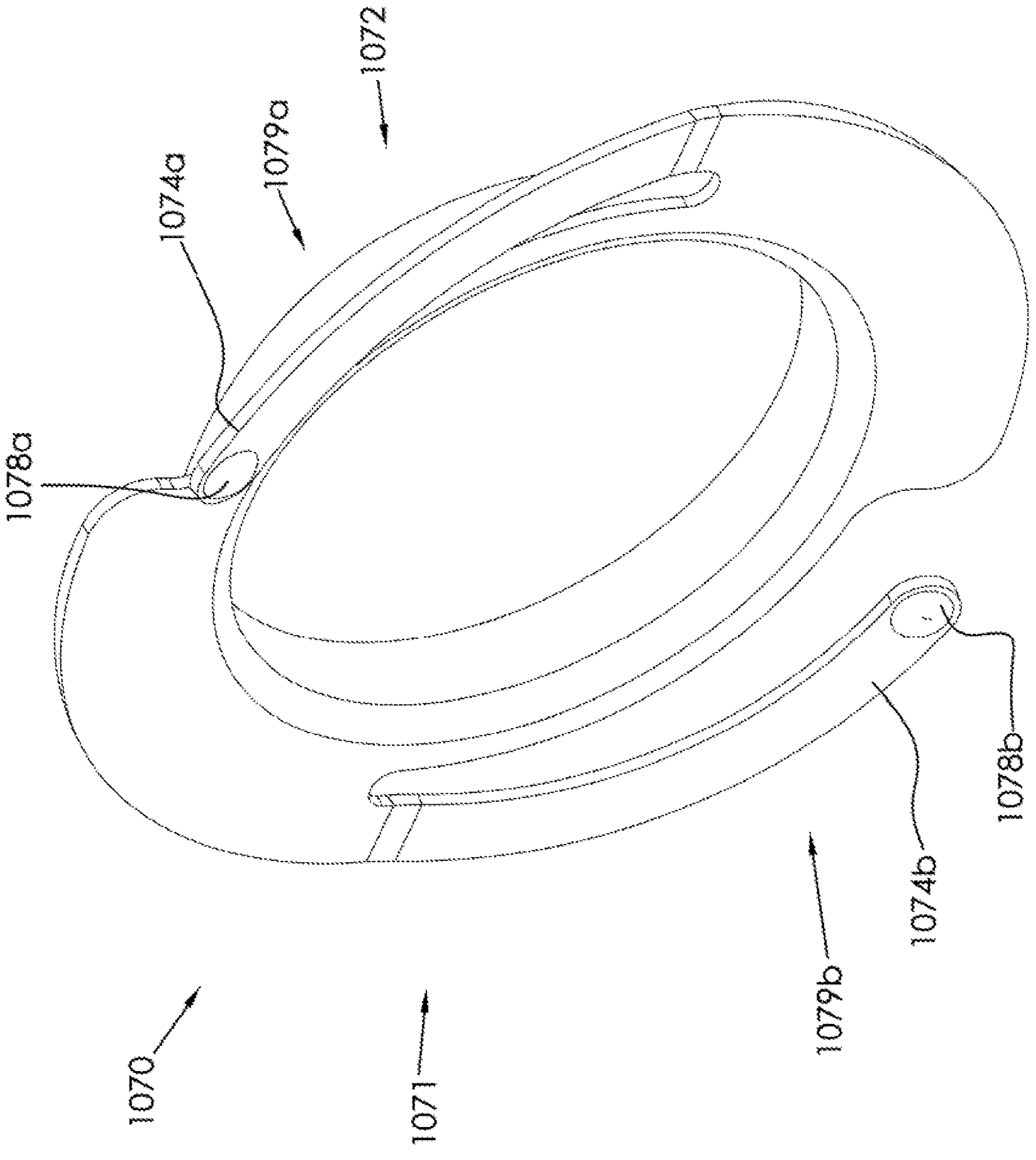
FIG. 35 depicts a perspective view of the embodiment of an electrical continuity member depicted in FIG. 33, wherein nut contact portions are bent, in accordance with the present invention.
Figure 36:
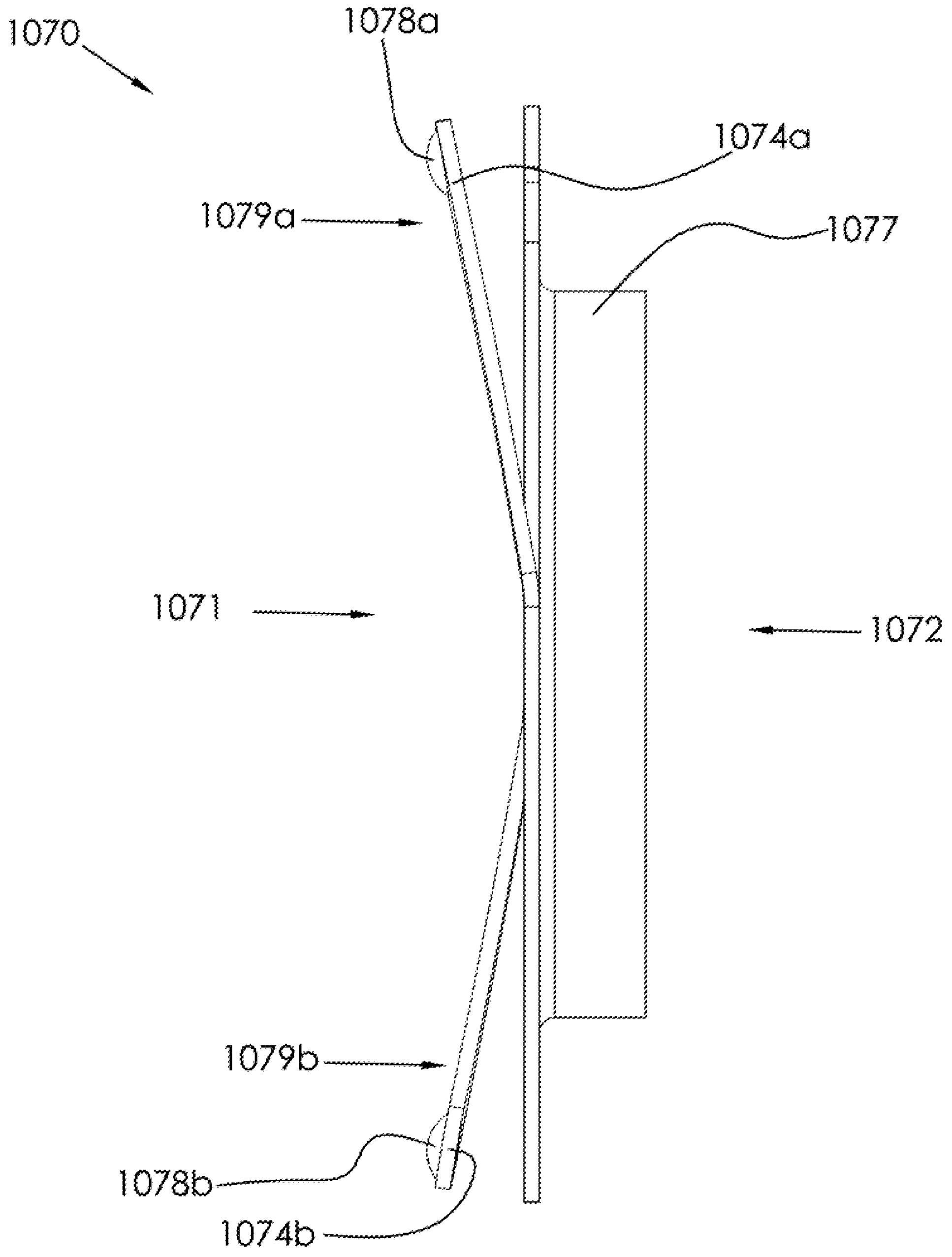
FIG. 36 depicts a side view of the embodiment of an electrical continuity member depicted in FIG. 33, wherein nut contact portions are bent, in accordance with the present invention.
Figure 37:
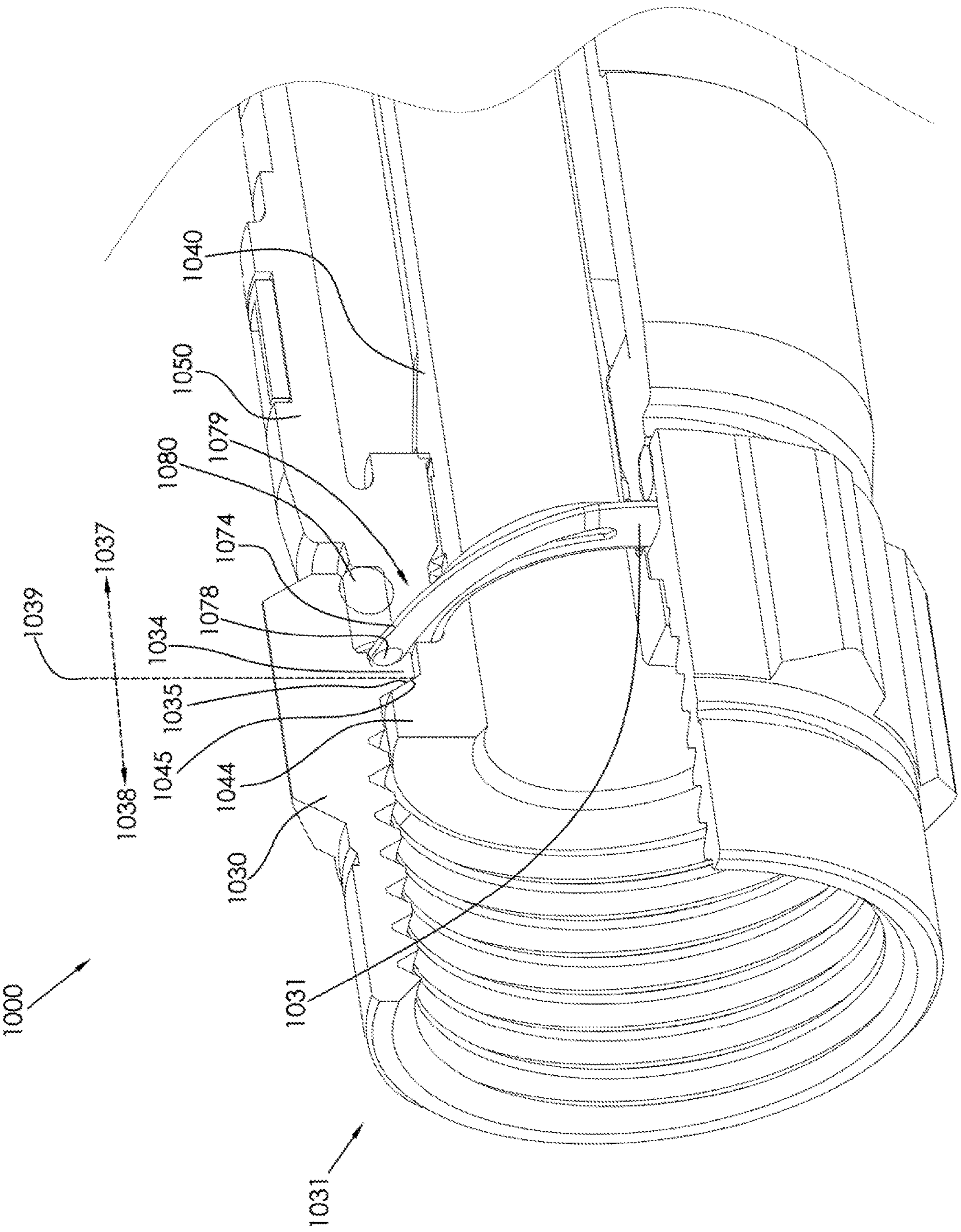
FIG. 37 depicts a perspective cut-away view of a portion of a further embodiment of a coaxial cable connector having the embodiment of the electrical continuity member depicted in FIG. 33, in accordance with the present invention.
Figure 38:
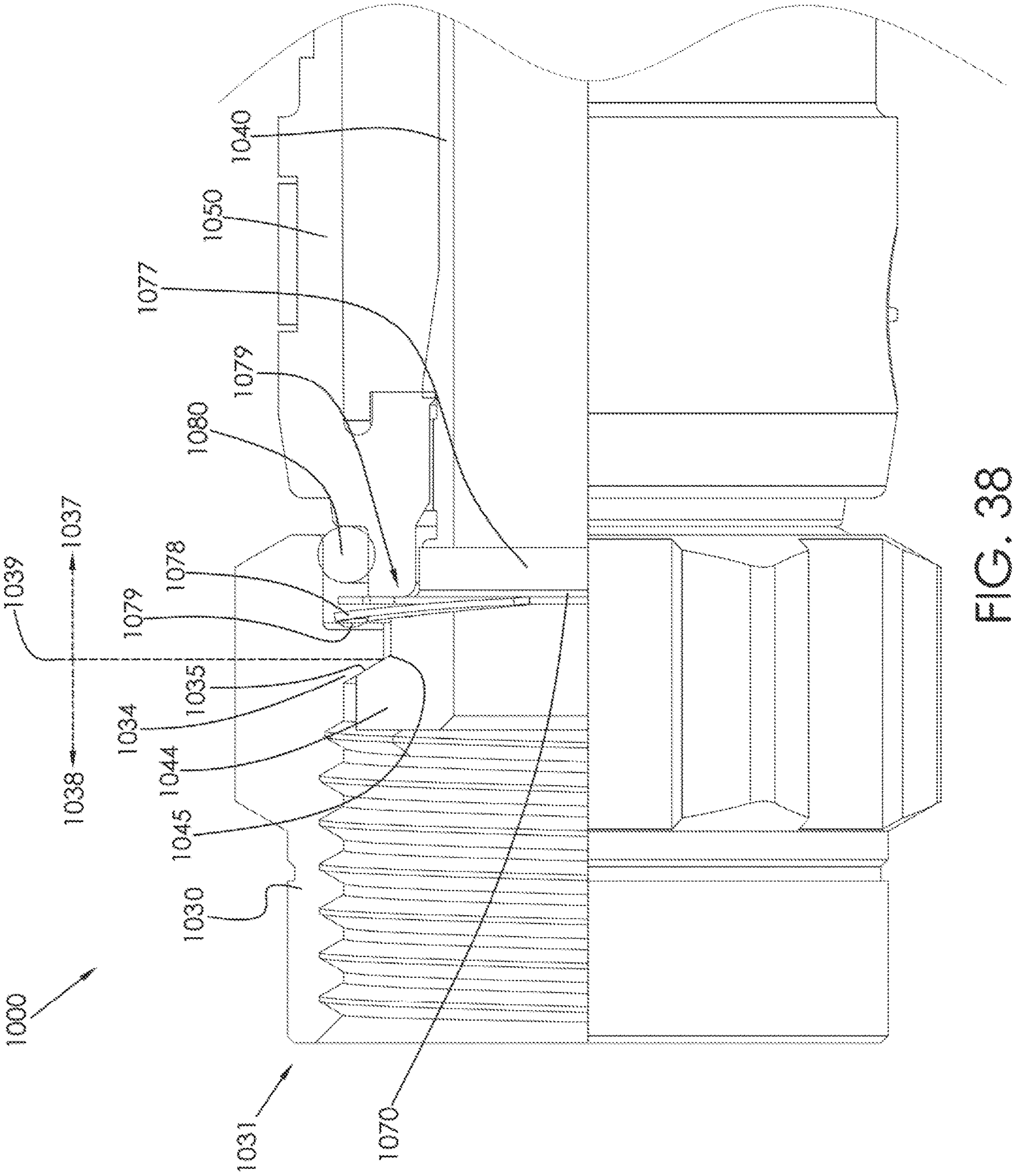
FIG. 38 depicts a cut-away side view of a portion of the further embodiment of a coaxial cable connector depicted in FIG. 37 and having the embodiment of the electrical continuity member depicted in FIG. 33, in accordance with the present invention.
Figure 39:
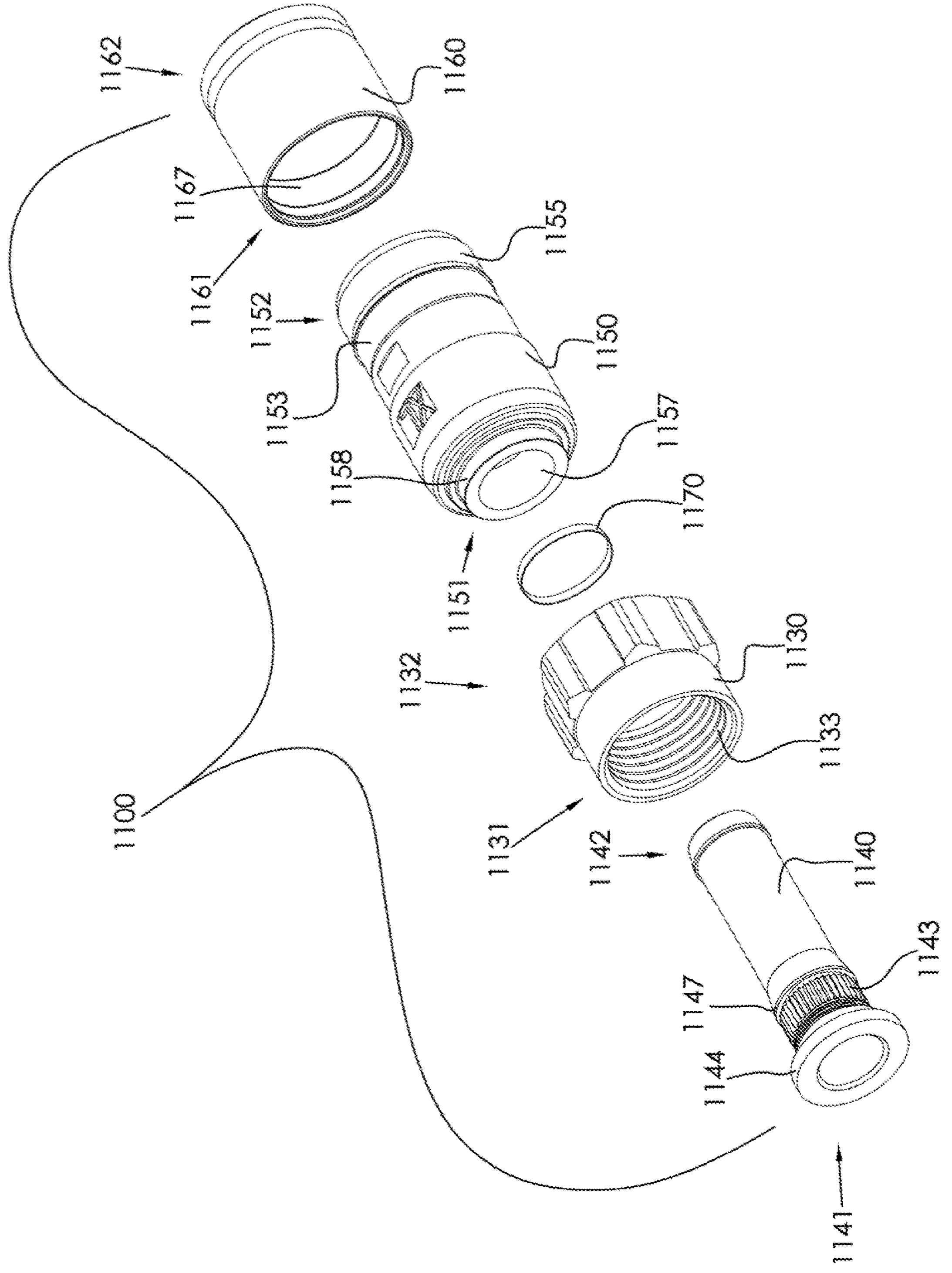
FIG. 39 depicts an exploded perspective cut-away view of another embodiment of the elements of an embodiment of a coaxial cable connector having an embodiment of an electrical continuity member, in accordance with the present invention.
Figure 40:
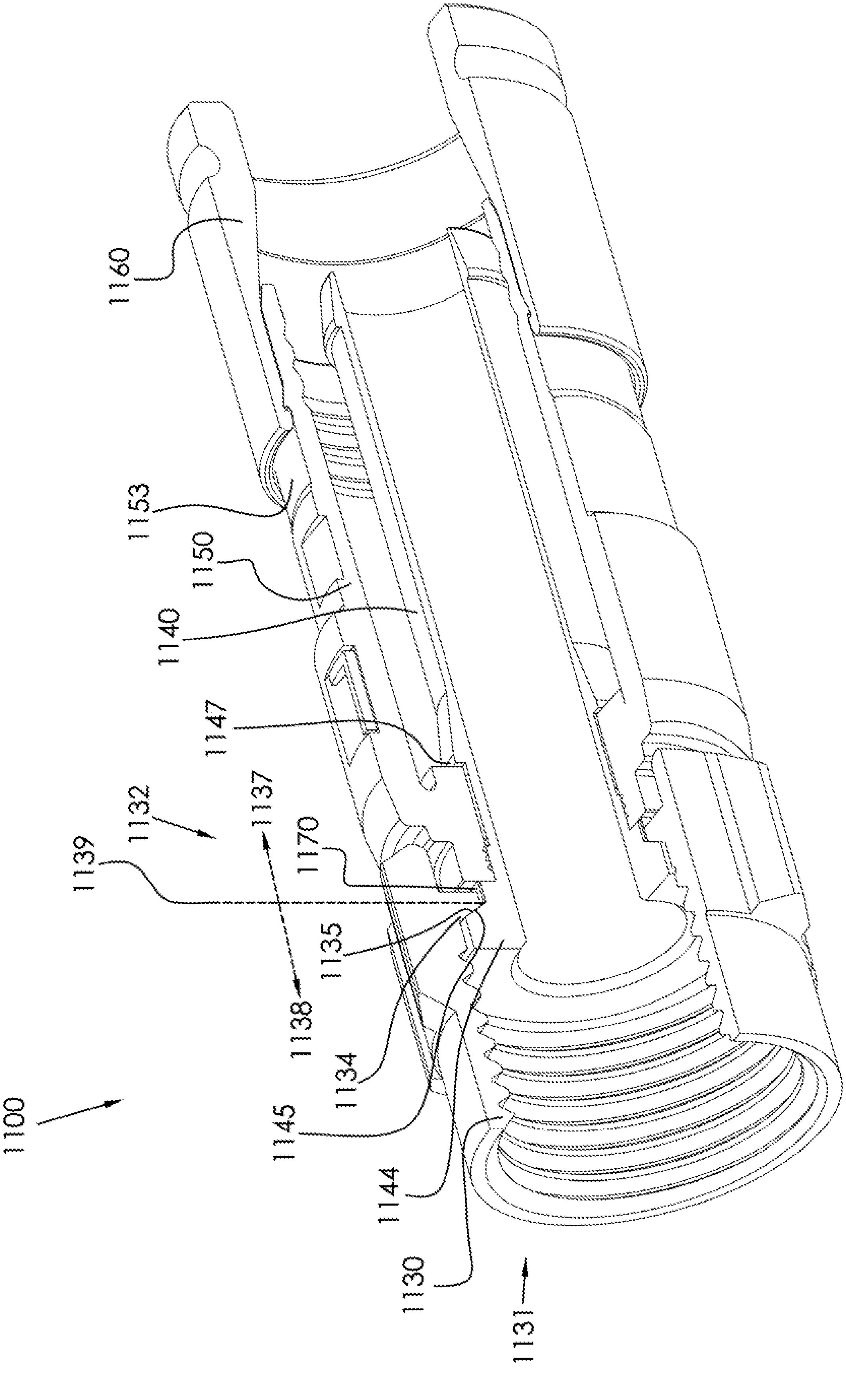
FIG. 40 depicts a side perspective cut-away view of the other embodiment of the coaxial cable connector of FIG. 39, in accordance with the present invention.
Figure 41:
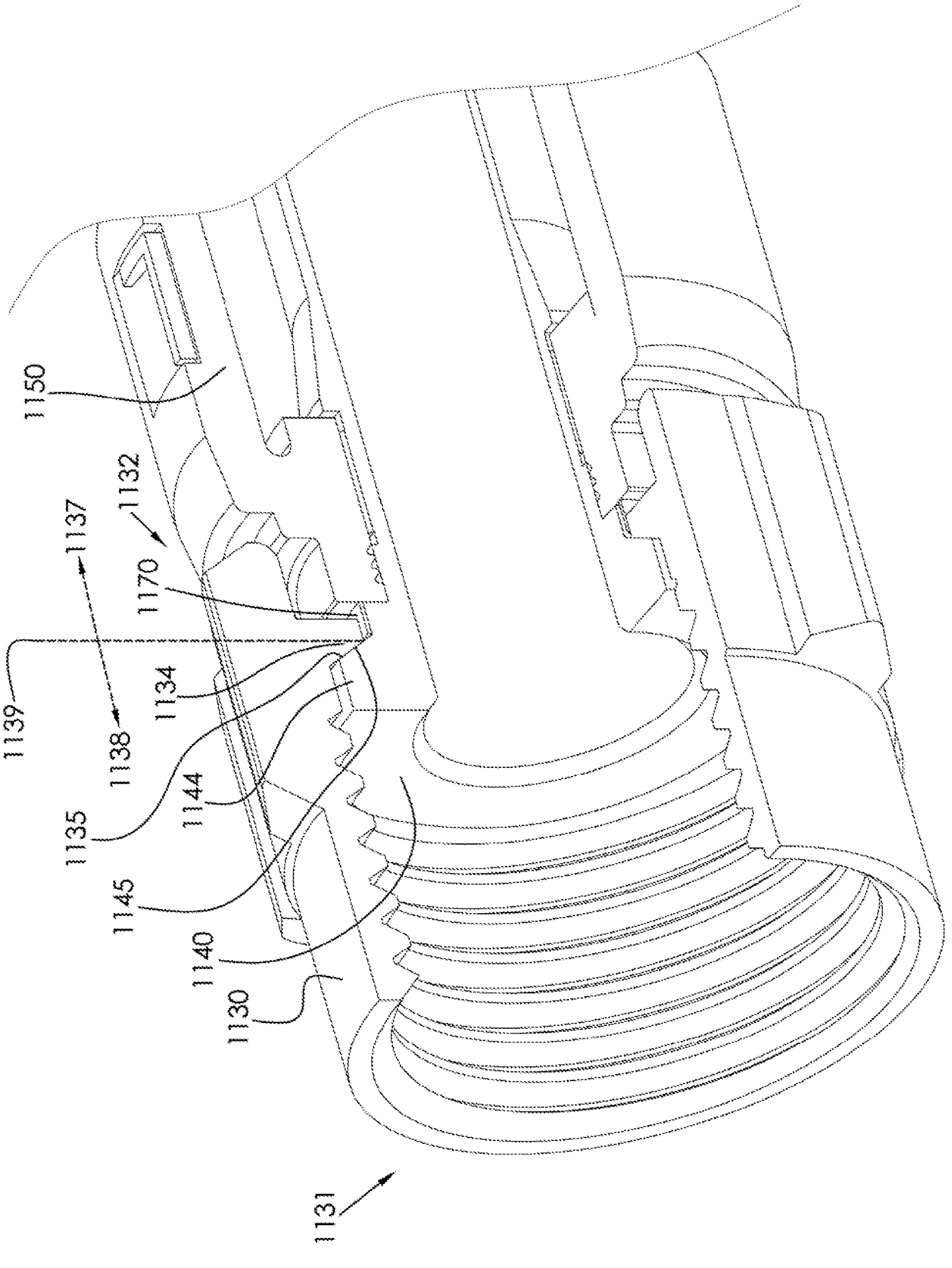
FIG. 41 depicts a blown-up side perspective cut-away view of a portion of the other embodiment of the coaxial cable connector of FIG. 39, in accordance with the present invention.

Turning further to the drawings, FIGS. 33-38 depict yet another embodiment of an electrical continuity member 1070. The electrical continuity member 1070 is operably included, to help facilitate electrical continuity in an embodiment of a coaxial cable connector 1000 having multiple component features, such as a coupling nut 1030, an inner post 1040, a connector body 1050, and a sealing member 1080, along with other like features, wherein such component features are, for the purposes of description herein, structured similarly to corresponding structures (referenced numerically in a similar manner) of other coaxial cable connector embodiments previously discussed herein above, in accordance with the present invention. The electrical continuity member 1070 has a first end 1071 and opposing second end 1072, and includes at least one flexible portion 1079 associated with a nut contact portion 1074. The nut contact portion 1074 may include a nut contact tab 1078. As depicted, an embodiment of an electrical continuity member 1070 may include multiple flexible portions 1079*a-b* associated with corresponding nut contact portions 1074*a-b*. The nut contact portions 1074*a-b* may include respective corresponding nut contact tabs 1078*a-b*. Each of the multiple flexible portions 1079*a-b*, nut contact portions 1074*a-b*, and nut contact tabs 1078*a-b* may be located so as to be oppositely radially symmetrical about a central axis of the electrical continuity member 1070. A post contact portion 1077 may be formed having an axial length, so as to facilitate axial lengthwise engagement with the post 1040, when assembled in a coaxial cable connector embodiment 1000. The flexible portions 1079*a-b* may be pseudo-coaxially curved arm members extending in yin/yang like fashion around the electrical continuity member 1070. Each of the flexible portions 1079*a-b* may independently bend and flex with respect to the rest of the continuity member 1070. For example, as depicted in FIGS. 35 and 36, the flexible portions 1079*a-b* of the continuity member are bent upwards in a direction towards the first end 1071 of the continuity member 1070. Those skilled in the relevant art should appreciate that a continuity member 1070 may only need one flexible portion 1079 to efficiently obtain electrical continuity for a connector 1000.

When operably assembled within an embodiment of a coaxial cable connector 1000, electrical continuity member embodiments 1070 utilize a bent configuration of the flexible portions 1079*a-b*, so that the nut contact tabs 1078*a-b* associated with the nut contact portions 1074*a-b* of the continuity member 1070 make physical and electrical contact with a surface of the nut 1030, wherein the contacted surface of the nut 1030 resides rearward of the forward facing surface 1035 of the inward lip 1034 of nut 1030, and rearward of the start (at surface 1035) of the second end portion 1037 of the nut 1030. For convenience, dashed line 1039 (similar, for example, to dashed line 39 shown in FIG. 5) depicts the axial point and a relative radial perpendicular plane defining the demarcation of the first end portion 1038 and the second end portion 1037 of embodiments of the nut 1030. As such, the continuity member 1070 does not reside between opposing complimentary surfaces of the lip 1034 of the nut 1030 and the flange 1044 of the post 1040. Rather, the electrical continuity member 1070 contacts the nut 1030 at a rearward location other than on the forward facing side of the lip 1034 of the nut 1030 that faces the flange 1044 of the post 1040, at a location only pertinent to the second end 1037 portion of the nut 1030.

Referring still to the drawings, FIGS. 39-42 depict various views of another embodiment of a coaxial cable connector 1100 having an embodiment of an electrical continuity member 1170, in accordance with the present invention. Embodiments of an electrical continuity member, such as embodiment 1170, or any of the other embodiments 70, 170, 270, 370, 470, 570, 670, 770, 870, 970, 1070, 1270 and other like embodiments, may utilize materials that may enhance conductive ability. For instance, while it is critical that continuity member embodiments be comprised of conductive material, it should be appreciated that continuity members may optionally be comprised of alloys, such as cuprous alloys formulated to have excellent resilience and conductivity. In addition, part geometries, or the dimensions of component parts of a connector 1100 and the way various component elements are assembled together in coaxial cable connector 1100 embodiments may also be designed to enhance the performance of embodiments of electrical continuity members. Such part geometries of various component elements of coaxial cable connector embodiments may be constructed to minimize stress existent on components during operation of the coaxial cable connector, but still maintain adequate contact force, while also minimizing contact friction, but still supporting a wide range of manufacturing tolerances in mating component parts of embodiments of electrical continuity coaxial cable connectors.

Figure 42:
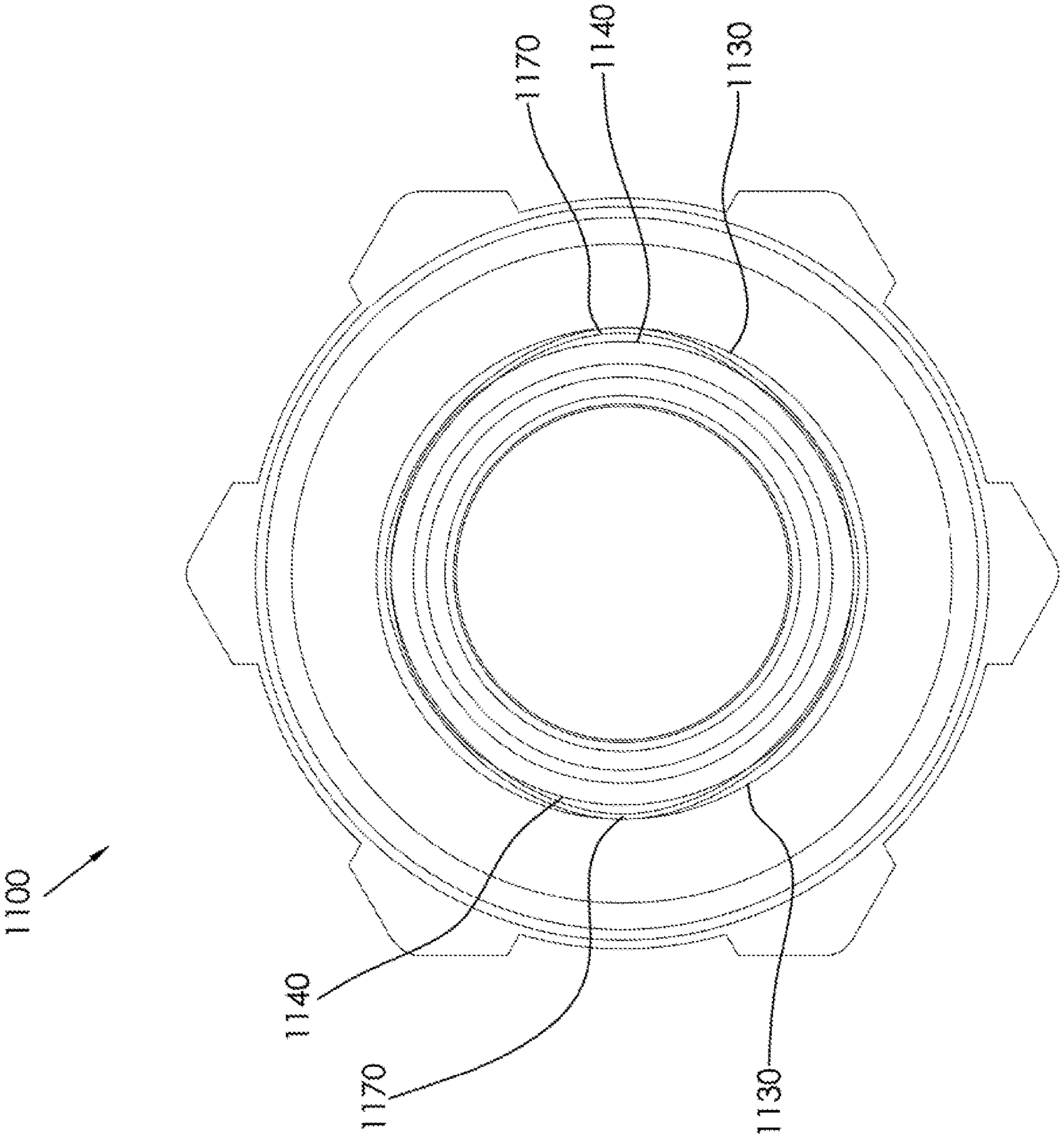
FIG. 42 depicts a front cross-section view, at the location between the first end portion of the nut and the second end portion of the nut, of the other embodiment of the coaxial cable connector of FIG. 39, in accordance with the present invention.
Figure 43:
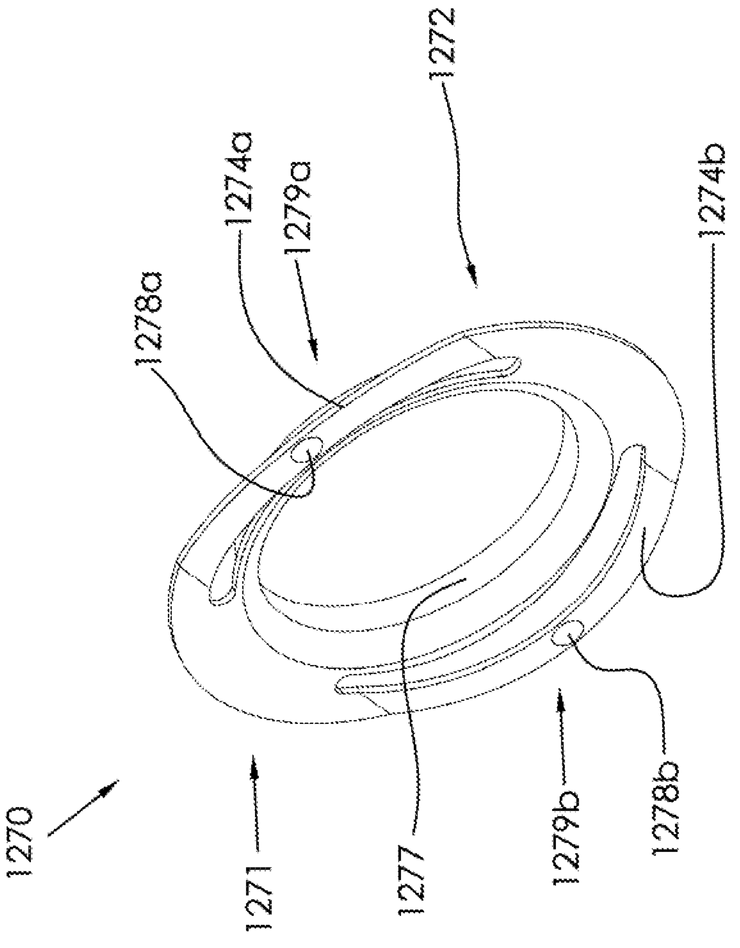
FIG. 43 depicts a front perspective view of yet still another embodiment of an electrical continuity member, in accordance with the present invention.
Figure 44:
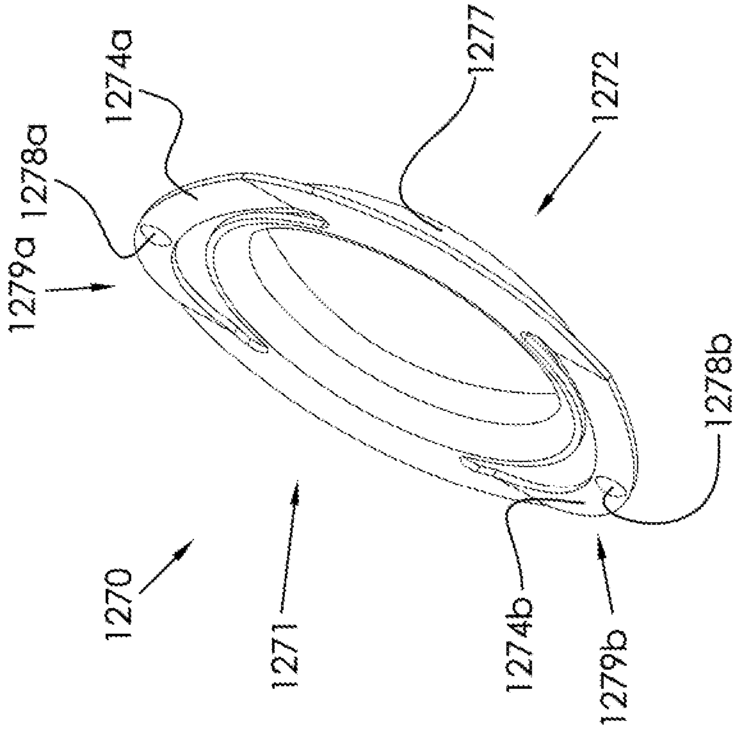
FIG. 44 depicts another front perspective view of the embodiment of the electrical continuity member depicted in FIG. 43, in accordance with the present invention.
Figure 45:
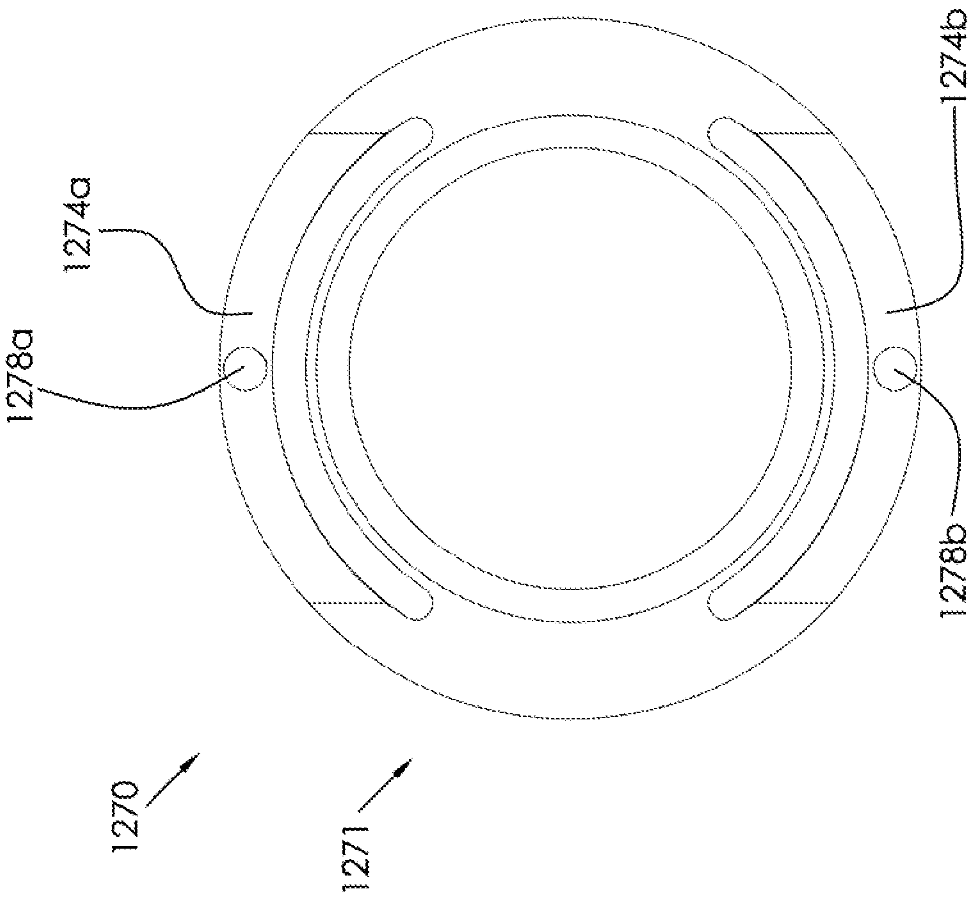
FIG. 45 depicts a front view of the embodiment of the electrical continuity member depicted in FIG. 43, in accordance with the present invention.
Figure 46:
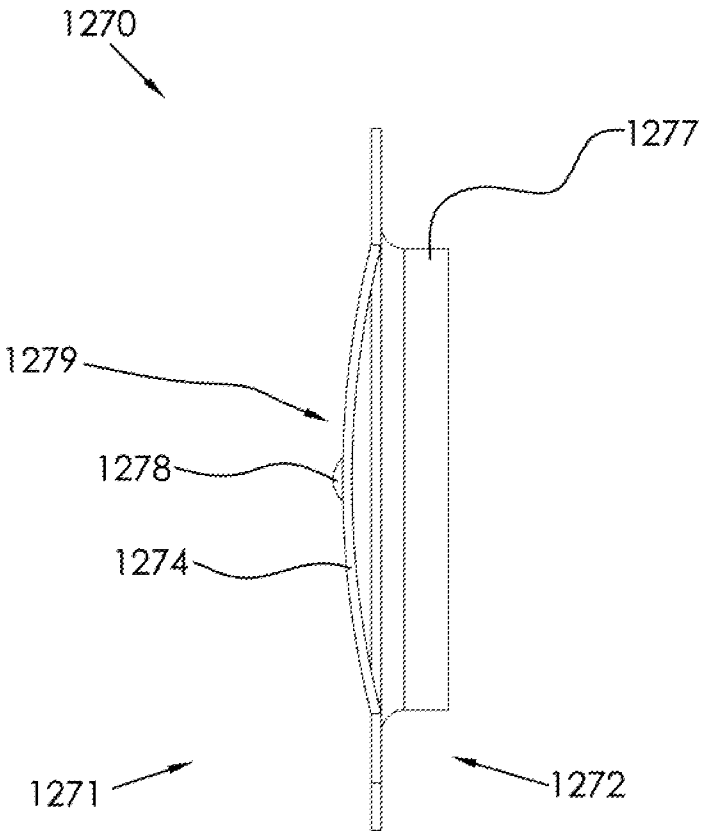
FIG. 46 depicts a side view of the embodiment of the electrical continuity member depicted in FIG. 43, in accordance with the present invention.
Figure 47:
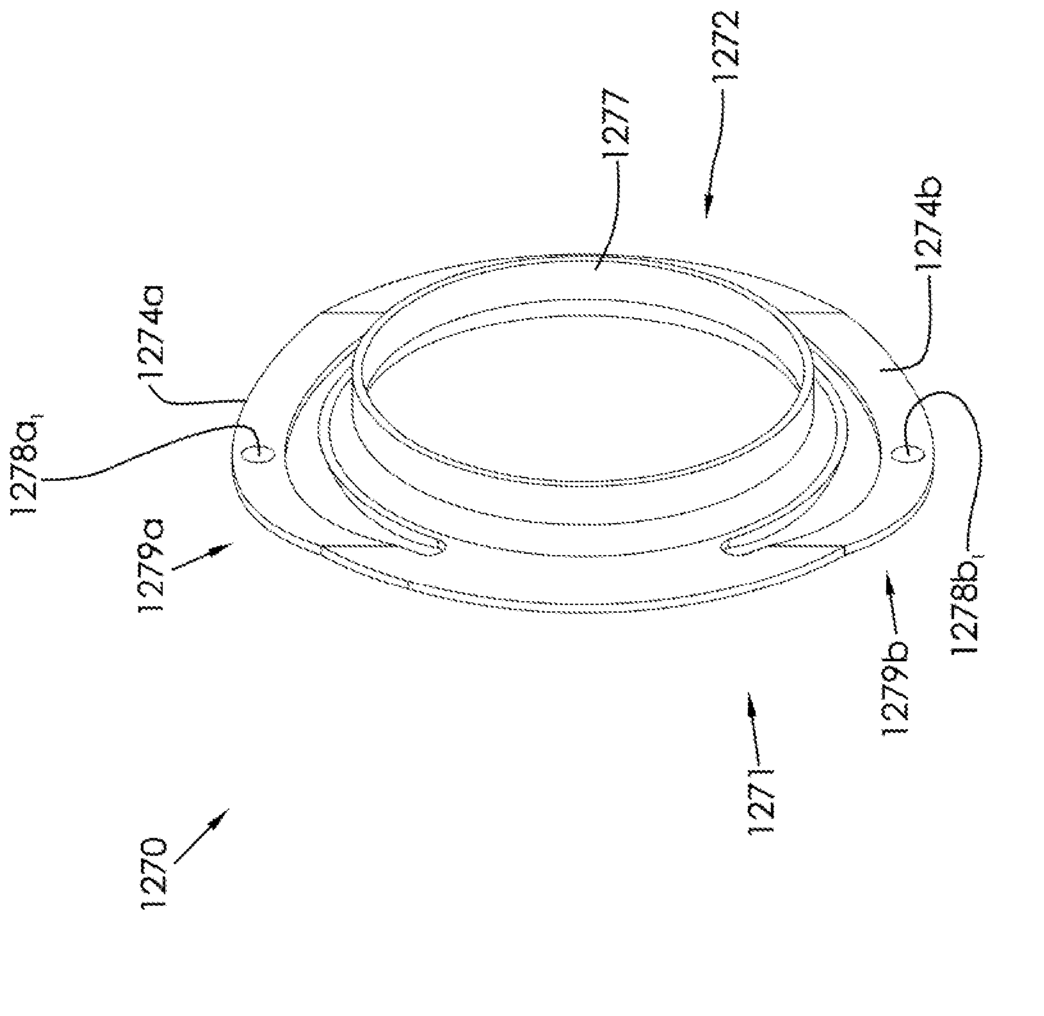
FIG. 47 depicts a rear perspective view of the embodiment of the electrical continuity member depicted in FIG. 43, in accordance with the present invention.
Figure 48:
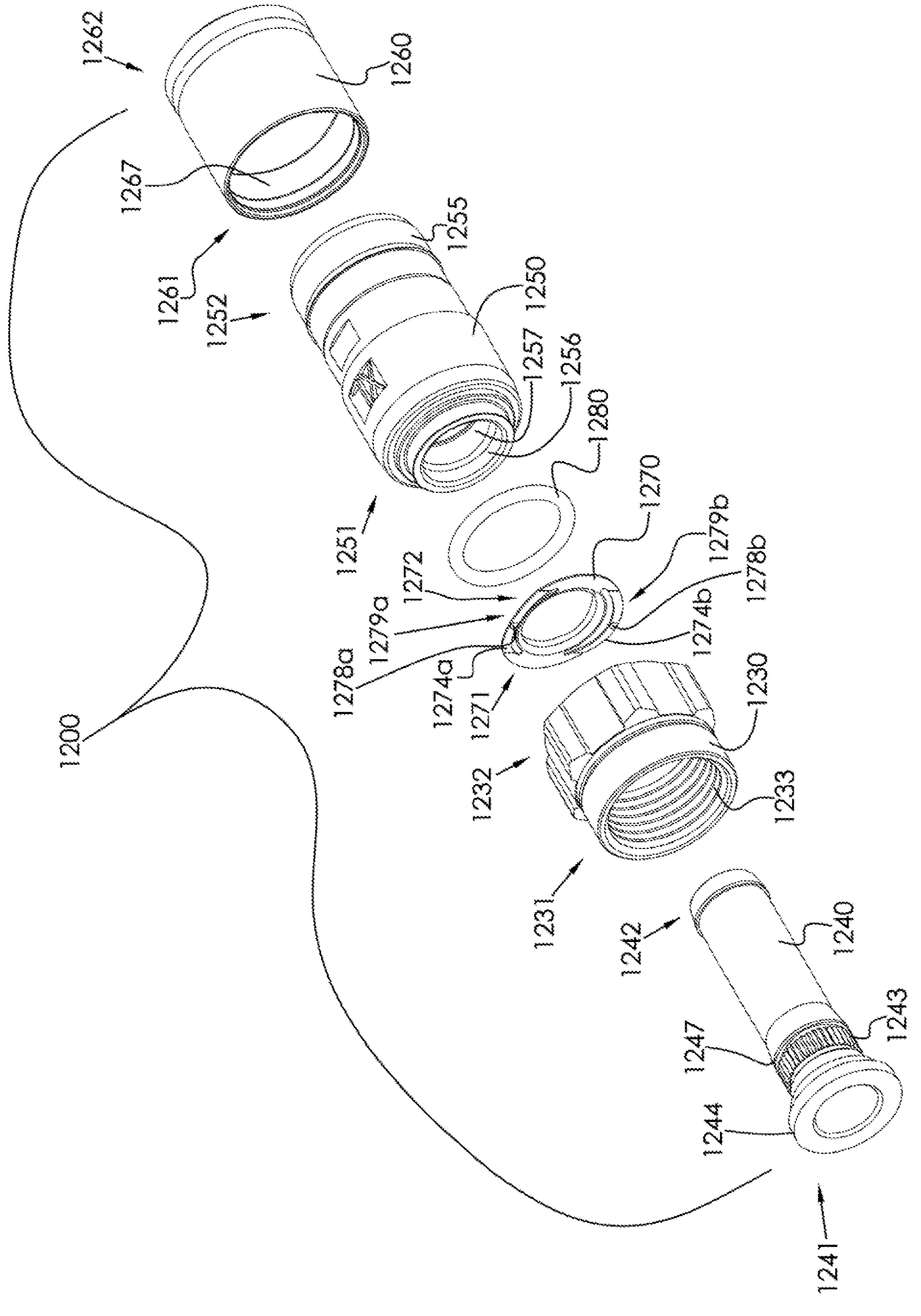
FIG. 48 depicts an exploded perspective cut-away view of a yet still other embodiment of the coaxial cable connector having the embodiment of the yet still other electrical continuity member depicted in FIG. 43, in accordance with the present invention.
Figure 49:
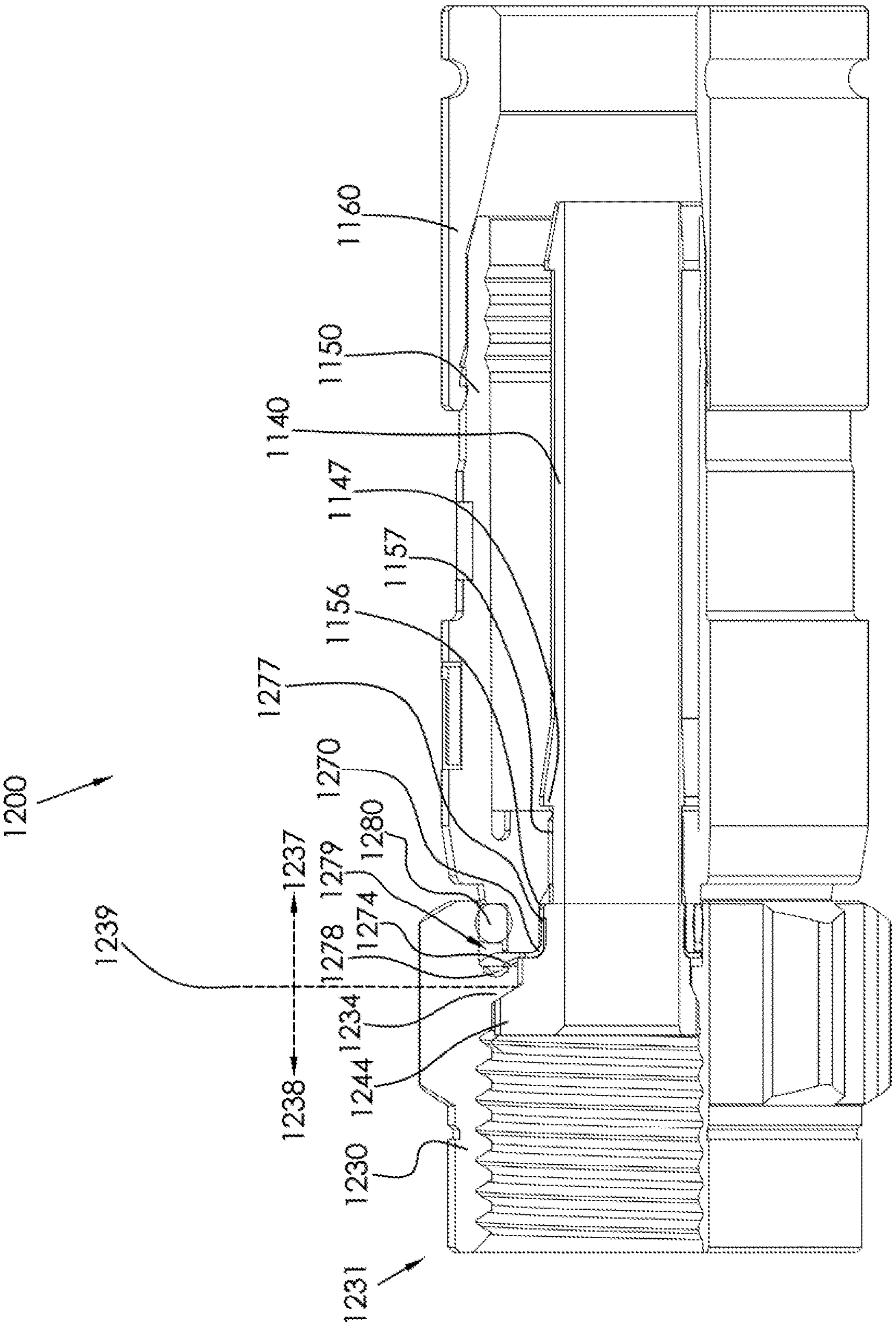
FIG. 49 depicts a perspective cut-away view of a the yet still other embodiment of a coaxial cable connector depicted in FIG. 48 and having the embodiment of the yet still other electrical continuity member depicted in FIG. 43, in accordance with the present invention.
Figure 50:
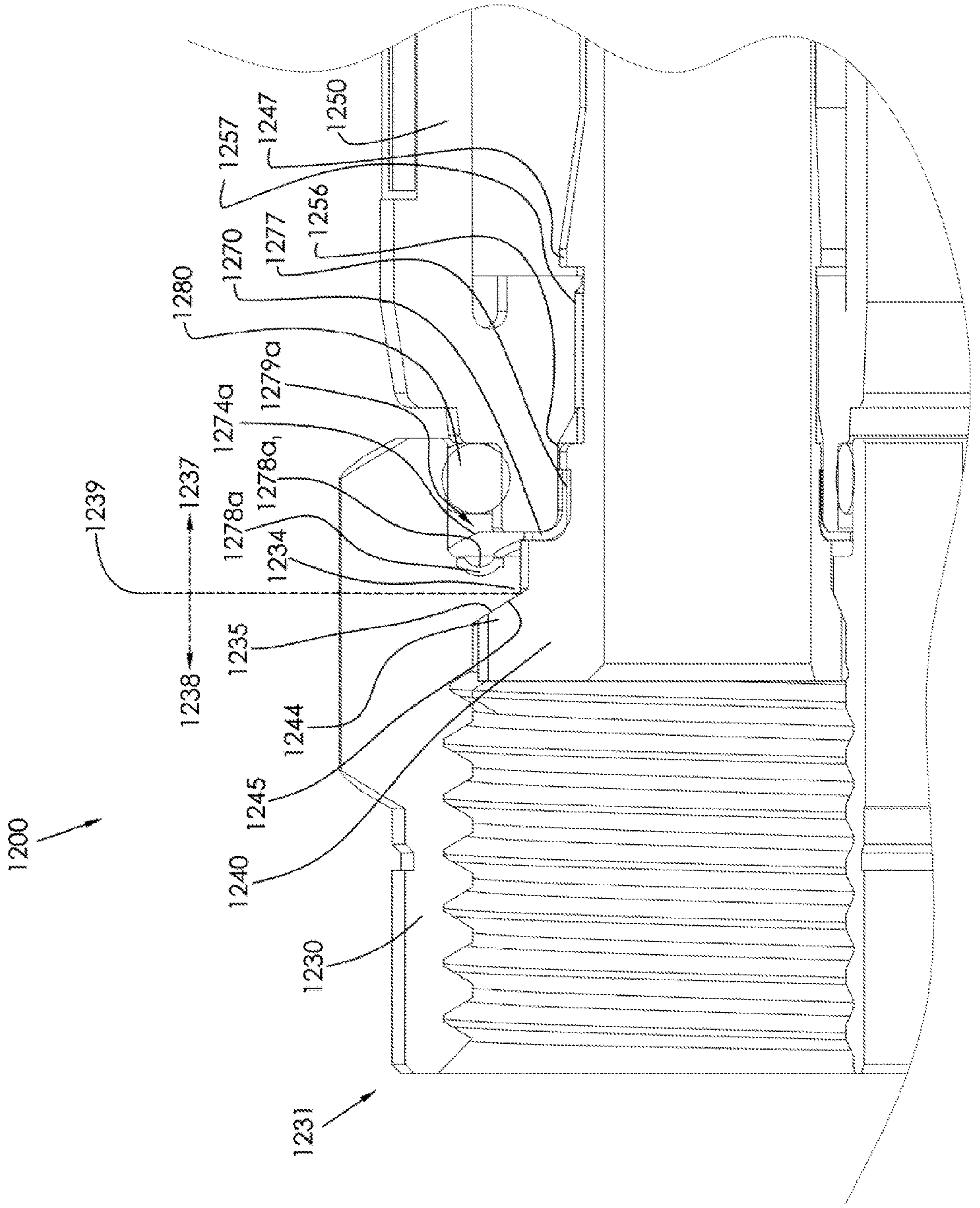
FIG. 50 depicts a blown-up perspective cut-away view of a portion of the yet still other embodiment of a coaxial cable connector depicted in FIG. 48 and having the embodiment of the yet still other electrical continuity member depicted in FIG. 43, in accordance with the present invention.
Figure 51:
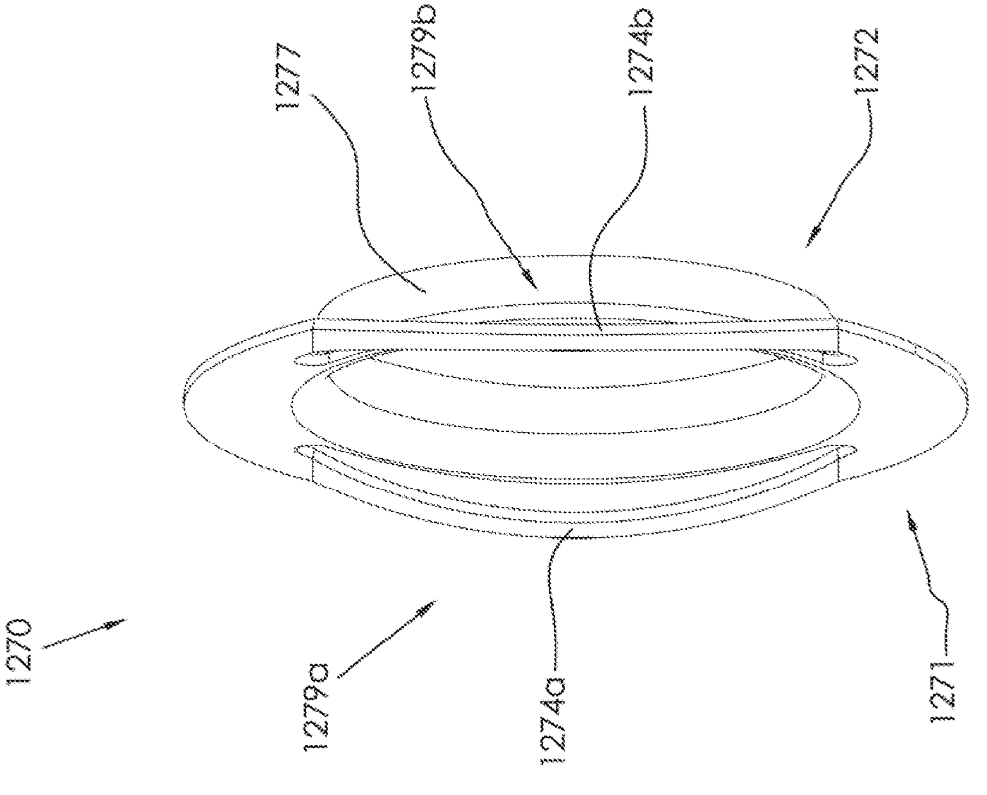
FIG. 51 depicts a perspective view of the embodiment of an electrical continuity member depicted in FIG. 43, yet without nut contact tabs, in accordance with the present invention.
Figure 52:
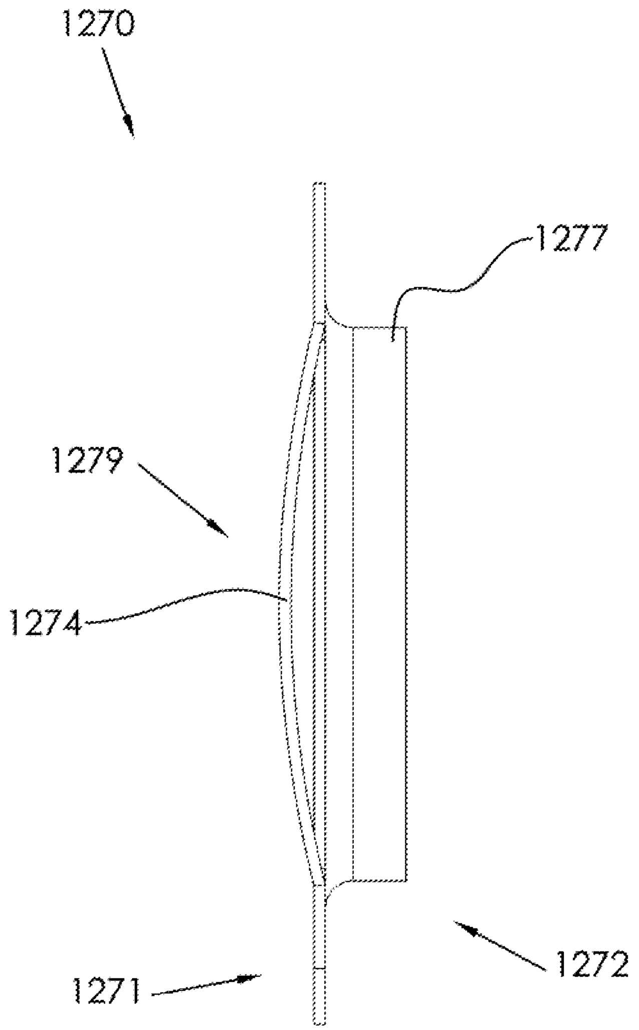
FIG. 52 depicts a side view of the embodiment of the electrical continuity member depicted in FIG. 51, in accordance with the present invention.

An embodiment of an electrical continuity member 1170 may comprise a simple continuous band, which, when assembled within embodiments of a coaxial cable connector 1100, encircles a portion of the post 1140, and is in turn surrounded by the second end portion 1137 of the nut 1130. The band-like continuity member 1170 resides rearward a second end portion 1137 of the nut that starts at a side 1135 of the lip 1134 of the nut 1130 facing the first end 1131 of the nut 1130 and extends rearward to the second end 1132 of the nut. The simple band-like embodiment of an electrical continuity member 1170 is thin enough that it occupies an annular space between the second end portion 1137 of the nut 1130 and the post 1140, without causing the post 1140 and nut 1130 to bind when rotationally moved with respect to one another. The nut 1130 is free to rotate, and has some freedom for slidable axial movement, with respect to the connector body 1150. The band-like embodiment of an electrical continuity member 1170 can make contact with both the nut 1130 and the post 1140, because it is not perfectly circular (see, for example, FIG. 42 depicted the slightly oblong shape of the continuity member 1170). This non-circular configuration may maximize the beam length between contact points, significantly reducing stress in the contact between the nut 1130, the post 1140 and the electrical continuity member 1170. Friction may also be significantly reduced because normal force is kept low based on the structural relationship of the components; and there are no edges or other friction enhancing surfaces that could scrape on the nut 1130 or post 1140. Rather, the electrical continuity member 1170 comprises just a smooth tangential-like contact between the component elements of the nut

1130 and the post 1140. Moreover, if permanent deformation of the oblong band-like continuity member 1170 does occur, it will not significantly reduce the efficacy of the electrical contact, because if, during assembly or during operation, continuity member 1170 is pushed out of the way on one side, then it will only make more substantial contact on the opposite side of the connector 1100 and corresponding connector 1100 components. Likewise, if perchance the two relevant component surfaces of the nut 1130 and the post 1140 that the band-like continuity member 1170 interacts with have varying diameters (a diameter of a radially inward surface of the nut 1130 and a diameter of a radially outward surface of the post 1140) vary in size between provided tolerances, or if the thickness of the band-like continuity member 1170 itself varies, then the band-like continuity member 1170 can simply assume a more or less circular shape to accommodate the variation and still make contact with the nut 1130 and the post 1140. The various advantages obtained through the utilization of a band-like continuity member 1170 may also be obtained, where structurally and functionally feasible, by other embodiments of electrical continuity members described herein, in accordance with the objectives and provisions of the present invention.

Referencing the drawings still further, it is noted that FIGS. 43-53 depict different views of another coaxial cable connector 1200, the connector 1200 including various embodiments of an electrical continuity member 1270. The electrical continuity member 1270, in a broad sense, has some physical likeness to a disc having a central circular opening and at least one section being flexibly raised above the plane of the disc; for instance, at least one raised portion 1279 of the continuity member 1270 is prominently distinguishable in the side views of both FIG. 46 and FIG. 52, as being arched above the general plane of the disc, in a direction toward the first end 1271 of the continuity member 1270. The electrical continuity member 1270 may include two symmetrically radially opposite flexibly raised portions 1279*a*-*b* physically and/or functionally associated with nut contact portions 1274*a*-*b*, wherein nut contact portions 1274*a*-*b* may each respectively include a nut contact tab 1278*a*-*b*. As the flexibly raised portions 1279*a*-*b* arch away from the more generally disc-like portion of the electrical continuity member 1270, the flexibly raised portions (being also associated with nut contact portions 1274*a*-*b*) make resilient and consistent physical and electrical contact with a conductive surface of the nut 1230, when operably assembled to obtain electrical continuity in the coaxial cable connector 1200. The surface of the nut 1230 that is contacted by the nut contact portion 1274 resides within the second end portion 1237 of the nut 1230.

The electrical continuity member 1270 may optionally have nut contact tabs 1278*a*-*b*, which tabs 1278*a*-*b* may enhance the member's 1270 ability to make consistent operable contact with a surface of the nut 1230. As depicted, the tabs 1278*a*-*b* comprise a simple bulbous round protrusion extending from the nut contact portion. However, other shapes and geometric design may be utilized to accomplish the advantages obtained through the inclusion of nut contact tabs 1278*a*-*b*. The opposite side of the tabs 1278*a*-*b* may correspond to circular detents or dimples 1278*a*1-*b*1. These oppositely structured features 1278*a*1-*b*1 may be a result of common manufacturing processes, such as the natural bending of metallic material during a stamping or pressing process possibly utilized to create a nut contact tab 1278.

As depicted, embodiments of an electrical continuity member 1270 include a cylindrical section extending axially in a lengthwise direction toward the second end 1272 of the continuity member 1270, the cylindrical section comprising a post contact portion 1277, the post contact portions 1277 configured so as to make axially lengthwise contact with the post 1240. Those skilled in the art should appreciated that other geometric configurations may be utilized for the post contact portion 1277, as long as the electrical continuity member 1270 is provided so as to make consistent physical and electrical contact with the post 1240 when assembled in a coaxial cable connector 1200.

The continuity member 1270 should be configured and positioned so that, when the coaxial cable connector 1200 is assembled, the continuity member 1270 resides rearward the start of a second end portion 1237 of the nut 1230, wherein the second end portion 1237 begins at a side 1235 of the lip 1234 of the nut 1230 facing the first end 1231 of the nut 1230 and extends rearward to the second end 1232 of the nut 1230. The continuity member 1270 contacts the nut 1230 in a location relative to a second end portion 1237 of the nut 1230. The second end portion 1237 of the nut 1230 extends from the second end 1232 of the nut 1230 to the axial location of the nut 1230 that corresponds to the point of the forward facing side 1235 of the internal lip 1234 that faces the first forward end 1231 of the nut 1230 that is also nearest the second rearward end 1232 of the nut 1230. Accordingly, the first end portion 1238 of the nut 1230 extends from the first end 1231 of the nut 1230 to that same point of the side of the lip 1234 that faces the first end 1231 of the nut 1230 that is nearest the second end 1232 of the nut 1230. For convenience, dashed line 1239 (see FIGS. 49-50, and 53), depicts the axial point and a relative radial perpendicular plane defining the demarcation of the first end portion 1238 and the second end portion 1237 of embodiments of the nut 1230. As such, the continuity member 1270 does not reside between opposing complimentary surfaces 1235 and 1245 of the lip 1234 of the nut 1230 and the flange 1244 of the post 40. Rather, the continuity member 1270 contacts the nut 1230 at a location other than on the side of the lip 1234 of the nut 1230 that faces the flange 1244 of the post 1240, at a rearward location only pertinent to the second end 1237 portion of the nut 1230.

Various other component features of a coaxial cable connector 1200 may be included with a connector 1200. For example, the connector body 1250 may include an internal detent 1256 positioned to help accommodate the operable location of the electrical continuity member 1270 as located between the post 1240, the body 1250, and the nut 1230. Moreover, the connector body 1250 may include a post mounting portion 1257 proximate the first end 1251 of the body 1250, the post mounting portion 1257 configured to securely locate the body 1250 relative to a portion 1247 of the outer surface of post 1240, so that the connector body 1250 is axially secured with respect to the post 1240. Notably, the nut 1230, as located with respect to the electrical continuity member 1270 and the post 1240, does not touch the body. A body sealing member 1280 may be positioned proximate the second end portion of the nut 1230 and snugly around the connector body 1250, so as to form a seal in the space therebetween.

Figure 53:
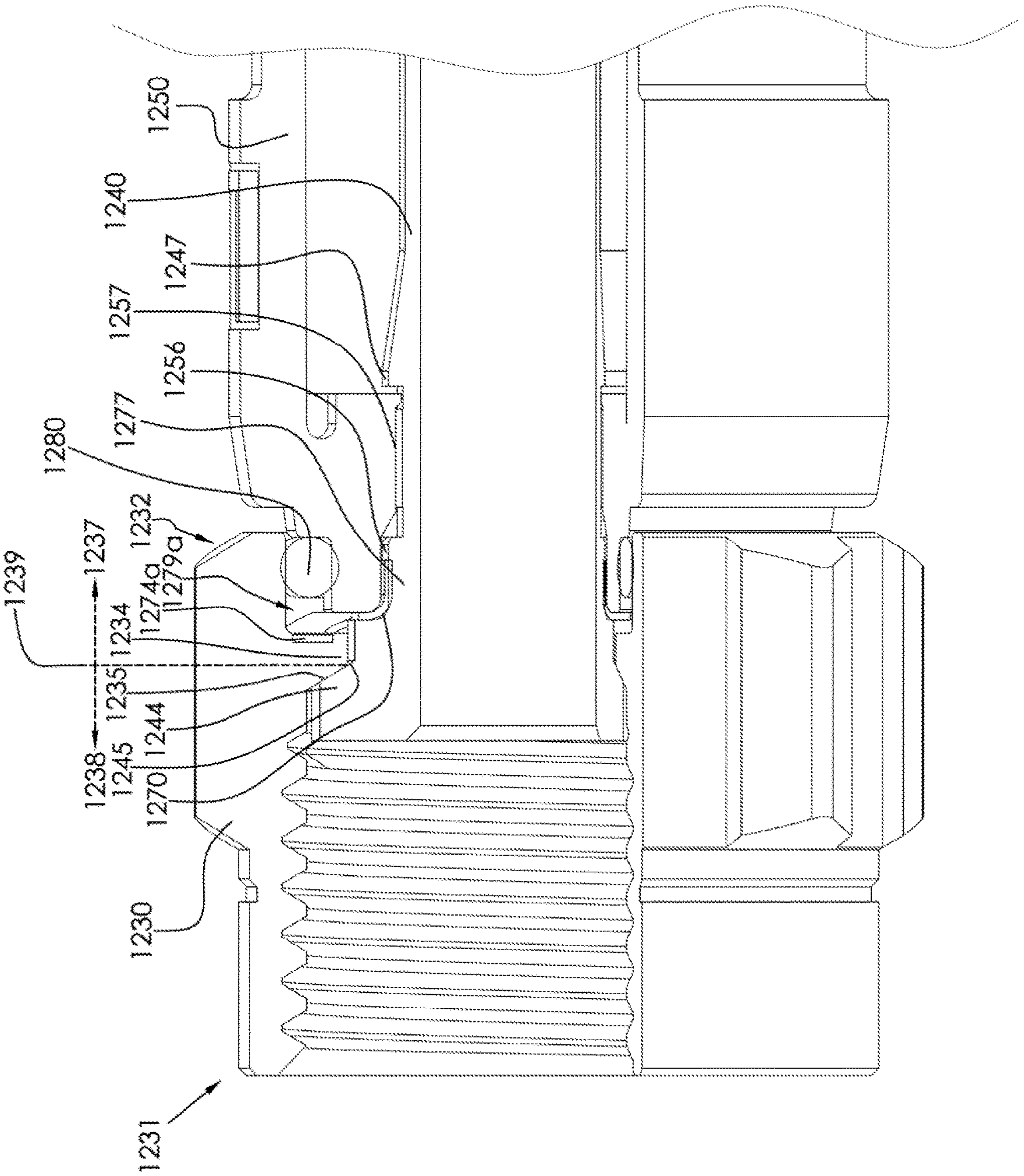
FIG. 53 depicts a perspective cut-away view of a portion of an embodiment of a coaxial cable connector having the embodiment of the electrical continuity member depicted in FIG. 51, in accordance with the present invention.

With respect to FIGS. 1-53, a method of obtaining electrical continuity for a coaxial cable connection is described. A first step includes providing a coaxial cable connector 100/900/1000/1100/1200 operable to obtain electrical continuity. The provided coaxial cable connector 100/900/1000/1100/1200 includes a connector body 50/950/1050/1150/1250 and a post 40/940/1040/1140/1240 operably attached to the connector body 50/950/1050/1150/1250, the post 40/940/1040/1140/1240 having a flange 44/944/1044/1144/

1244. The coaxial cable connector 100/900/1000/1100/1200 also includes a nut 30/930/1030/1130/1230 axially rotatable with respect to the post 40/940/1040/1140/1240 and the connector body 50/950/1050/1150/1250, the nut 30/930/1030/1130/1230 including an inward lip 34/934/1034/1134/1234. In addition, the provided coaxial cable connector includes an electrical continuity member 70/170/270/370/470/570/670/770/870/970/1070/1170/1270 disposed axially rearward of a surface 35/935/1035/1135/1235 of the internal lip 34/934/1034/1134/1234 of the nut 30/930/1030/1130/1230 that faces the flange 44/944/1044/1144/1244 of the post 40/940/1040/1140/1240. A further method step includes securely attaching a coaxial cable 10 to the connector 100/900/1000/1100/1200 so that the grounding sheath or shield 14 of the cable electrically contacts the post 40/940/1040/1140/1240. Moreover, the methodology includes extending electrical continuity from the post 40/940/1040/1140/1240 through the continuity member 70/170/270/370/470/570/670/770/870/970/1070/1170/1270 to the nut 30/930/1030/1130/1230. A final method step includes fastening the nut 30/930/1030/1130/1230 to a conductive interface port 20 to complete the ground path and obtain electrical continuity in the cable connection, even when the nut 30/930/1030/1130/1230 is not fully tightened onto the port 20, because only a few threads of the nut onto the port are needed to extend electrical continuity through the nut 30/930/1030/1130/1230 and to the cable shielding 14 via the electrical interface of the continuity member 70/170/270/370/470/570/670/770/870/970/1070/1170/1270 and the post 40/940/1040/1140/1240.

While this invention has been described in conjunction with the specific embodiments outlined above, it is evident that many alternatives, modifications and variations will be apparent to those skilled in the art. Accordingly, the preferred embodiments of the invention as set forth above are intended to be illustrative, not limiting. Various changes may be made without departing from the spirit and scope of the invention as defined in the following claims. The claims provide the scope of the coverage of the invention and should not be limited to the specific examples.

What is claimed is:

1. A ground portion for maintaining a ground path in a coaxial cable connector having a coupler with a rearward facing coupler surface, a body with a forward facing body surface, and a post with a rearward facing post surface comprising:

a coupler ground contact portion configured to be biasingly maintained in contact with the rearward facing coupler surface of the coupler of a connector when the connector is assembled and during operation of the connector; and a post ground contact portion configured to be located rearward from the rearward facing coupler surface of the coupler of the connector so as to extend in a space formed between the forward facing body surface of a body of the connector and the rearward facing post surface of a post of the connector when the connector is assembled and when the coupler engages an interface port so as to maintain physical and electrical grounding contact with the rearward facing post surface during operation of the connector.

2. The ground portion of claim 1, wherein the post ground contact portion is configured to maintain continuous physical and electrical grounding contact with the rearward facing post surface of the post at all times during operation of the connector.

3. The ground portion of claim 1, wherein the coupler ground contact portion comprises:

a first flexible portion having a first arcuate portion extending between a first end portion and a second end portion of the first flexible portion, the first and second end portions of the first flexible portion integrally connecting the first arcuate portion to the post ground contact portion, wherein the first flexible portion is raised above a plane of the post ground contact portion and is configured to be biasingly maintained in contact with the rearward facing coupler surface of the coupler;

a second flexible portion having a second arcuate portion extending between a first end portion and a second end portion of the second flexible portion, the first and second end portions of the second flexible portion integrally connecting the second arcuate portion to the post ground contact portion, wherein the second flexible portion is raised above the plane of the post ground contact portion and is configured to be biasingly maintained in contact with the rearward facing coupler surface of the coupler; and wherein the first arcuate portion and the second arcuate portion of the coupler ground contact portion are arched portions.

4. The ground portion of claim 1, further comprising a first arcuate slot and a second arcuate slot formed between the coupler ground contact portion and the post ground contact portion, and wherein the first flexible portion is symmetrically arranged radially opposite of the second flexible portion.

5. The ground portion of claim 3, wherein the first and second end portions of the first flexible portion are configured to exert symmetrical spring-like forces against the first arcuate portion such that the first flexible portion is configured to resiliently engage the rearward facing coupler surface of the coupler, and wherein the first and second end portions of the second flexible portion are configured to exert symmetrical spring-like forces against the second arcuate portion such that the second flexible portion is configured to resiliently engage the rearward facing coupler surface of the coupler when the connector is assembled and during operation of the connector.

6. The ground portion of claim 1, wherein the forward facing body surface of the body comprises a forward most surface of the body relative to a forward direction toward the interface port when the coupler engages the interface port.

7. The ground portion of claim 1, wherein the post ground contact portion comprises a post contact surface that is configured to face a forward direction toward the interface port when the coupler engages the interface port, and wherein the post contact surface is configured to be oriented parallel to the rearward facing post surface of the post when the connector is assembled, before the coupler of the assembled connector is engaged with the interface port, before the body has engaged a coaxial cable, and during operation of the connector.

8. The ground portion of claim 1, wherein the post ground contact portion is configured to maintain a continuous, non-intermittent, and not momentary ground path with the rearward facing post surface of the post at all times during operation of the connector.

9. The ground portion of claim 8, wherein the continuous, non-intermittent, and not momentary ground path remains continuous during operation of the connector even when the post and the coupler are spaced away from, and are not in electrical contact with, one another during operation of the connector.

10. The ground portion of claim 1, wherein the post includes a flange portion, the rearward facing post surface comprises a first rearward facing flange surface of the flange portion, the flange portion includes a second rearward facing flange surface spaced away from the first rearward facing flange surface and an intermediate surface between the first and second rearward facing flange surfaces, and wherein the first rearward facing flange surface is configured to face toward the forward facing body surface when the connector is assembled and while the first rearward facing flange surface is maintained in contact with a post contact surface of the post ground contact portion during operation of the connector.

11. The ground portion of claim 1, wherein the post includes an outwardly facing post portion rearwardly spaced away from the rearward facing post surface of the post relative to the rearward direction, and further comprising a collar post ground contact portion that rearwardly extends away from the rearward facing post surface of the post relative to the rearward direction so as to encircle the outwardly facing post portion of the post.

12. The ground portion of claim 1, wherein the coupler ground contact portion comprises a portion of a member that is separate and distinct component from the coupler, the body, and the post of the connector.

13. The ground portion of claim 1, wherein the post ground contact portion comprises a portion of a member that is separate and distinct component from the coupler, the body, and the post of the connector.

14. Ground member for maintaining a ground path in a coaxial cable connector having a coupler with a rearward facing coupler surface, a body with a forward facing body surface, and a post with a rearward facing post surface comprising:

coupler ground contact means for biasingly maintaining contact with the rearward facing coupler surface of the coupler of a connector when the connector is assembled and during operation of the connector; and post ground contact means for maintaining physical and electrical grounding contact with the rearward facing post surface during operation of the connector, the post ground contact means being located rearward from the rearward facing coupler surface of the coupler of the connector and extending in a space formed between the forward facing body surface of a body of the connector and the rearward facing post surface of a post of the connector when the connector is assembled and when the coupler engages an interface port.

15. The ground member of claim 14, wherein the post ground contact means maintains continuous physical and electrical grounding contact with the rearward facing post surface of the post at all times during operation of the connector.

16. The ground member of claim 14, wherein the coupler ground contact means comprises:

first flexible means for biasingly maintaining contact with the rearward facing coupler surface of the coupler, the first flexible means having a first arcuate portion extending between a first end portion and a second end portion of the first flexible means, the first and second end portions of the first flexible portion integrally connecting the first arcuate portion to the post ground contact means, wherein the first flexible portion is raised above a plane of the post ground contact means;

a second flexible means for biasingly maintaining contact with the rearward facing coupler surface of the coupler, the second flexible means having a second arcuate portion extending between a first end portion and a second end portion of the second flexible portion, the first and second end portions of the second flexible portion integrally connecting the second arcuate portion to the post ground contact means, wherein the second flexible portion is raised above the plane of the post ground contact means; and wherein the first arcuate portion and the second arcuate portion of the coupler ground contact means are arched portions.

17. The ground member of claim 14, further comprising a first arcuate slot and a second arcuate slot formed between the coupler ground contact means and the post ground contact means, and wherein the first flexible means is symmetrically arranged radially opposite of the second flexible means.

18. The ground member of claim 17, wherein the first and second end portions of the first flexible means are configured to exert symmetrical spring-like forces against the first arcuate portion such that the first flexible means is configured to resiliently engage the rearward facing coupler surface of the coupler, and wherein the first and second end portions of the second flexible means are configured to exert symmetrical spring-like forces against the second arcuate portion such that the second flexible means is configured to resiliently engage the rearward facing coupler surface of the coupler when the connector is assembled and during operation of the connector.

19. The ground member of claim 14, wherein the forward facing body surface of the body comprises a forward most surface of the body relative to a forward direction toward the interface port when the coupler engages the interface port.

20. The ground member of claim 14, wherein the post ground contact means comprises a post contact surface that is configured to face a forward direction toward the interface port when the coupler engages the interface port, and wherein the post contact surface is configured to be oriented parallel to the rearward facing post surface of the post when the connector is assembled, before the coupler of the assembled connector is engaged with the interface port, before the body has engaged a coaxial cable, and during operation of the connector.

21. The ground member of claim 14, wherein the post ground contact means is configured to maintain a continuous, non-intermittent, and not momentary ground path with the rearward facing post surface of the post at all times during operation of the connector.

22. The ground member of claim 21, wherein the continuous, non-intermittent, and not momentary ground path remains continuous during operation of the connector even when the post and the coupler are spaced away from, and are not in electrical contact with, one another during operation of the connector.

23. The ground member of claim 14, wherein the post includes a flange portion, the rearward facing post surface comprises a first rearward facing flange surface of the flange portion, the flange portion includes a second rearward facing flange surface spaced away from the first rearward facing flange surface and an intermediate surface between the first and second rearward facing flange surfaces, and wherein the first rearward facing flange surface is configured to face toward the forward facing body surface when the connector is assembled and while the first rearward facing flange surface is maintained in contact with a post contact surface of the post ground contact means during operation of the connector.

24. The ground member of claim 14, wherein the post includes an outwardly facing post portion rearwardly spaced away from the rearward facing post surface of the post relative to the rearward direction, and further comprising a collar post ground contact portion that rearwardly extends away from the rearward facing post surface of the post relative to the rearward direction so as to encircle the outwardly facing post portion of the post.

25. The ground member of claim 14, wherein the coupler ground contact means comprises a portion of a member that is a separate and distinct component from the coupler, the body, and the post of the connector.

26. The ground member of claim 14, wherein the post ground contact means comprises a portion of a member that is a separate and distinct component from the coupler, the body, and the post of the connector.

27. Ground member for maintaining a ground path in a coaxial cable connector having a coupler with a rearward facing coupler surface, a body with a forward facing body surface, and a post with a rearward facing post surface comprising:

a coupler ground contact surface configured to be biasingly maintained in contact with the rearward facing coupler surface of the coupler of a connector when the connector is assembled and during operation of the connector; and a post contact surface configured to be located rearward from the rearward facing coupler surface of the coupler of the connector so as to extend in a space formed between the forward facing body surface of a body of the connector and the rearward facing post surface of a post of the connector when the connector is assembled and when the coupler engages an interface port so as to maintain physical and electrical grounding contact with the rearward facing post surface during operation of the connector.

28. The ground member of claim 27, wherein the post contact surface is configured to maintain continuous physical and electrical grounding contact with the rearward facing post surface of the post at all times during operation of the connector.

29. The ground member of claim 27, wherein the post contact surface is configured to face a forward direction toward the interface port when the coupler engages the interface port, and wherein the post contact surface is configured to be oriented parallel to the rearward facing post surface of the post when the connector is assembled, before the coupler of the assembled connector is engaged with the interface port, before the body has engaged a coaxial cable, and during operation of the connector.

30. The ground member of claim 27, wherein the post contact surface is configured to maintain a continuous, non-intermittent, and not momentary ground path with the rearward facing post surface of the post at all times during operation of the connector.

31. The ground member of claim 30, wherein the continuous, non-intermittent, and not momentary ground path remains continuous during operation of the connector even when the post and the coupler are spaced away from, and are not in electrical contact with, one another during operation of the connector.

* * * * *